United States Patent
Murasumi et al.

(10) Patent No.: US 9,961,259 B2
(45) Date of Patent: May 1, 2018

(54) IMAGE GENERATION DEVICE, IMAGE DISPLAY SYSTEM, IMAGE GENERATION METHOD AND IMAGE DISPLAY METHOD

(71) Applicant: FUJITSU TEN LIMITED, Kobe-shi, Hyogo (JP)

(72) Inventors: Miki Murasumi, Kobe (JP); Shinichi Moriyama, Kobe (JP); Masahiro Yamada, Kobe (JP)

(73) Assignee: FUJITSU TEN LIMITED, Kobe-shi (JP)

( * ) Notice: Subject to any disclaimer, the term of this patent is extended or adjusted under 35 U.S.C. 154(b) by 249 days.

(21) Appl. No.: 14/910,030

(22) PCT Filed: Aug. 25, 2014

(86) PCT No.: PCT/JP2014/072162
§ 371 (c)(1),
(2) Date: Feb. 4, 2016

(87) PCT Pub. No.: WO2015/041005
PCT Pub. Date: Mar. 26, 2015

(65) Prior Publication Data
US 2016/0182823 A1   Jun. 23, 2016

(30) Foreign Application Priority Data

Sep. 19, 2013 (JP) ................. 2013-193909
Oct. 31, 2013 (JP) ................. 2013-226161

(51) Int. Cl.
*H04N 7/18*  (2006.01)
*H04N 5/232*  (2006.01)
(Continued)

(52) U.S. Cl.
CPC ......... *H04N 5/23238* (2013.01); *B60R 1/00* (2013.01); *B60R 11/04* (2013.01);
(Continued)

(58) Field of Classification Search
CPC ............ H04N 5/23238; H04N 5/247; H04N 5/23216; H04N 7/181; B60R 11/04;
(Continued)

(56) References Cited

U.S. PATENT DOCUMENTS

| 2010/0245573 A1* | 9/2010 | Gomi ............... B60R 1/00 348/148 |
| 2012/0069188 A1* | 3/2012 | Ohno ............... B60R 1/00 348/148 |
| 2013/0063601 A1* | 3/2013 | Wakabayashi ...... B60R 1/00 348/148 |

FOREIGN PATENT DOCUMENTS

| CN | 102934427 A | 2/2013 |
| JP | 2011-065520 A | 3/2011 |
| JP | 2011-066763 A | 3/2011 |

OTHER PUBLICATIONS

Nov. 25, 2014 Search Report issued in International Patent Application No. PCT/JP2014/072162.
(Continued)

*Primary Examiner* — Allen Wong
(74) *Attorney, Agent, or Firm* — Oliff PLC

(57) ABSTRACT

An image generation unit uses a plurality of captured image data and vehicle body data of a vehicle to continuously generate a virtual perspective image indicating the vehicle body of the vehicle and the periphery of the vehicle as seen from a virtual perspective (VP) positioned within the cabin of the vehicle. An image control unit alters the angle in a plan view of the line of sight of the VP in a manner such that the line of sight circles the surroundings of the vehicle, and moves the position of the VP in the front-back direction of the vehicle.

20 Claims, 56 Drawing Sheets

(51) Int. Cl.
*B60R 1/00* (2006.01)
*B60R 11/04* (2006.01)
*H04N 5/247* (2006.01)

(52) U.S. Cl.
CPC ......... *H04N 5/23216* (2013.01); *H04N 5/247* (2013.01); *H04N 7/181* (2013.01); *B60R 2300/105* (2013.01); *B60R 2300/202* (2013.01); *B60R 2300/207* (2013.01); *B60R 2300/303* (2013.01); *B60R 2300/60* (2013.01); *B60R 2300/605* (2013.01); *B60R 2300/802* (2013.01); *B60R 2300/8006* (2013.01)

(58) Field of Classification Search
CPC . B60R 1/00; B60R 2300/60; B60R 2300/202; B60R 2300/303; B60R 2300/8006; B60R 2300/207; B60R 2300/105; B60R 2300/802; B60R 2300/605
USPC ....................................................... 348/148
See application file for complete search history.

(56) References Cited

OTHER PUBLICATIONS

Mar. 2, 2018 Office Action issued in Chinese Patent Application No. 201480051322.7.

\* cited by examiner

IMAGE GENERATION DEVICE, IMAGE DISPLAY SYSTEM, IMAGE GENERATION METHOD AND IMAGE DISPLAY METHOD

TECHNICAL FIELD

The disclosure relates to a technology of generating an image indicating a periphery of a vehicle.

BACKGROUND ART

An image display system configured to generate an image indicating a periphery of a vehicle such as an automobile and to display the image on a display device in the vehicle has been known. By using the image display system, a user (a driver, representatively) can check a shape of the periphery of the vehicle substantially in real time.

An image display system configured to generate a virtual perspective image, which indicates a periphery of a vehicle as seen from a virtual perspective, by using a plurality of captured images obtained from a plurality of cameras, and to display the virtual perspective image has been also known. As the virtual perspective image, an in-vehicle perspective image, which indicates the periphery of the vehicle as seen from a driver's perspective of the vehicle, has been suggested.

When generating the in-vehicle perspective image, a position of the virtual perspective is fixed to a position equivalent to the driver's perspective. The user can check a shape of a surrounding of the vehicle from the same perspective as the user and intuitively recognize the shape of the periphery of the vehicle by checking the in-vehicle perspective image.

An image display system configured to continuously generate an in-vehicle perspective image while altering a direction of a line of sight of a virtual perspective and to indicate a shape of a periphery of a vehicle as seen from a driver's perspective so as to circle surroundings of the vehicle has been also suggested (for example, refer to Patent Literature 1).

CITATION LIST

Patent Literature

Patent Literature 1: JP-A-2011-66763A

SUMMARY OF INVENTION

Technical Problem

In the above in-vehicle perspective image, a vehicle image indicating a vehicle body of the vehicle is superimposed on a photographic subject image of the periphery of the vehicle so that the user can intuitively recognize which direction of the surroundings of the vehicle is indicated by the in-vehicle perspective image.

As described above, the position of the virtual perspective of the in-vehicle perspective image is fixed to the position equivalent to the driver's perspective. For this reason, the vehicle image included in the in-vehicle perspective image may indicate many parts of the vehicle body beyond necessity, depending on a direction facing towards the line of sight of the virtual perspective. In general, the vehicle is long in a front-back direction. Therefore, when the line of sight of the virtual perspective is made to face towards the rear of the vehicle, the vehicle image indicates parts from a position of a front seat to a rear end in the vehicle body. In this way, when the in-vehicle perspective image includes many parts of the vehicle body, it may rather disturb the visibility of the photographic subject image of the periphery of the vehicle.

It is therefore a first object of the disclosure to improve the visibility of a photographic subject image of a periphery of a vehicle, which is to be included in a virtual perspective image.

Also, in order to indicate the shape of the periphery of the vehicle so that it circles the surroundings of the vehicle, it is necessary to make the line of sight face towards an entire target range of the periphery of the vehicle while gradually altering the direction of the line of sight of the virtual perspective. Therefore, it takes a relatively long time period (a time period necessary to alter the direction of the line of sight of the virtual perspective) so that the user can check a relatively wide range of the periphery of the vehicle. As a result, some users may get a feeling that it is troublesome to check the periphery of the vehicle.

It is therefore a second object of the disclosure to enable a user to check a shape of a periphery of a vehicle in a relatively short time period.

Solution to Problem

In order to achieve the first object, a first aspect that can be made by the disclosure is an image generation device to be mounted on a vehicle. The image generation device includes an acquisition unit configured to acquire a plurality of captured image data from a plurality of cameras; a generation unit configured to continuously generate a virtual perspective image indicating a periphery of the vehicle and a vehicle body of the vehicle as seen from a virtual perspective positioned within a cabin of the vehicle by using at least one of the plurality of captured image data and vehicle body data of the vehicle, and a control unit configured to alter an angle in a plan view of a line of sight of the virtual perspective so that the line of sight circles surroundings of the vehicle and to move a position of the virtual perspective in a front-back direction of the vehicle.

According to the above configuration, since the position of the virtual perspective is moved in the front-back direction of the vehicle, it is possible to reduce parts of the vehicle body to be indicated in the virtual perspective image and to improve the visibility of a photographic subject image of the periphery of the vehicle to be included in an in-vehicle perspective image.

In the image generation device of the first aspect, the control unit may be configured to move the position of the virtual perspective in correspondence to a direction of the line of sight.

According to the above configuration, since the position of the virtual perspective is moved in correspondence to the direction in which the line of sight of the virtual perspective faces, it is possible to reduce parts of the vehicle body to be indicated in the virtual perspective image.

In the image generation device of the first aspect, the control unit may be configured to move the position of the virtual perspective along a peripheral edge of the cabin of the vehicle in a front-back direction and in a left-right direction of the vehicle.

According to the above configuration, since the position of the virtual perspective is moved along the peripheral edge of the cabin of the vehicle, it is possible to reduce parts of the vehicle body to be indicated in the virtual perspective image.

In the image generation device of the first aspect, the control unit may be configured to keep the position of the virtual perspective while altering the angle in the plan view of the line of sight and to keep the angle in the plan view of the line of sight while moving the position of the virtual perspective.

According to the above configuration, the movement of the line of sight of the virtual perspective can be simplified, and the virtual perspective image can be indicated so that the periphery of the vehicle can be easily understood.

In the image generation device of the first aspect, the control unit may be configured to alter the angle in the plan view of the line of sight and the position of the virtual perspective at the same time.

According to the above configuration, since the angle in the plan view of the line of sight and the position of the virtual perspective are altered at the same time, it is possible to shorten a time period for which the line of sight of the virtual perspective circles the surroundings of the vehicle.

In the image generation device of the first aspect, the control unit may be configured to move the position of the virtual perspective in an elliptical shape of which a long axis follows the front-back direction of the vehicle.

According to the above configuration, the position of the virtual perspective is moved in the elliptical shape of which a long axis follows the front-back direction of the vehicle. Thereby, it is possible to shorten a moving distance of the virtual perspective while reducing the parts of the vehicle body to be indicated in the virtual perspective image.

In the image generation device of the first aspect, when at least one of the plurality of cameras has a depression angle of an optical axis different from the other cameras, the generation unit may be configured to project the plurality of captured image data to a virtual projection plane and to generate the virtual perspective image by using an area of a part of the projection plane. Also, the control unit may be configured to adjust a depression angle of the line of sight so that a non-projection area, which is positioned outside a projection area of the projection plane to which the plurality of captured image data is to be projected, is not included in the virtual perspective image.

According to the above configuration, since the non-projection area of the projection plane is not included in the virtual perspective image, it is possible to prevent a user who visually recognizes the virtual perspective image from feeling uncomfortable.

In the image generation device of the first aspect, the control unit may keep the depression angle of the line of sight at a specific angle at which the virtual perspective image does not include the non-projection area, when the line of sight is made to face towards a direction in which the projection area becomes smallest on the projection plane.

According to the above configuration, since the depression angle of the line of sight of the virtual perspective is kept, the movement of the line of sight of the virtual perspective can be simplified and the virtual perspective image can be indicated so that the periphery of the vehicle can be easily understood.

In the image generation device of the first aspect, the control unit may be configured to alter the depression angle of the line of sight, in correspondence to a size of the projection area of the projection plane in a direction towards which the line of sight is made to face.

According to the above configuration, since the depression angle of the line of sight is altered in correspondence to the size of the projection area of the projection plane, the virtual perspective image can indicate a photographic subject image relatively distant from the vehicle.

In the image generation device of the first aspect, if the position of the virtual perspective is a position except for a specific position, the control unit may keep the depression angle of the line of sight of the virtual perspective at a specific angle at which the virtual perspective image does not include the non-projection area when the line of sight is made to face towards a direction in which the projection area becomes smallest on the projection plane, and if the position of the virtual perspective is the specific position, the control unit may make the depression angle of the line of sight of the virtual perspective smaller than the specific angle.

According to the above configuration, the virtual perspective image can indicate a photographic subject image relatively distant from the vehicle with respect to a specific direction of the vehicle while simplifying the movement of the line of sight of the virtual perspective.

In order to achieve the first object, a second aspect that can be made by the disclosure is an image generation device to be mounted on a vehicle. The image generation device includes an acquisition unit configured to acquire a plurality of captured image data from a plurality of cameras; a generation unit configured to project the plurality of captured image data to a virtual projection plane and to continuously generate a virtual perspective image indicating a periphery of the vehicle as seen from a virtual perspective positioned within a cabin of the vehicle by using an area of a part of the projection plane, and a control unit configured to alter an angle in a plan view of a line of sight of the virtual perspective so that the line of sight circles surroundings of the vehicle, wherein at least one of the plurality of cameras has a depression angle of an optical axis different from the other cameras, and wherein the control unit is configured to adjust a depression angle of the line of sight so that a non-projection area, which is positioned outside a projection area of the projection plane to which the data of the plurality of captured images is to be projected, is not included in the virtual perspective image.

According to the above configuration, since the non-projection area of the projection plane is not included in the virtual perspective image, it is possible to prevent a user who visually recognizes the virtual perspective image from feeling uncomfortable.

In order to achieve the first object, a third aspect that can be made by the disclosure is an image display system to be mounted on a vehicle. The image display system includes the image generation device according to the first or second aspect, and a display device configured to display the virtual perspective image generated at the image generation device.

According to the above configuration, since the position of the virtual perspective is moved in the front-back direction of the vehicle, it is possible to reduce parts of the vehicle body to be indicated in the virtual perspective image and to improve the visibility of a photographic subject image of the periphery of the vehicle to be included in an in-vehicle perspective image.

In order to achieve the first object, a fourth aspect that can be made by the disclosure is an image generation method that is to be executed in a vehicle. The method includes steps of (a) acquiring a plurality of captured image data from a plurality of cameras; (b) continuously generating a virtual perspective image indicating a periphery of the vehicle and a vehicle body of the vehicle as seen from a virtual perspective positioned within a cabin of the vehicle by using at least one of the plurality of captured image data and vehicle body data of the vehicle, and (c) altering an angle in a plan view of a line of sight of the virtual perspective so that the line of sight circles surroundings of the vehicle and moving a position of the virtual perspective in a front-back direction of the vehicle.

According to the above configuration, since the position of the virtual perspective is moved in the front-back direction of the vehicle, it is possible to reduce parts of the vehicle body to be indicated in the virtual perspective image and to improve the visibility of a photographic subject image of the periphery of the vehicle to be included in an in-vehicle perspective image.

In order to achieve the first object, a fifth aspect that can be made by the disclosure is an image generation method that is to be executed in a vehicle. The method includes steps of (a) acquiring a plurality of captured image data from a plurality of cameras; (b) projecting the plurality of captured image data to a virtual projection plane and continuously generating a virtual perspective image indicating a periphery of the vehicle as seen from a virtual perspective positioned within a cabin of the vehicle by using an area of a part of the projection plane, and (c) altering an angle in a plan view of a line of sight of the virtual perspective so that the line of sight circles surroundings of the vehicle, wherein at least one of the plurality of cameras has a depression angle of an optical axis different from the other cameras, and wherein in the step (c), a depression angle of the line of sight is adjusted so that a non-projection area, which is positioned outside a projection area of the projection plane to which the plurality of captured image data is to be projected, is not included in the virtual perspective image.

According to the above configuration, since the non-projection area of the projection plane is not included in the virtual perspective image, it is possible to prevent a user who visually recognizes the virtual perspective image from feeling uncomfortable.

In order to achieve the second object, a sixth aspect that can be made by the disclosure is an image display system to be used for a vehicle. The image display system includes an acquisition unit configured to acquire a plurality of captured image data from a plurality of cameras; a first generation unit configured to generate a first image indicating a periphery of the vehicle as seen from a first virtual perspective positioned within a cabin of the vehicle by using at least one of the plurality of captured image data; a second generation unit configured to generate a second image indicating the periphery of the vehicle as seen from a second virtual perspective positioned within the cabin of the vehicle by using at least one of the plurality of captured image data; a display unit configured to display the first image and the second image at the same time, and an altering control unit configured to alter a direction of a line of sight of the first virtual perspective and a direction of a line of sight of the second virtual perspective in opposite directions, respectively.

According to the above configuration, the first image and the second image are displayed at the same time, and the direction of the line of sight of the first virtual perspective and the direction of the line of sight of the second virtual perspective are respectively altered in the opposite directions. For this reason, the user can check a shape of the periphery of the vehicle in a relatively short time period by checking the first image and the second image.

In the image display system of the sixth aspect, the altering control unit may be configured to alter the direction of the line of sight of the first virtual perspective and the direction of the line of sight of the second virtual perspective from a first direction of the vehicle to a second direction opposite to the first direction, respectively.

According to the above configuration, the user can check an entire shape of the periphery of the vehicle in a relatively short time period.

In the image display system of the sixth aspect, the altering control unit may be configured to alter the direction of the line of sight of the first virtual perspective via a left of the vehicle and to alter the direction of the line of sight of the second virtual perspective via a right of the vehicle. In this case, the display unit may be configured to display the first image in a first area positioned at a relatively left side and to display the second image in a second area positioned at a relatively right side.

According to the above configuration, the first image mainly indicating the left of the vehicle is displayed in the first area positioned at the relatively left side, and the second image mainly indicating the right of the vehicle is displayed in the second area positioned at the relatively right side. For this reason, the user can intuitively recognize at which of the left and the right of the vehicle the photographic subjects indicated by the first image and the second image are respectively positioned.

In the image display system of the sixth aspect, the altering control unit may be configured to alter the direction of the line of sight of the first virtual perspective via a front of the vehicle and to alter the direction of the line of sight of the second virtual perspective via a rear of the vehicle. In this case, the display unit may be configured to display the first image in a first area positioned at a relatively upper side and to display the second image in a second area positioned at a relatively lower side.

According to the above configuration, the first image mainly indicating the front of the vehicle is displayed in the first area positioned at the relatively upper side, and the second image mainly indicating the rear of the vehicle is displayed in the second area positioned at the relatively lower side. For this reason, the user can intuitively recognize at which of the front and the rear of the vehicle the photographic subjects indicated by the first image and the second image are respectively positioned.

In the image display system of the sixth aspect, the direction of the line of sight of the first virtual perspective and the direction of the line of sight of the second virtual perspective may be symmetric with respect to a central line of the vehicle.

According to the above configuration, the direction of the line of sight of the first virtual perspective and the direction of the line of sight of the second virtual perspective are symmetric with respect to the central line of the vehicle. For this reason, the user can easily recognize positions of the photographic subjects indicated by the first image and the second image.

The image display system of the sixth aspect may further include a moving control unit configured to move a position of the first virtual perspective in correspondence to the direction of the line of sight of the first virtual perspective and to move a position of the second virtual perspective in correspondence to the direction of the line of sight of the second virtual perspective.

According to the above configuration, the position of the first virtual perspective is moved in correspondence to the direction of the line of sight of the first virtual perspective and the position of the second virtual perspective is moved in correspondence to the direction of the line of sight of the second virtual perspective. For this reason, it is possible to improve the visibility of the photographic subject images to be included in the first image and the second image.

The image display system of the sixth aspect may further include a receiving unit configured to receive a detection result of an object existing in the periphery of the vehicle. In this case, when the direction of the line of sight of one virtual perspective of the first virtual perspective and the second virtual perspective faces towards the object, the altering control unit may slow down a speed of altering the one virtual perspective, as compared to when the direction of the line of sight of the one virtual perspective does not face towards the object.

According to the above configuration, when the direction of the line of sight of the virtual perspective faces towards the object, the speed of altering the virtual perspective is slowed down. For this reason, the user can check in detail an object that is to be indicated by the first image or the second image.

The image display system of the sixth aspect may further include a receiving unit configured to receive a detection result of an object existing in the periphery of the vehicle, and a control unit that activates a display function with which the display unit displays the first image and the second image when the detection result indicates that there is an object and that inactivates the display function when the detection result indicates that there is no object.

According to the above configuration, only when an object existing in the periphery of the vehicle is detected, the display function with which the display unit displays the first image and the second image is activated. For this reason, the user can check the shape of the periphery of the vehicle while recognizing the object existing in the periphery of the vehicle.

In order to achieve the second object, a seventh aspect that can be made by the disclosure is an image display method that is to be executed in a vehicle. The method includes steps of (a) acquiring a plurality of captured image data from a plurality of cameras; (b) generating a first image indicating a periphery of the vehicle as seen from a first virtual perspective positioned within a cabin of the vehicle by using at least one of the plurality of captured image data; (c) generating a second image indicating the periphery of the vehicle as seen from a second virtual perspective positioned within the cabin of the vehicle by using at least one of the plurality of captured image data; (d) displaying the first image and the second image at the same time, and (e) altering a direction of a line of sight of the first virtual perspective and a direction of a line of sight of the second virtual perspective in opposite directions, respectively.

According to the above configuration, the first image and the second image are displayed at the same time, and the direction of the line of sight of the first virtual perspective and the direction of the line of sight of the second virtual perspective are respectively altered in the opposite directions. For this reason, the user can check a shape of the periphery of the vehicle in a relatively short time period by checking the first image and the second image.

DETAILED DESCRIPTION OF ILLUSTRATIVE EMBODIMENTS

Hereinafter, illustrative embodiments of the disclosure will be described in detail with reference to the accompanying drawings.

1. First Illustrative Embodiment

<1-1. Configuration>

Figure 1:
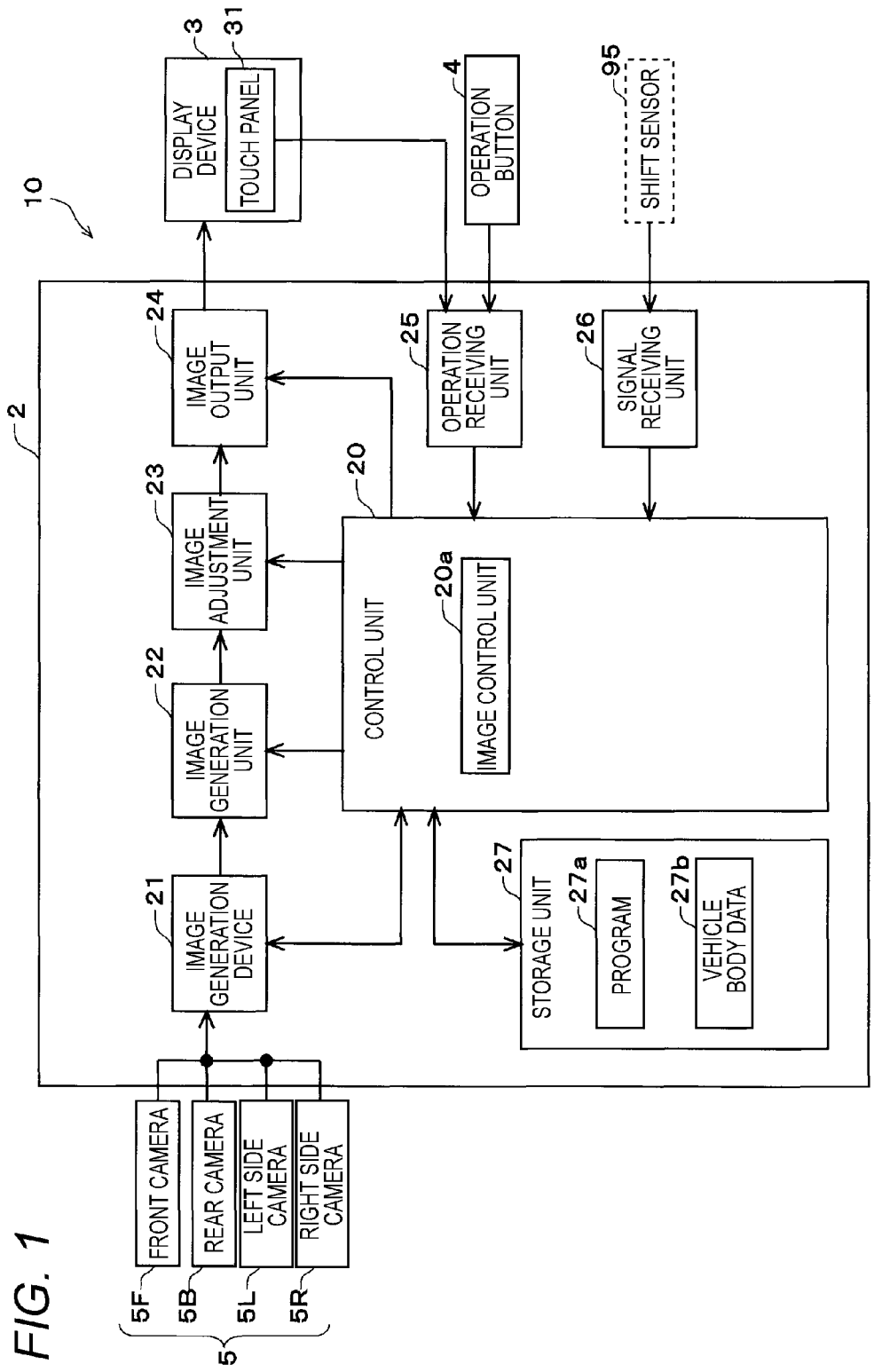
FIG. 1 depicts a configuration of an image display system in accordance with a first illustrative embodiment.

FIG. 1 depicts a configuration of an image display system 10 in accordance with a first illustrative embodiment. The image display system 10 is used for a vehicle (an automobile, in this illustrative embodiment), and has functions of generating an image indicative of a periphery of the vehicle and displaying the same in a cabin. A user (a driver, representatively) of the image display system 10 can recognize a situation of the periphery of the vehicle substantially in real time by using the image display system 10.

As shown in FIG. 1, the image display system 10 has a plurality of cameras 5, an image generation device 2, a display device 3 and an operation button 4. Each of the plurality of cameras 5 is configured to capture the periphery of the vehicle, to acquire a captured image, and to input the acquired captured image into the image generation device 2. The image generation device 2 is configured to generate a display image to be displayed on the display device 3 by using the captured image indicative of the periphery of the vehicle. The display device 3 is configured to display the display image generated at the image generation device 2. Also, the operation button 4 is configured to receive a user's operation.

Each of the plurality of cameras 5 has a lens and an imaging device, and is configured to electronically acquire the captured image indicative of the periphery of the vehicle. The plurality of cameras 5 includes a front camera 5F, a rear camera 5B, a left side camera 5L, and a right side camera 5R. The four cameras 5 are disposed at different positions of the vehicle 9 and are configured to capture different directions of the periphery of the vehicle 9.

Figure 2:
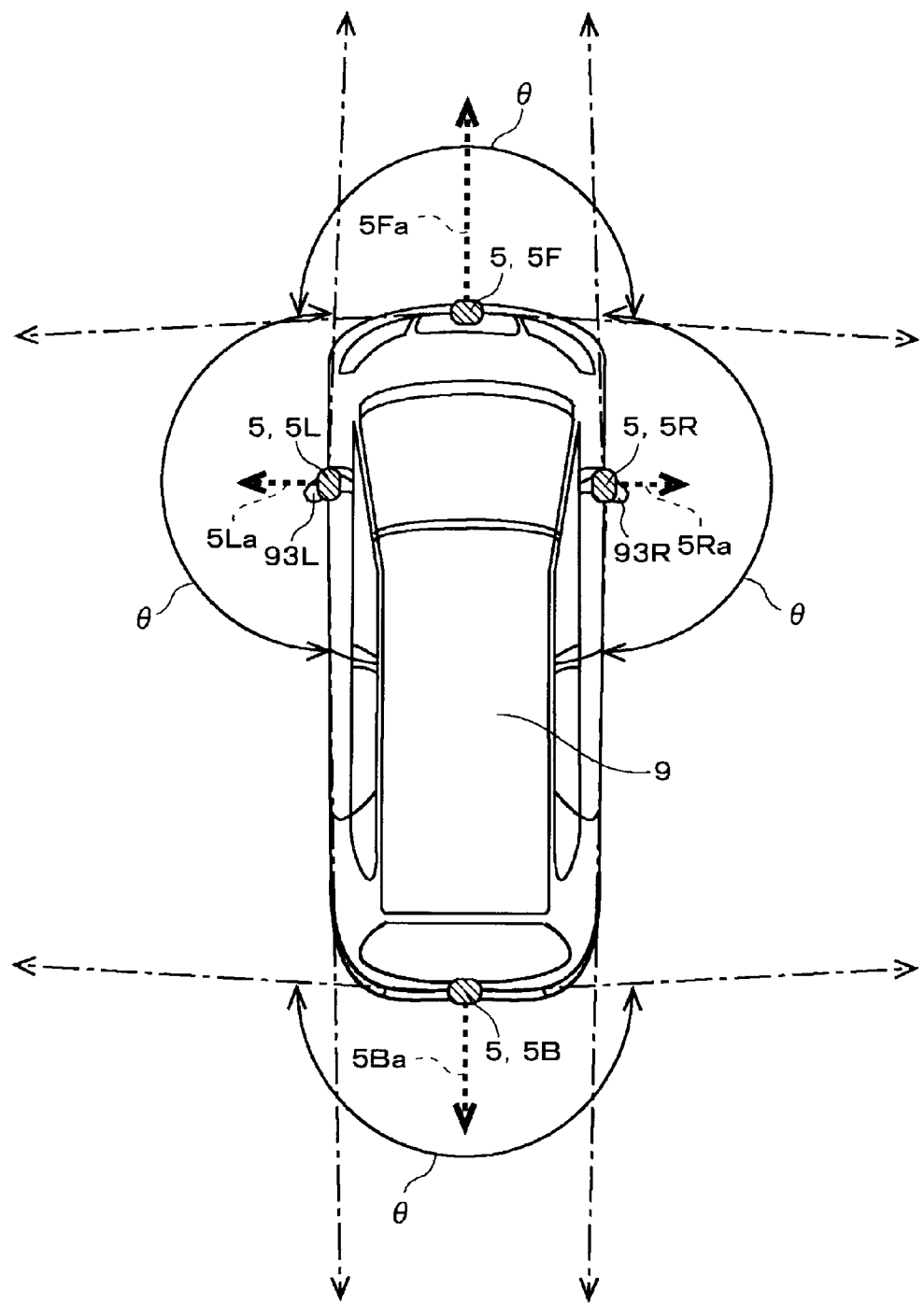
FIG. 2 depicts directions in which four cameras of the image display system shown in FIG. 1 take pictures, respectively.

FIG. 2 depicts directions in which the four cameras 5 take pictures, respectively. The front camera 5F is provided at a front end of the vehicle 9, and an optical axis 5Fa thereof is made to face forwards on a front-back direction of the vehicle 9. The rear camera 5B is provided at a rear end of the vehicle 9, and an optical axis 5Ba thereof is made to face rearwards in the front-back direction of the vehicle 9. The left side camera 5L is provided at a left side-view mirror 93L, and an optical axis 5La thereof is made to face leftwards in a left-right direction of the vehicle 9. Also, the right side camera 5R is provided at a right side-view mirror 93R, and an optical axis 5Ra thereof is made to face rightwards in the left-right direction of the vehicle 9.

As the lens of each camera 5, a wide angle lens such as a fish eye lens is adopted. Each camera 5 has a 180 degree or greater angle of view θ. For this reason, it is possible to capture the entire surroundings of the vehicle 9 by using the four cameras 5.

Figure 3:
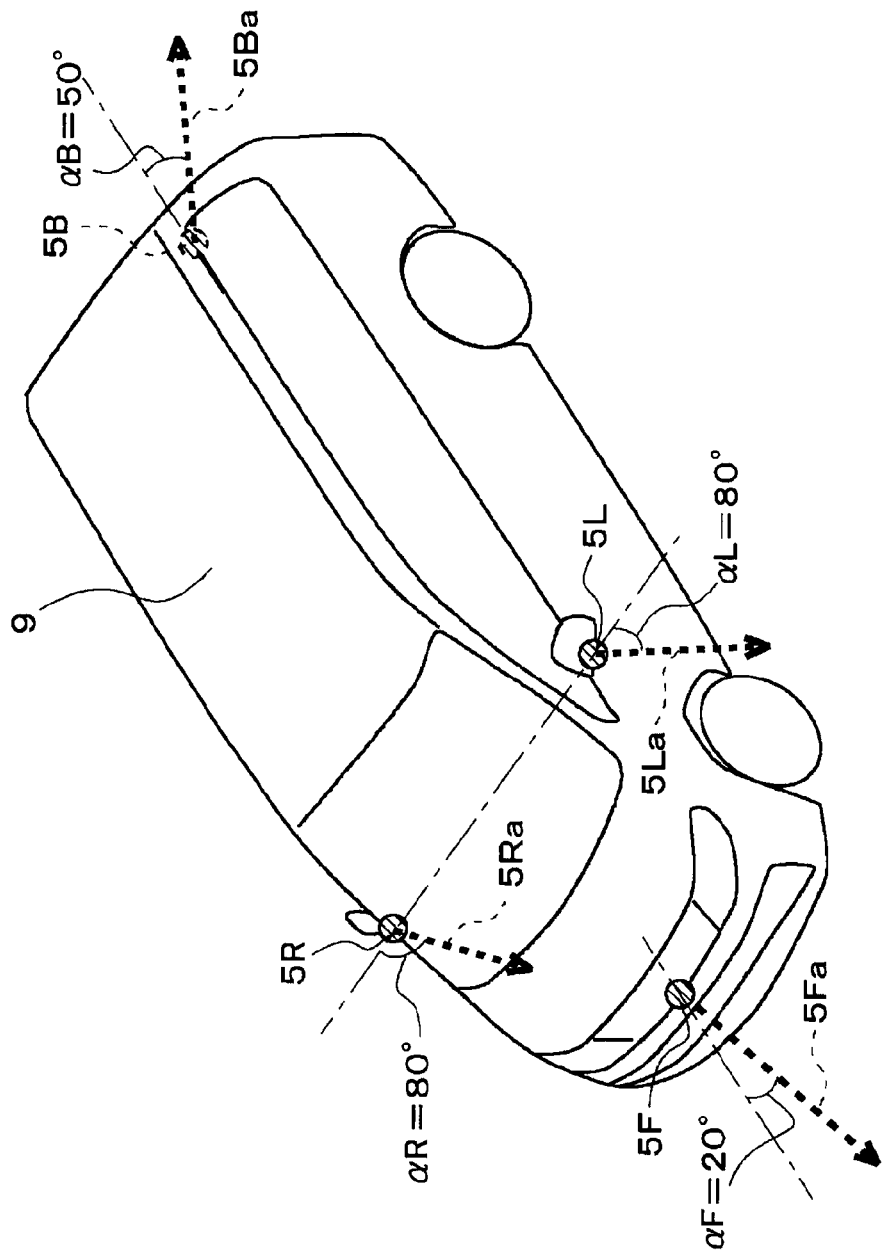
FIG. 3 depicts respective depression angles of optical axes of the four cameras.

Also, the front camera 5F, the rear camera 5B, and the side cameras 5L, 5R have different depression angles (downward angles on the basis of a horizontal direction) of the optical axes. FIG. 3 depicts the respective depression angles of the optical axes of the four cameras 5. The dashed-dotted line in FIG. 3 follows the horizontal direction.

As shown in FIG. 3, regarding the left and right side cameras 5L, 5R, the depression angles αL, αR of the optical axes 5La, 5Ra are substantially the same, for example, 80°. In contrast, the front camera 5F and the rear camera 5B have the depression angles of the optical axes different from the side cameras 5L, 5R. The depression angle αF of the optical axis 5Fa of the front camera 5F is, for example 20°, and the depression angle αB of the optical axis 5Ba of the rear camera 5B is, for example 50°.

Therefore, the front camera 5F, the rear camera 5B, and the side cameras 5L, 5R have different distances within which the capturing can be made in a direction of getting away from the vehicle 9. Among the optical axes of the four cameras 5, since the optical axis 5Fa of the front camera 5F faces most upwardly, the front camera 5F can capture an area that is relatively distant from the vehicle 9. On the other hand, since the optical axes 5La, 5Ra of the left and right side cameras 5L, 5R face most downwardly, the side camera s5L, 5R can capture only an area that is relatively close to the vehicle 9.

As shown in FIG. 1, the display device 3 has a thin display panel such as a liquid crystal panel, for example, and is configured to display a variety of information and images thereon. For example, the display device 3 is disposed on an instrument panel of the vehicle 9 so that the user can visibly recognize a screen of the display panel. The display device 3 is disposed in the same housing as the image generation device 2, so that it may be integrated with the image generation device 2. Alternatively, the display device 3 may be a separate device from the image generation device 2. Also, the display device 3 has a touch panel 31 overlapped over the display panel and can receive a user's operation. The display device 3 may further have other functions such as a navigation function of guiding a route to a destination, in addition to the display function.

The operation button 4 is an operation member configured to receive the user's operation. The operation button 4 is provided for a steering wheel of the vehicle 9, for example, and is configured to mainly receive an operation from the driver. The user can make a variety of operations on the image display system 10 through the operation button 4 and the touch panel 31 of the display device 3. When the user's operation is made on any one of the operation button 4 and the touch panel 31, an operation signal indicative of contents of the operation is input into the image generation device 2.

The image generation device 2 is an electronic device capable of executing a variety of image processing. The image generation device 2 has an image acquisition unit 21, an image generation unit 22, an image adjustment unit 23, and an image output unit 24.

The image acquisition unit 21 (an example of the acquisition unit) is configured to acquire four captured image data from the four cameras 5. The image acquisition unit 21 has an image processing function of converting an analog captured image into a digital captured image, for example. The image acquisition unit 21 is configured to execute predetermined image processing for the acquired captured image data and to input the processed captured image data into the image generation unit 22.

The image generation unit 22 (an example of the generation unit) is a hardware circuit configured to execute image processing for generating a virtual perspective image. The image generation unit 22 is configured to generate virtual perspective images indicative of the periphery of the vehicle 9 as seen from the virtual perspective by using the four captured image data acquired from the four cameras 5. The image generation unit 22 is configured to continuously (temporally continuously) the virtual perspective images by using the captured images obtained just previously at the respective cameras 5. Thereby, the image generation unit 22 generates the virtual perspective images indicating substantially in real time the periphery of the vehicle. A method of generating the virtual perspective images will be described in detail later.

The image adjustment unit 23 is configured to generate a display image that is to be displayed on the display device 3. The image adjustment unit 23 is configured to generate a display image including the virtual perspective images and the like generated at the image generation unit 22.

The image output unit 24 is configured to display the display image generated at the image adjustment unit 23 on the display device 3. Thereby, the virtual perspective image, which indicates substantially in real time the periphery of the vehicle 9 as seen from the virtual perspective, is displayed on the display device 3.

Also, the image generation device 2 further has a control unit 20, an operation receiving unit 25, a signal receiving unit 26, and a storage unit 27. The control unit 20 is a microcomputer having a CPU, a RAM, a ROM and the like, for example, and is configured to collectively control the entire image generation device 2.

The operation receiving unit 25 is configured to receive operation signals that are to be transmitted from the operation button 4 and the touch panel 31 when the user makes an operation. Thereby, the operation receiving unit 25 receives the user's operation. The operation receiving unit 25 is configured to input the received operation signal into the control unit 20.

The signal receiving unit 26 is configured to receive a signal, which is to be transmitted from another device provided for the vehicle 9 separately from the image generation device 2, and to input the same into the control unit 20. The signal receiving unit 26 can receive a signal that is to be transmitted from a shift sensor 95 of the vehicle 9. The shift sensor 95 is configured to detect a shift position, which is a position of a shift lever of a transmission of the vehicle 9, and to transmit a signal indicative of the shift position to the image generation device 2. Based on this signal, the control unit 20 can determine whether the vehicle 9 travels forwards or rearwards.

The storage unit 27 is a non-volatile memory such as a flash memory, for example, and is configured to store therein a variety of information. The storage unit 27 is configured to store therein a program 27a serving as the firmware and a variety of data that is to be used for generation of the virtual perspective image by the image generation unit 22. The data that is to be used for generation of the virtual perspective image includes vehicle body data 27b indicative of a shape and a size of the vehicle body of the vehicle 9.

A variety of functions of the control unit 20 are implemented by execution (calculation processing of the CPU, in response to the program 27a) of the program 27a stored in the storage unit 27. An image control unit 20a shown in FIG.

1 is a part of functional units that are to be implemented by the execution of the program 27a.

The image control unit 20a (an example of the control unit) is configured to control the image generation unit 22 configured to generate the virtual perspective image and the image adjustment unit 23 configured to generate the display image. For example, the image control unit 20a is configured to alter a position of the virtual perspective relating to the virtual perspective image generated by the image generation unit 22 and a direction of the line of sight of the virtual perspective.

<1-2. Generation of Virtual Perspective Image>

Figure 4:
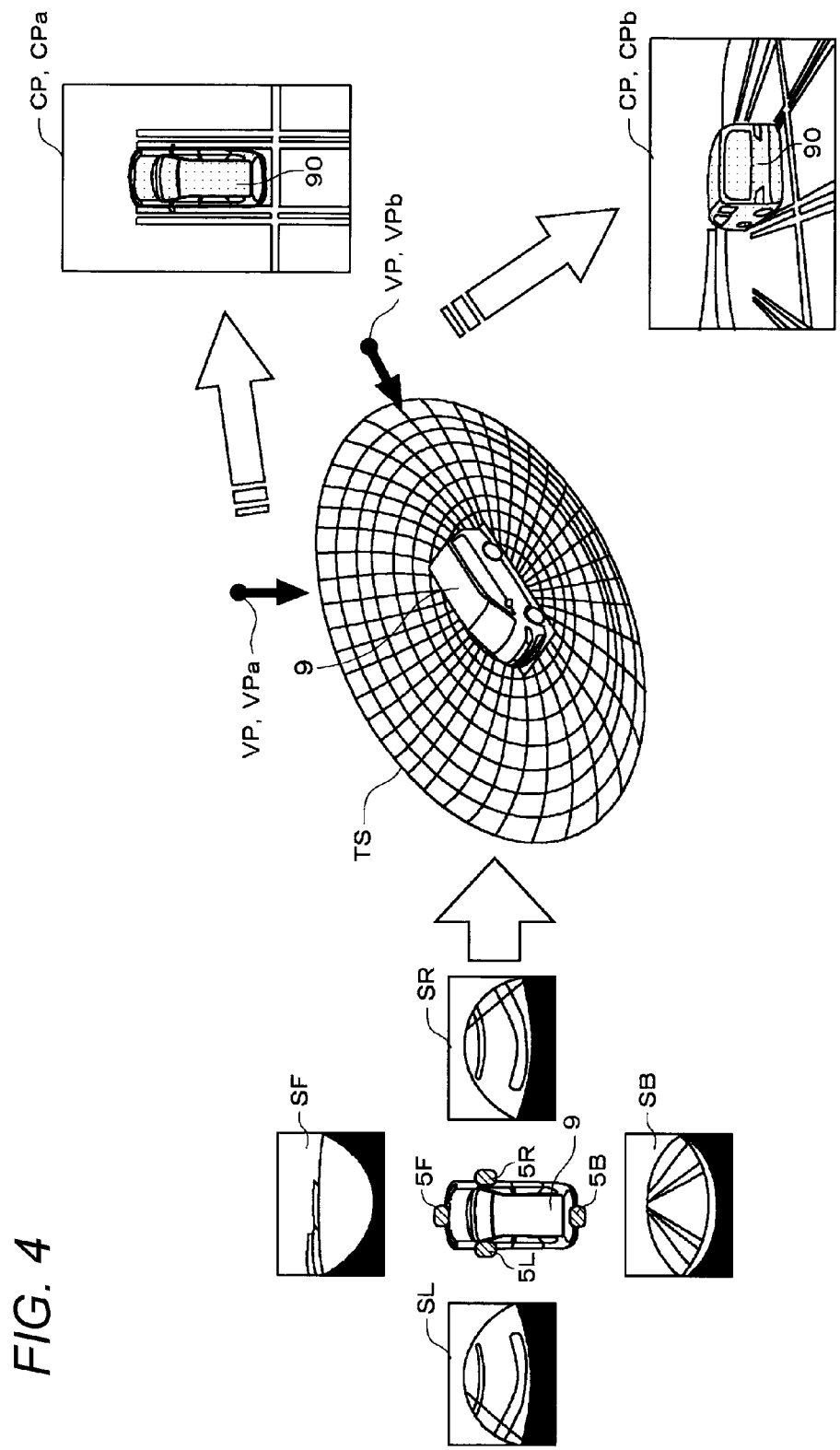
FIG. 4 illustrates a method with which the image display system shown in FIG. 1 generates a virtual perspective image.

Subsequently, a method with which the image generation unit 22 generates the virtual perspective image indicative of the shape of the periphery of the vehicle 9 as seen from the virtual perspective is described. FIG. 4 illustrates a method with which the image generation unit 22 generates a virtual perspective image. The image generation unit 22 is configured to generate a virtual perspective image having realistic sensation close to the reality by using a virtual three-dimensional projection plane TS for generation of the virtual perspective image.

The front camera 5F, the rear camera 5B, the left side camera 5L, and the right side camera 5R acquire four captured images SF, SB, SL, SR indicating the front, the rear, the left and the right of the vehicle 9, respectively. The four captured images SF, SB, SL, SR include data of the entire surroundings of the vehicle 9.

The image generation unit 22 projects the data (values of pixels) included in the four captured images SF, SB, SL, SR to the projection plane TS, which is a three-dimensional curved surface in a virtual three dimensional space. The projection plane TS has a substantially semispherical shape (a bowl shape), for example, and a central area (a bottom part of the bowl) thereof is defined as a position of the vehicle 9. Also, an outside of the position of the vehicle 9 on the projection plane TS is equivalent to an area of the periphery of the vehicle 9.

A correspondence relation between a position of the data included in the captured images SF, SB, SL, SR and a position of the projection plane TS is defined in advance. Table data indicating the correspondence relation is stored in the storage unit 27. The image generation unit 22 projects the data included in the four captured images SF, SB, SL, SR to the corresponding positions of the projection plane TS by using the table data.

The image generation unit 22 projects the data of the captured image SF of the front camera 5F to a part of the projection plane TS, which corresponds to the front of the vehicle 9. Also, the image generation unit 22 projects the data of the captured image SB of the rear camera 5B to a part of the projection plane TS, which corresponds to the rear of the vehicle 9. Also, the image generation unit 22 projects the data of the captured image SL of the left side camera 5L to a part of the projection plane TS, which corresponds to the left of the vehicle 9, and projects the data of a direction image SR of the right side camera 5R to a part of the projection plane TS, which corresponds to the right of the vehicle 9.

When the captured image data is projected to the projection plane TS in this way, the image generation unit 22 virtually configures a polygon model indicating a three dimensional shape of the vehicle 9 by using the vehicle body data 27b stored in the storage unit 27. The model of the vehicle 9 is arranged in a central area of the projection plane TS, which is the position of the vehicle 9 in the virtual three dimensional space.

Then, the image generation unit 22 sets a virtual perspective VP with respect to the three dimensional space under control of the image control unit 20a. The virtual perspective VP is defined by a position and a direction of the line of sight. The image generation unit 22 can set the virtual perspective VP at any position and in any direction of the line of sight in the three dimensional space.

Then, the image generation unit 22 generates a virtual perspective image CP by using an area of a part of the projection plane TS corresponding to the set virtual perspective VP. That is, the image generation unit 22 cuts, as an image, data of an area of the projection plane TS, which is included in a predetermined view angle as seen from the virtual perspective VP. The cut image includes a photographic subject image of the periphery of the vehicle 9. The image generation unit 22 makes a rendering for the model of the vehicle 9 in correspondence to the set virtual perspective VP and acquires a two-dimensional vehicle image 90. The image generation unit 22 superimposes the vehicle image 90 on the cut image. Thereby, the vehicle image 90 indicates a shape of the vehicle body of the vehicle 9 as seen from the virtual perspective VP. The image generation unit 22 generates a virtual perspective image CP indicative of the periphery of the vehicle 9 and the vehicle body of the vehicle 9 as seen from the virtual perspective VP.

For example, as shown in FIG. 4, when a virtual perspective VPa of which a position is set just above the vehicle 9 and the line of sight is made to face downwards is set, it is possible to generate a virtual perspective image (a bird's-eye view image) CPa looking down the periphery of the vehicle 9 and the vehicle body of the vehicle 9. Also, when a virtual perspective VPb of which a position is set at a left rear of the vehicle 9 and the line of sight is made to face towards the front of the vehicle 9 is set, it is possible to generate a virtual perspective image CPb indicating the periphery of the vehicle 9 and the vehicle body of the vehicle 9 as seen from the left rear of the vehicle 9.

In this illustrative embodiment, the image generation unit 22 can set the position of the virtual perspective VP not only at the outside of the vehicle 9 but also within the cabin of the vehicle 9. When the position of the virtual perspective VP is set within the cabin of the vehicle 9, it is possible to generate a virtual perspective image having realistic sensation indicating the periphery of the vehicle 9 and the vehicle body (interior) of the vehicle 9 as seen from the cabin of the vehicle 9.

<1-3. Operation Modes>

Figure 5:
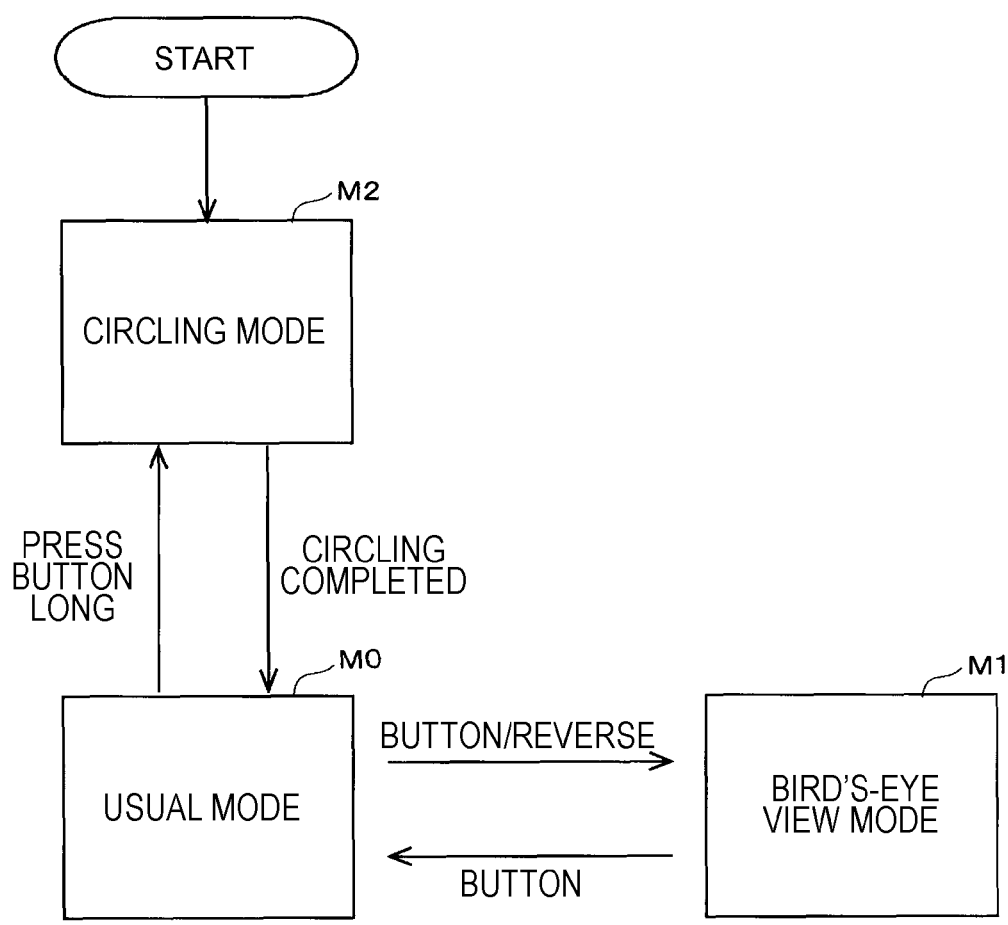
FIG. 5 depicts transitions of operation modes of the image display system shown in FIG. 1.

Subsequently, operation modes of the image display system 10 are described. FIG. 5 depicts transitions of the operation modes of the image display system 10. The image display system 10 has three operation modes of a usual mode M0, a bird's-eye view mode M1 and a circling mode M2. The operation modes are switched under control of the control unit 20, in correspondence to a state of the vehicle 9 and a user's operation.

The usual mode M0 is an operation mode in which a function of the image generation device 2 is not used. When the display device 3 has a navigation function, a map image and the like based on the navigation function are displayed on the display device 3, in the usual mode M0.

The bird's-eye view mode M1 and the circling mode M2 are operation modes of displaying the display image, which includes the virtual perspective image generated at the image generation device 2, on the display device 3 by using the function of the image generation device 2. Therefore, in these operation modes, the user can recognize the shape of the periphery of the vehicle 9 substantially in real time by checking the display image displayed on the display device 3.

Figure 6:
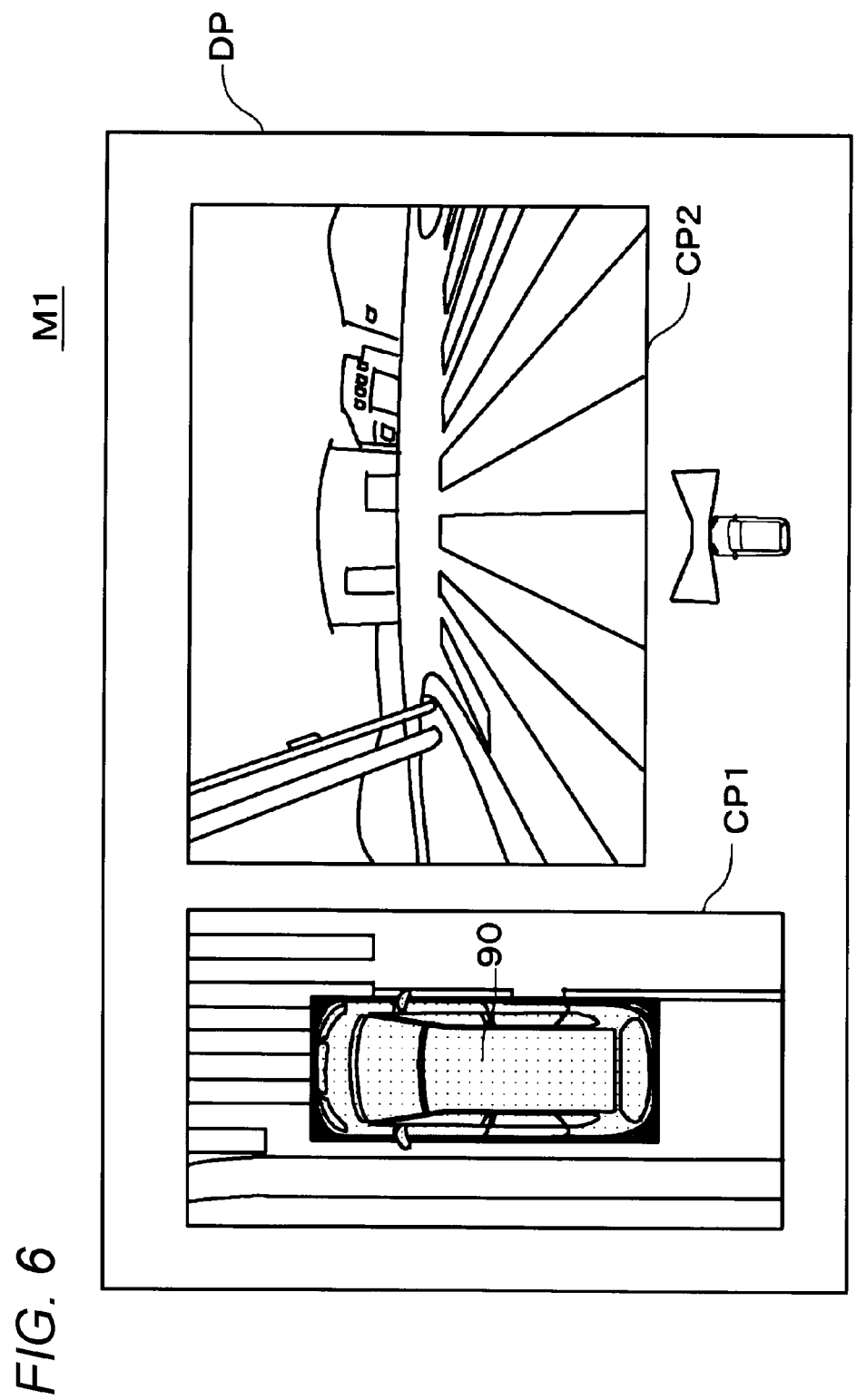
FIG. 6 depicts an example of a display image including a bird's-eye view image in the image display system shown in FIG. 1.

The bird's-eye view mode M1 is an operation mode of displaying a bird's-eye view image, which is a virtual perspective image looking down the periphery of the vehicle 9 from the perspective just above the vehicle 9. FIG. 6 depicts an example of a display image DP including a bird's-eye view image CP1, which is to be displayed in the bird's-eye view mode M1. The display image DP includes the bird's-eye view image CP1 and a camera perspective image CP2, which is a virtual perspective image indicating the periphery of the vehicle 9 as seen from the position of the camera 5.

The virtual perspective VP of the camera perspective image CP2 is selected on the basis of a traveling direction of the vehicle 9. When the vehicle 9 travels forwards, the virtual perspective VP, which is the same as the optical axis 5Fa of the front camera 5F, is set. When the vehicle 9 travels rearwards, the virtual perspective VP, which is the same as the optical axis 5Ba of the rear camera 5B, is set. The traveling direction of the vehicle 9 is determined by the image control unit 20a, based on a signal transmitted from the shift sensor 95. The user can recognize the entire shape of the surroundings of the vehicle 9 and the shape of the vehicle 9 in the traveling direction by checking the bird's-eye view image CP1 and the camera perspective image CP2.

Figure 7:
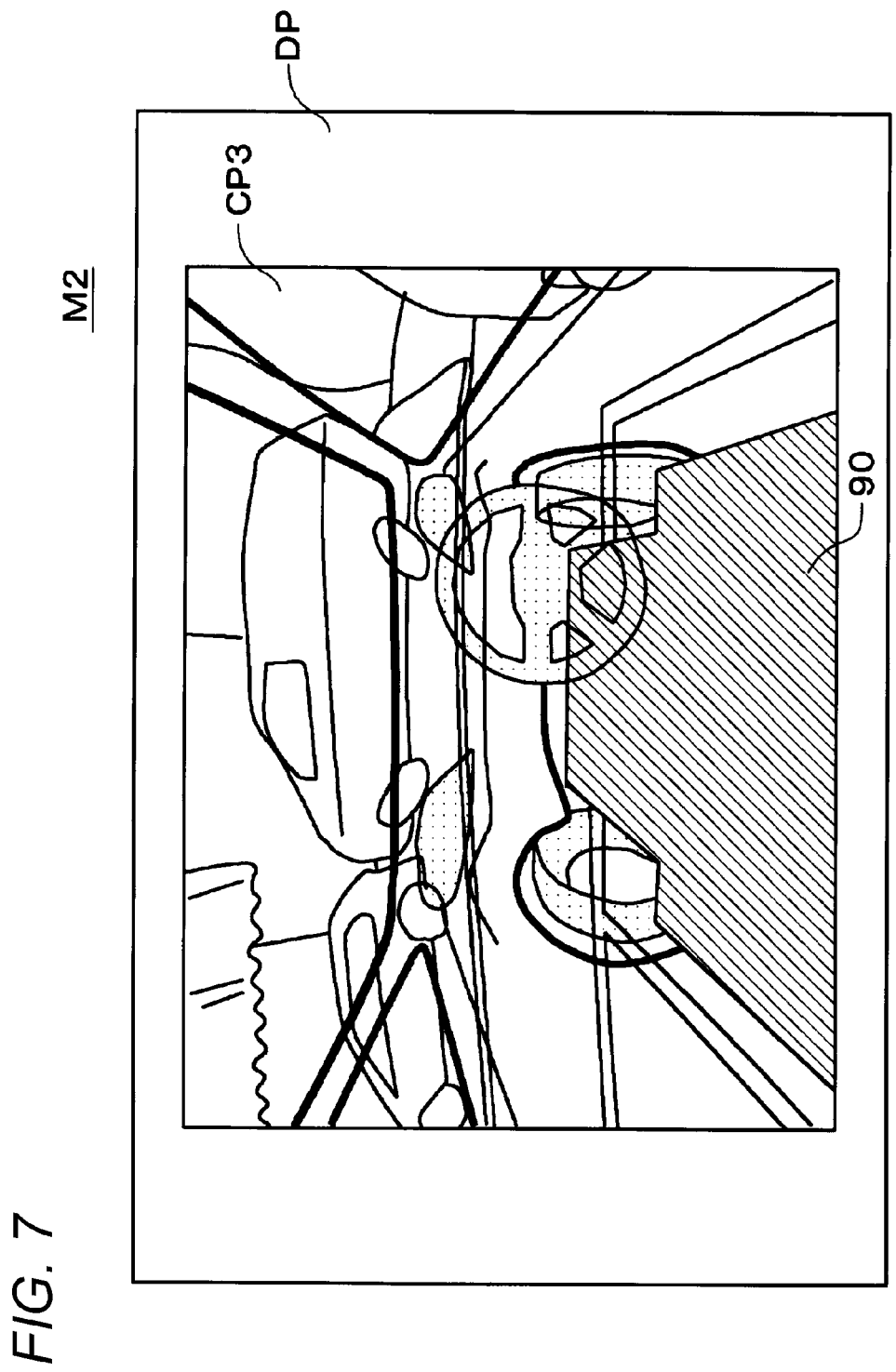
FIG. 7 depicts an example of the display image including an in-vehicle perspective image in the image display system shown in FIG. 1.

The circling mode M2 is an operation mode of displaying an in-vehicle perspective image, which is a virtual perspective image indicating the periphery of the vehicle 9 as seen from a perspective view within the cabin of the vehicle 9. FIG. 7 depicts an example of the display image DP including an in-vehicle perspective image CP3. The in-vehicle perspective image CP3 is an image in which a vehicle image 90 indicating the vehicle body (interior) of the vehicle 9 as seen from a perspective view within the cabin is superimposed on a photographic subject image of the periphery of the vehicle 9 as seen from a perspective within the cabin of the vehicle 9. The user can check the shape of the surroundings of the vehicle 9 from the perspective within the cabin and can also intuitively recognize the shape of the periphery of the vehicle 9 by checking the in-vehicle perspective image CP3. Also, the user can intuitively recognize which direction of the surroundings of the vehicle 9 the in-vehicle perspective image CP3 indicates, based on the vehicle image 90 included in the in-vehicle perspective image CP3.

The vehicle image 90 is divided into a part corresponding to a vehicle body bottom and a part except for the vehicle body bottom. In the vehicle image 90, the part corresponding to the vehicle body bottom is made to be non-transparent. On the other hand, the part except for the vehicle body bottom in the vehicle image 90 is made to be transparent or semi-transparent, except for parts having a feature such as a tire and a frame. Thereby, even when the vehicle image 90 is included in the in-vehicle perspective image CP3, it is possible to check the photographic subject image of the periphery of the vehicle 9.

In the circling mode M2, the in-vehicle perspective image is continuously displayed on the display device 3 and an animation indicating the shape of the periphery of the vehicle 9 as seen from the perspective within the cabin so as to circle the surroundings of the vehicle 9 is performed. Therefore, the user can check the entire surroundings of the vehicle 9 by using the circling mode M2.

As shown in FIG. 5, when the image display system 10 starts, the operation mode thereof is set to the circling mode M2. In the circling mode M2, the line of sight of the virtual perspective VP circles the surroundings of the vehicle 9. When the circling of the line of sight of the virtual perspective VP is completed, the operation mode is switched to the usual mode M0. Also, in the usual mode M0, when the user presses the operation button 4 long (when the user continues to press the operation button for a predetermined time period or longer), the operation mode is switched to the circling mode M2.

Also, in the usual mode M0, when the user presses the operation button 4 for a usual time period or the shift position of the vehicle 9 is reversed, the operation mode is switched to the bird's-eye view mode M1. Also, in the bird's-eye view mode M1, when the user presses the operation button 4, the operation mode is switched to the usual mode M0.

<1-4. Circling Mode>

Subsequently, the circling mode M2 is described in more detail. As described above, in the circling mode M2, an animation indicating the shape of the periphery of the vehicle 9 as seen from the perspective within the cabin so as to circle the surroundings of the vehicle 9 is performed.

For the animation, in the circling mode M2, the image control unit 20a is configured to alter the direction of the line of sight of the virtual perspective VP so that the line of sight of the virtual perspective VP circles the surroundings of the vehicle 9. Specifically, the image control unit 20a is configured to gradually alter an angle relative to the front-back direction of the vehicle 9 in a plan view of the line of sight of the virtual perspective VP (an angle relative to the front-back direction of the vehicle 9 when the vehicle 9 is seen from above; hereinafter, referred to as 'plan view angle'). While the image control unit 20a gradually alters the plan view angle of the line of sight of the virtual perspective VP in this way, the image generation unit 22 continuously (temporally continuously) generates the in-vehicle perspective image.

By continuously displaying the in-vehicle perspective image generated in this way on the display device 3, the animation indicating the shape of the periphery of the vehicle 9 so as to circle the surroundings of the vehicle 9 is performed. By checking the animation, the user can easily check the entire shape of the surroundings of the vehicle 9. The animation is performed for 20 seconds, for example.

<1-4-1. Movement of Position of Virtual Perspective>

In the circling mode M2, the image control unit 20a is configured to alter not only the direction (the plan view angle) of the line of sight of the virtual perspective VP but also the position of the virtual perspective VP.

Figure 8:
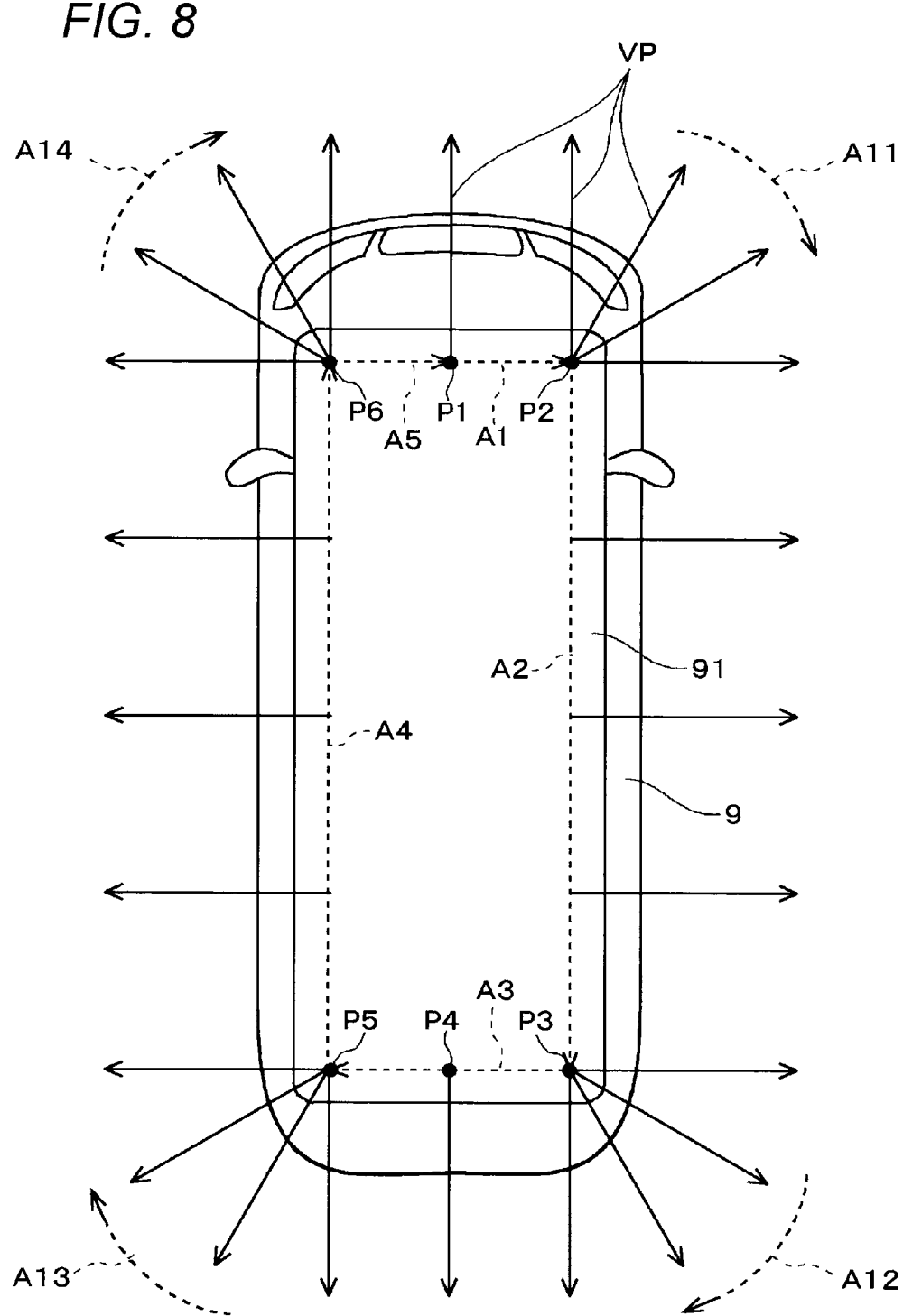
FIG. 8 depicts a moving path of a virtual perspective in the image display system shown in FIG. 1.

FIG. 8 depicts a moving path of the virtual perspective VP in the circling mode M2, showing the vehicle 9 in a plan view. In FIG. 8, each solid arrow indicates the virtual perspective VP, and a start point of the solid arrow indicates a position of the virtual perspective VP. A direction of the solid arrow indicates a direction of the line of sight of the virtual perspective VP in a plan view. That is, an angle of the solid arrow relative to the front-back direction of the vehicle 9 corresponds to a plan view angle of the line of sight of the virtual perspective VP.

As shown in FIG. 8, the image control unit 20a gradually alters the plan view angle of the line of sight of the virtual perspective VP so that the line of sight of the virtual perspective VP goes around the surroundings of the vehicle 9 in the right direction. Also, the image control unit 20a linearly moves the position of the virtual perspective VP in the front-back direction and in the left-right direction of the vehicle 9 along peripheral edges of the cabin 91 so as to go around the inside of the cabin 91 of the vehicle 9.

First, the image control unit 20a sets the plan view angle of the line of sight of the virtual perspective VP so that the line of sight of the virtual perspective VP faces towards the front in the front-back direction of the vehicle 9, which is an initial direction. Also, the image control unit 20a sets the position of the virtual perspective VP at a position of a front center (hereinafter, referred to as 'front central position') P1 of the cabin 91, which is an initial position.

Figure 9:
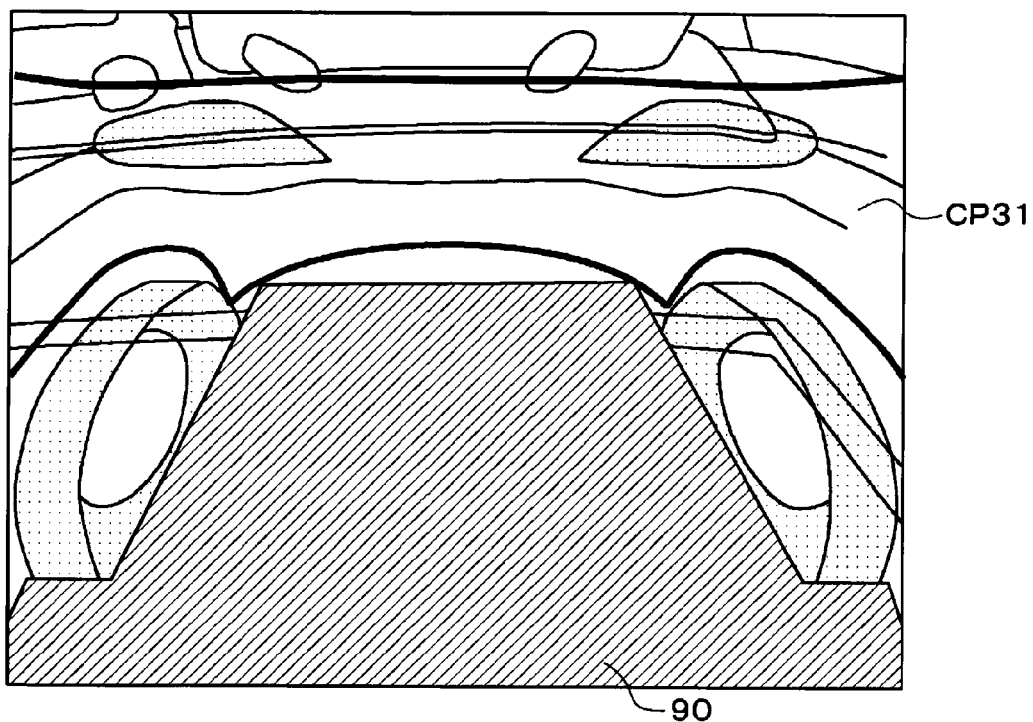
FIG. 9 depicts an example of the in-vehicle perspective image in the image display system shown in FIG. 1.

FIG. 9 depicts an example of an in-vehicle perspective image CP31 that is to be generated by the image generation unit 22 when the line of sight of the virtual perspective VP faces towards the front of the vehicle 9 and the position of the virtual perspective VP is the front central position P1. The in-vehicle perspective image CP31 is an image in which the vehicle image 90 indicating the front of the vehicle 9 is superimposed on a photographic subject image of the front of the vehicle 9.

Then, as shown in FIG. 8, the image control unit 20a continuously moves rightwards the position of the virtual perspective VP towards a front right end position P2 of the cabin 91 (a dashed arrow A1) with keeping the plan view angle of the line of sight of the virtual perspective VP. That is, the image control unit 20a moves rightwards the position of the virtual perspective VP along a front peripheral edge of the cabin 91 with keeping a state where the line of sight of the virtual perspective VP faces forwards.

When the position of the virtual perspective VP is moved to the front right end position P2, the image control unit 20a stops moving the position of the virtual perspective VP, and then continuously alters the plan view angle of the line of sight of the virtual perspective VP so that the line of sight of the virtual perspective VP faces towards the right in the left-right direction of the vehicle 9 (a dashed arrow A11). That is, the image control unit 20a alters the plan view angle of the line of sight of the virtual perspective VP in a clockwise direction by 90° with keeping the position of the virtual perspective VP at the front right end position P2.

When the line of sight of the virtual perspective VP faces towards the right of the vehicle 9, the image control unit 20a continuously moves rearwards the position of the virtual perspective VP towards a rear right end position P3 of the cabin 91 (a dashed arrow A2) with keeping the plan view angle of the line of sight of the virtual perspective VP. That is, the image control unit 20a moves rearwards the position of the virtual perspective VP along a right peripheral edge of the cabin 91 with keeping a state where the line of sight of the virtual perspective VP faces towards the right.

Figure 10:
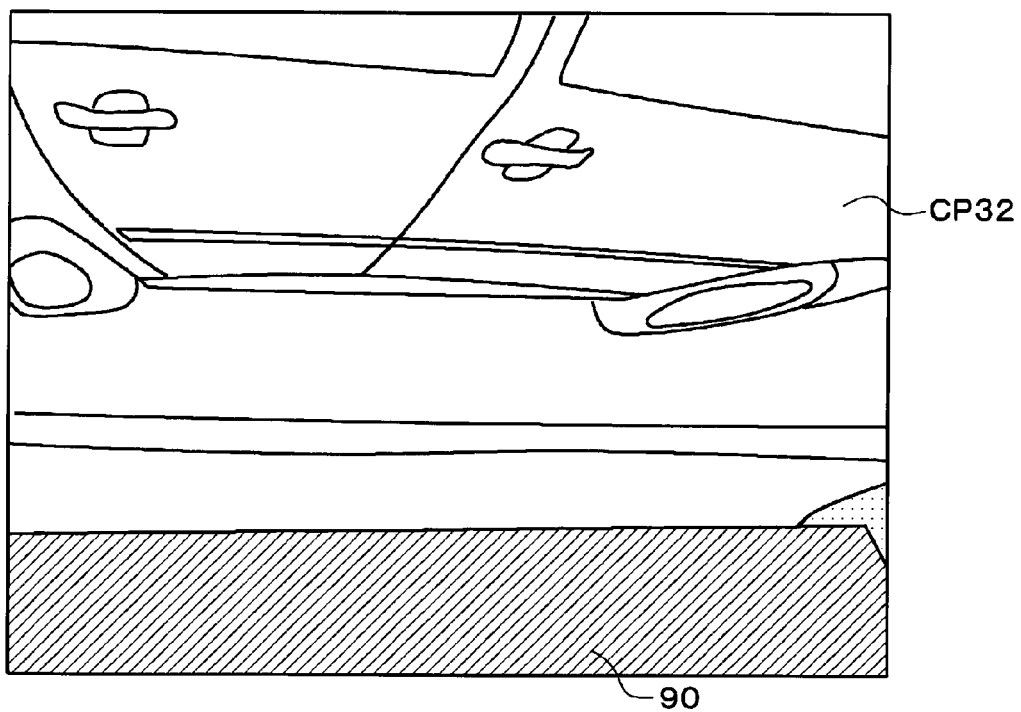
FIG. 10 depicts another example of the in-vehicle perspective image.

FIG. 10 depicts an example of an in-vehicle perspective image CP32 that is to be generated by the image generation unit 22 when the line of sight of the virtual perspective VP faces towards the right of the vehicle 9 and the position of the virtual perspective VP is moved along the right peripheral edge of the cabin 91. The in-vehicle perspective image CP32 is an image in which the vehicle image 90 indicating the right of the vehicle 9 is superimposed on a photographic subject image of the right of the vehicle 9.

As shown in FIG. 8, when the position of the virtual perspective VP is moved to the rear right end position P3, the image control unit 20a stops moving the position of the virtual perspective VP, and then continuously alters the plan view angle of the line of sight of the virtual perspective VP so that the line of sight of the virtual perspective VP faces towards the rear in the front-back direction of the vehicle 9 (a dashed arrow A12). That is, the image control unit 20a alters the plan view angle of the line of sight of the virtual perspective VP in the clockwise direction by 90° with keeping the position of the virtual perspective VP at the rear right end position P3.

When the line of sight of the virtual perspective VP faces towards the rear of the vehicle 9, the image control unit 20a continuously moves leftwards the position of the virtual perspective VP towards a rear left end position P5 of the cabin 91 (a dashed arrow A3) with keeping the plan view angle of the line of sight of the virtual perspective VP. That is, the image control unit 20a moves leftwards the position of the virtual perspective VP along a rear peripheral edge of the cabin 91 with keeping a state where the line of sight of the virtual perspective VP faces towards the rear. During the movement, the position of the virtual perspective VP passes a position of a rear center of the cabin 91 (hereinafter, referred to as 'rear central position') P4.

Figure 11:
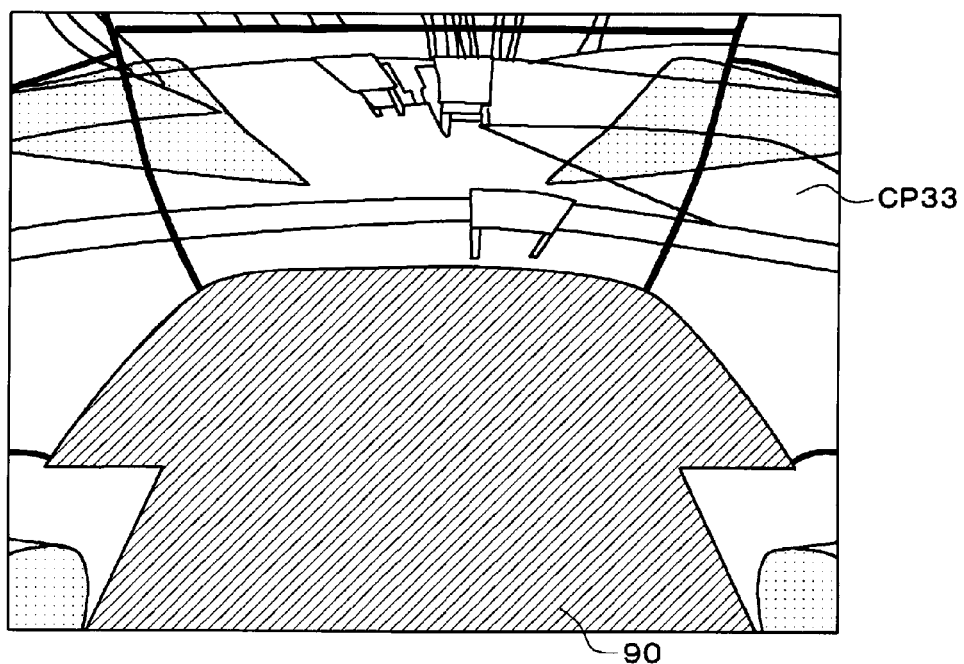
FIG. 11 depicts another example of the in-vehicle perspective image.

FIG. 11 depicts an example of an in-vehicle perspective image CP33 that is to be generated by the image generation unit 22 when the line of sight of the virtual perspective VP faces towards the rear of the vehicle 9 and the position of the virtual perspective VP is the rear central position P4. The in-vehicle perspective image CP33 is an image in which the vehicle image 90 indicating the rear of the vehicle 9 is superimposed on a photographic subject image of the rear of the vehicle 9.

As shown in FIG. 8, when the position of the virtual perspective VP is moved to the rear left end position P5, the image control unit 20a stops moving the position of the virtual perspective VP, and then continuously alters the plan view angle of the line of sight of the virtual perspective VP so that the line of sight of the virtual perspective VP faces towards the left in the left-right direction of the vehicle 9 (a dashed arrow A13). That is, the image control unit 20a alters the plan view angle of the line of sight of the virtual perspective VP in the clockwise direction by 90° with keeping the position of the virtual perspective VP at the rear left end position P5.

When the line of sight of the virtual perspective VP faces towards the left of the vehicle 9, the image control unit 20a continuously moves forwards the position of the virtual perspective VP towards a front left end position P6 of the cabin 91 (a dashed arrow A4) with keeping the plan view angle of the line of sight of the virtual perspective VP. That is, the image control unit 20a moves forwards the position of the virtual perspective VP along a left peripheral edge of the cabin 91 with keeping a state where the line of sight of the virtual perspective VP faces towards the left.

Figure 12:
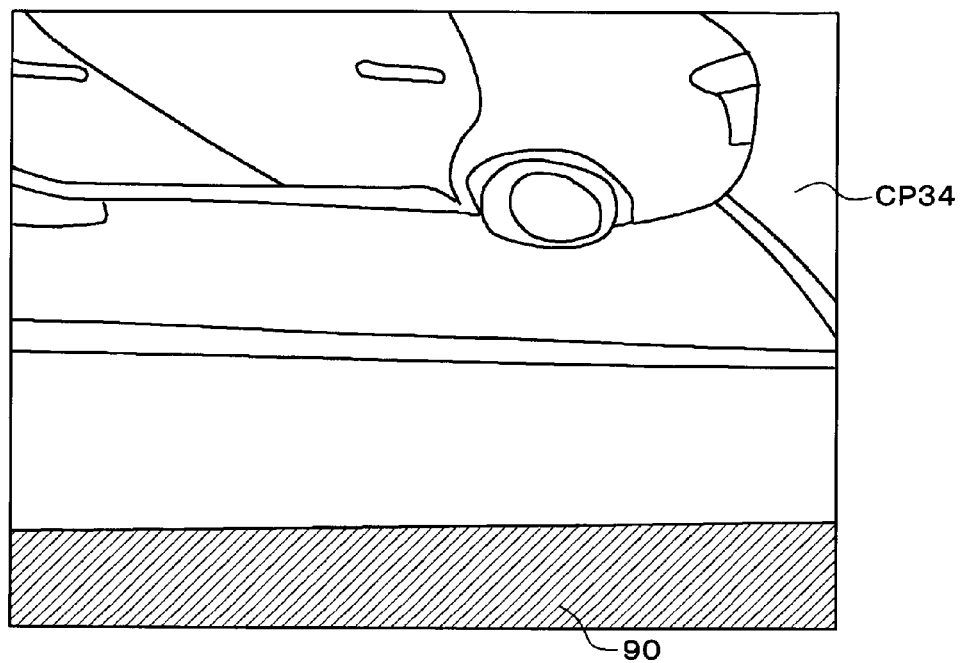
FIG. 12 depicts another example of the in-vehicle perspective image.

FIG. 12 depicts an example of an in-vehicle perspective image CP34 that is to be generated by the image generation unit 22 when the line of sight of the virtual perspective VP faces towards the left of the vehicle 9 and the position of the virtual perspective VP is moved along the left peripheral edge of the cabin 91. The in-vehicle perspective image CP34 is an image in which the vehicle image 90 indicating the left of the vehicle 9 is superimposed on a photographic subject image of the left of the vehicle 9.

As shown in FIG. 8, when the position of the virtual perspective VP is moved to the front left end position P6, the image control unit 20a stops moving the position of the virtual perspective VP, and then continuously alters the plan view angle of the line of sight of the virtual perspective VP so that the line of sight of the virtual perspective VP faces towards the front in the front-back direction of the vehicle 9 (a dashed arrow A14). That is, the image control unit 20a alters the plan view angle of the line of sight of the virtual perspective VP in the clockwise direction by 90° with keeping the position of the virtual perspective VP at the front left end position P6.

When the line of sight of the virtual perspective VP faces towards the front of the vehicle 9, the image control unit 20a continuously moves rightwards the position of the virtual perspective VP towards the front central position P1 (a dashed arrow A5) with keeping the plan view angle of the line of sight of the virtual perspective VP. That is, the image control unit 20a moves rightwards the position of the virtual perspective VP along the front peripheral edge of the cabin 91 with keeping a state where the line of sight of the virtual perspective VP faces towards the front.

Finally, the position of the virtual perspective VP is returned to the front central position P1, which is the initial position. When the position of the virtual perspective VP is returned to the front central position P1, the image generation unit 22 generates the same in-vehicle perspective image as the in-vehicle perspective image CP31 shown in FIG. 9.

In this way, the image control unit 20a is configured to move the position of the virtual perspective VP in correspondence to the direction of the line of sight of the virtual perspective VP, in the circling mode M2. That is, when making the line of sight of the virtual perspective VP face towards the front of the vehicle 9, the image control unit 20a moves the position of the virtual perspective VP to the front side of the cabin 91. Likewise, when making the line of sight of the virtual perspective VP face towards the rear of the vehicle 9, the image control unit 20a moves the position of the virtual perspective VP to the rear side of the cabin 91. Also, when making the line of sight of the virtual perspective VP face towards the right of the vehicle 9, the image control unit 20a moves the position of the virtual perspective VP to the right side of the cabin 91. When making the line of sight of the virtual perspective VP face towards the left of the vehicle 9, the image control unit 20a moves the position of the virtual perspective VP to the left side of the cabin 91. In this way, the position of the virtual perspective VP is moved in correspondence to the direction of the line of sight of the virtual perspective VP, so that it is possible to improve the visibility of the photographic subject image of the vehicle 9 included in the in-vehicle perspective image.

Figure 13:
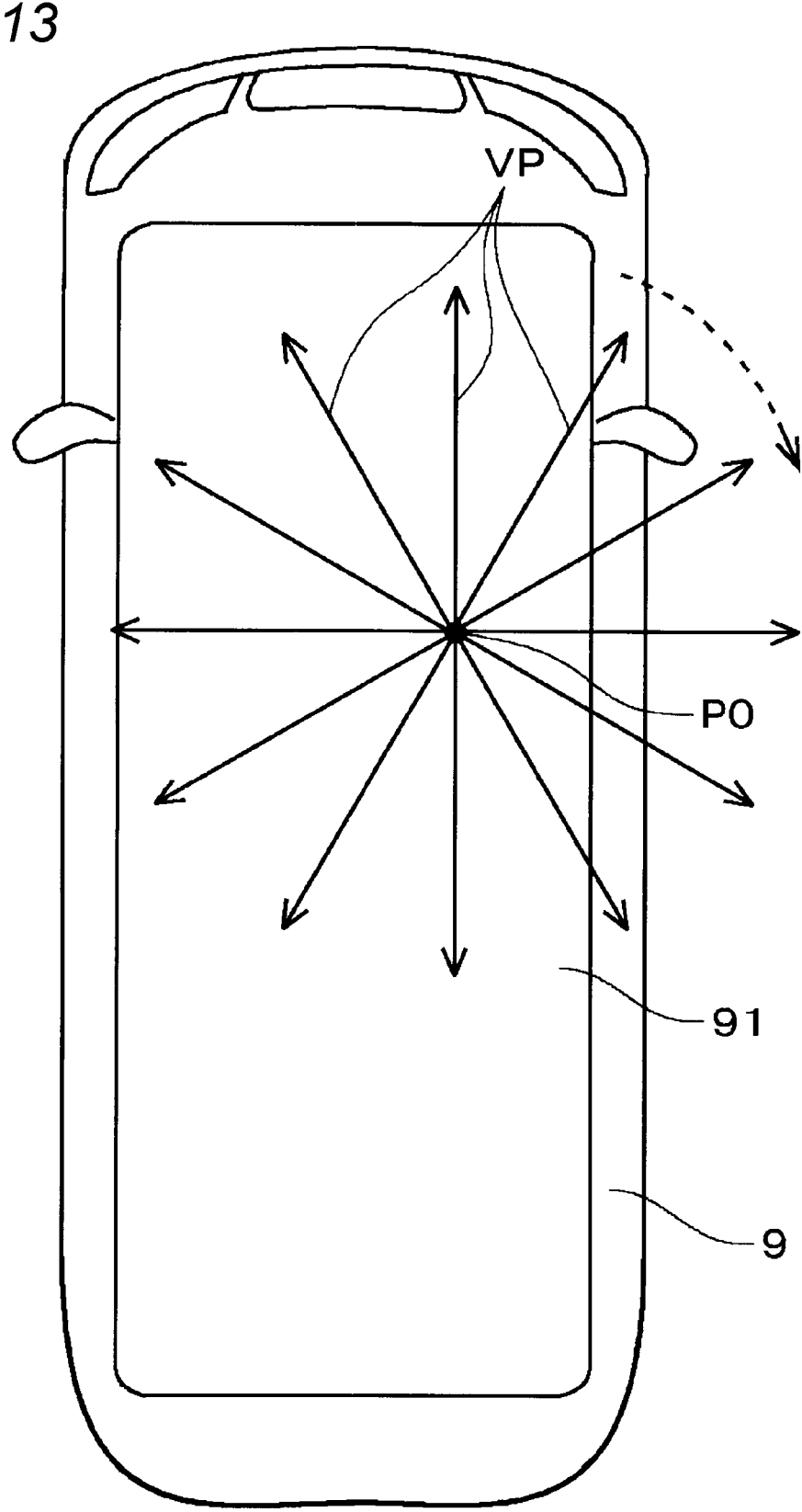
FIG. 13 depicts a moving path of the virtual perspective in a comparative example.
Figure 14:
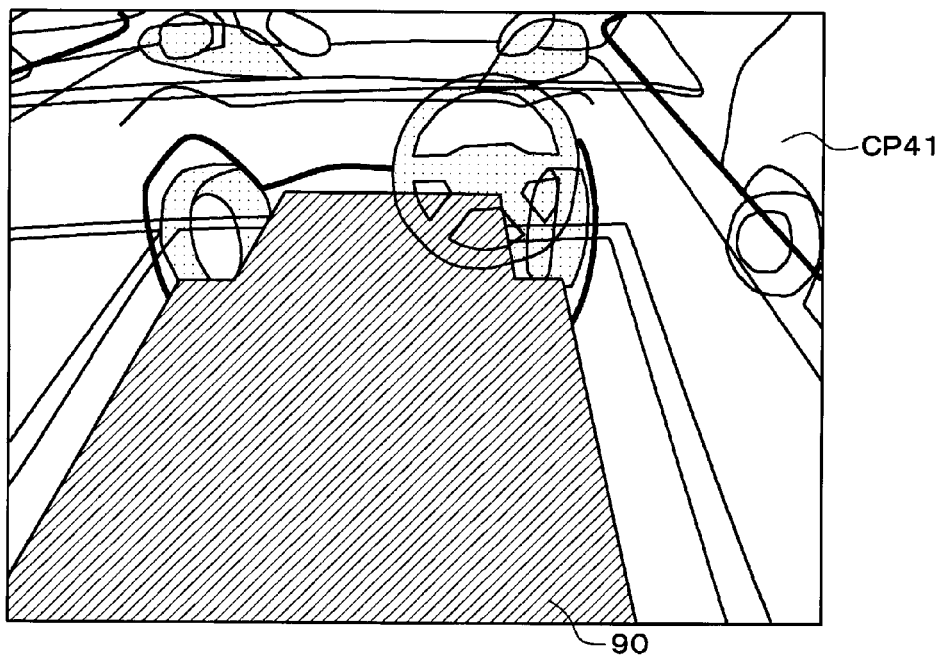
FIG. 14 depicts an example of the in-vehicle perspective image generated by the virtual perspective in accordance with the comparative example.
Figure 15:
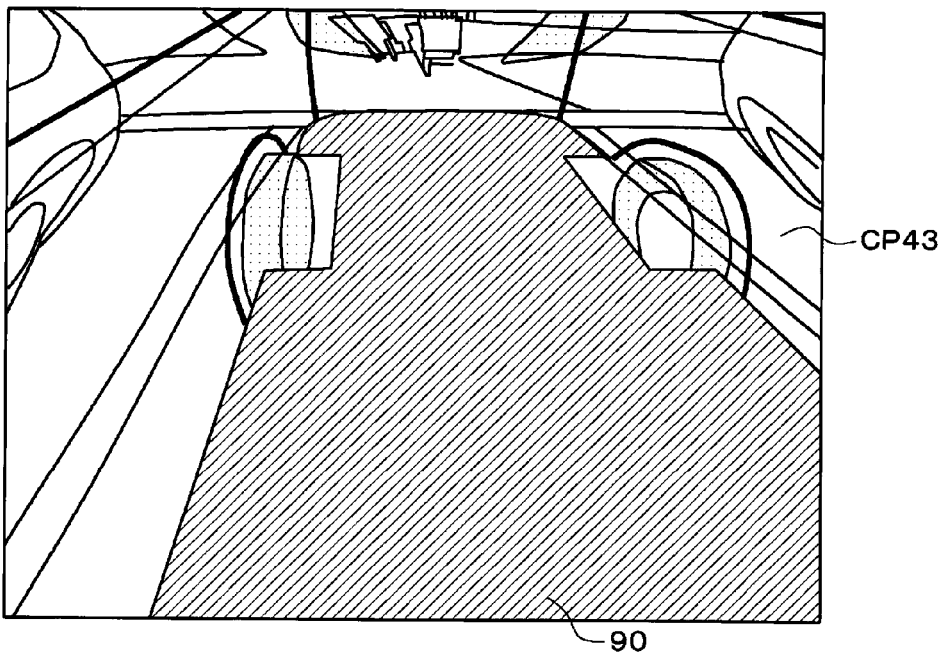
FIG. 15 depicts another example of the in-vehicle perspective image generated by the virtual perspective in accordance with the comparative example.

FIG. 13 depicts a moving path of the virtual perspective VP in a comparative example. According to the comparative example, in the circling mode, the position of the virtual perspective VP is not moved and is fixed at a position P0 corresponding to the driver's perspective within the cabin 91. Also, the plan view angle of the line of sight of the virtual perspective VP is continuously altered so that the line of sight of the virtual perspective VP goes around in the clockwise direction. FIG. 14 depicts an example of an in-vehicle perspective image CP41 that is to be generated when the line of sight of the virtual perspective VP faces towards the front of the vehicle 9, in the comparative example. FIG. 15 depicts an example of an in-vehicle perspective image CP43 that is to be generated when the line of sight of the virtual perspective VP faces towards the rear of the vehicle 9, in the comparative example.

As can be seen from comparisons of FIGS. 14 and 9 and FIGS. 15 and 11, in the in-vehicle perspective images CP41, CP43 of the comparative example, the vehicle image 90 includes many parts of the vehicle body beyond necessity, as compared to the in-vehicle perspective images CP31, CP33 of this illustrative embodiment. For this reason, the vehicle image 90 may deteriorate the visibility of the photographic subject image of the periphery of the vehicle 9. Also, in the in-vehicle perspective images CP41, CP43 of the comparative example, since a distance from the position of the virtual perspective VP to the photographic subject of the periphery of the vehicle 9 is long, the photographic subject image to be checked becomes smaller, so that the visibility of the photographic subject image is lowered.

On the other hand, according to this illustrative embodiment, the image control unit 20a moves the position of the virtual perspective VP in correspondence to the direction of the line of sight of the virtual perspective VP. For this reason, it is possible to reduce the parts of the vehicle body to be indicated as the vehicle image 90 to be included in the in-vehicle perspective image. Also, since a distance from the position of the virtual perspective VP to the photographic subject of the periphery of the vehicle 9 is short, it is possible to enlarge the photographic subject image to be checked. As a result, it is possible to improve the visibility of the photographic subject image of the periphery of the vehicle 9 to be included in the in-vehicle perspective image.

In general, since the vehicle is long in the front-back direction, it is possible to effectively improve the visibility of the photographic subject image included in the in-vehicle perspective image by moving the position of the virtual perspective VP in the front-back direction of the vehicle, in correspondence to the direction of the line of sight of the virtual perspective VP. Also, according to this illustrative embodiment, the image control unit 20a is configured to move the position of the virtual perspective VP in the front-back direction and in the left-right direction of the vehicle, in correspondence to the direction of the line of sight of the virtual perspective VP. For this reason, it is possible to more effectively improve the visibility of the photographic subject image to be included in the in-vehicle perspective image. Also, the image control unit 20a is configured to move the line of sight of the virtual perspective VP along the peripheral edges of the cabin of the vehicle. For this reason, it is possible to reduce the parts of the vehicle body to be indicated as the vehicle image 90 to be included in the in-vehicle perspective image and to enlarge the photographic subject image to be checked.

Also, according to this illustrative embodiment, the image control unit 20a is configured to keep the position of the virtual perspective VP while altering the plan view angle of the line of sight of the virtual perspective VP and to keep the plan view angle of the line of sight of the virtual perspective while moving the position of the virtual perspective, in the circling mode M2. That is, the image control unit 20a is configured not to alter the plan view angle of the line of sight of the virtual perspective VP and the position of the virtual perspective VP at the same time, but to keep the one while altering the other. Thereby, the movement of the line of sight of the virtual perspective VP is not complex, and the in-vehicle perspective images to be continuously generated in the circling mode M2 can be indicated so that the shape of the periphery of the vehicle 9 can be easily understood.

<1-4-2. Adjustment of Depression Angle of Virtual Perspective>

The direction of the line of sight of the virtual perspective VP is defined by the plan view angle and the depression angle (a downward angle on the basis of the horizontal direction). In the circling mode M2, the image control unit 20a is configured to adjust the depression angle of the line of sight of the virtual perspective VP, too.

Figure 16:
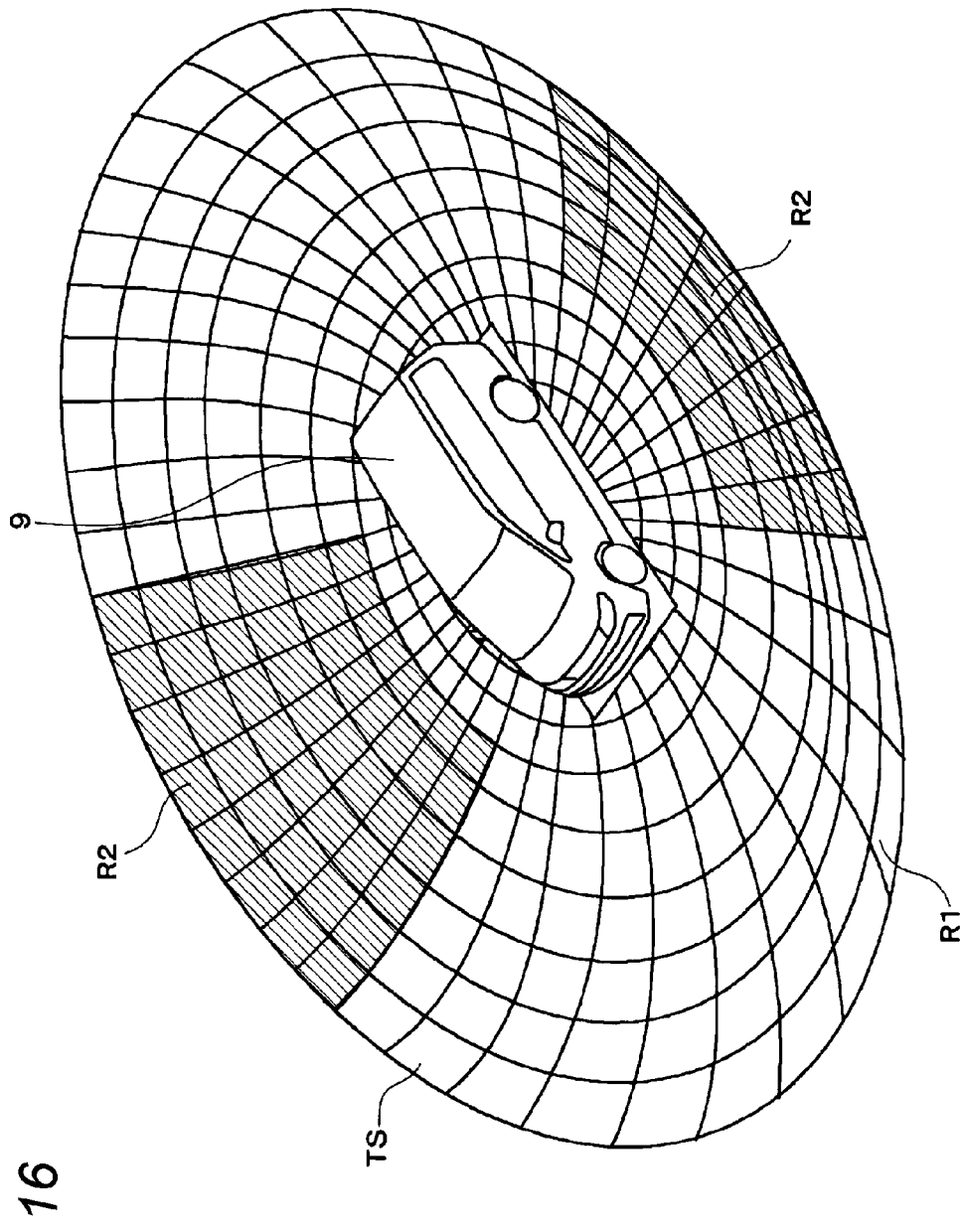
FIG. 16 depicts a projection plane that is to be used for generation of the virtual perspective image in the image display system of FIG. 1.

FIG. 16 depicts the projection plane TS that is to be used for generation of the virtual perspective image. As shown in FIG. 16, the projection plane TS includes an area (hereinafter, referred to as 'non-projection area') R2 to which the captured image data is not to be projected at an outside of an area (hereinafter, referred to as 'projection area') R1 to which the captured image data is to be projected.

As described above, the front camera 5F, the rear camera 5B, and the side cameras 5L, 5R have the different depression angles of the optical axes and also have the different distances within which the capturing can be made in a direction of getting away from the vehicle 9. The left and right side cameras 5L, 5R can capture areas relatively close to the vehicle 9 and cannot capture areas relatively distant from the vehicle 9. For this reason, as shown in FIG. 16, the non-projection areas R2 having no data are generated at parts on the projection plane TS, which correspond to the left and the right of the vehicle 9.

If the non-projection areas R2 are not considered, the image generation unit 22 may generate an in-vehicle perspective image by using the areas including the non-projection areas R2 on the projection plane TS, in the circling mode M2. That is, the in-vehicle perspective image may include the non-projection areas R2. Since the non-projection area R2 does not have data, an area of a part of the in-vehicle perspective image including the non-projection area R2 becomes a single color (in general, black) without indicating a photographic subject image of the periphery of the vehicle 9. When the user sees the in-vehicle perspective image, the user may feel uncomfortable.

In order to cope with the above problem, the image control unit 20a of this illustrative embodiment is configured to adjust the depression angle of the line of sight of the virtual perspective VP in the circling mode M2 so that the in-vehicle perspective image does not include the non-projection area R2 on the projection plane TS.

Figure 17:
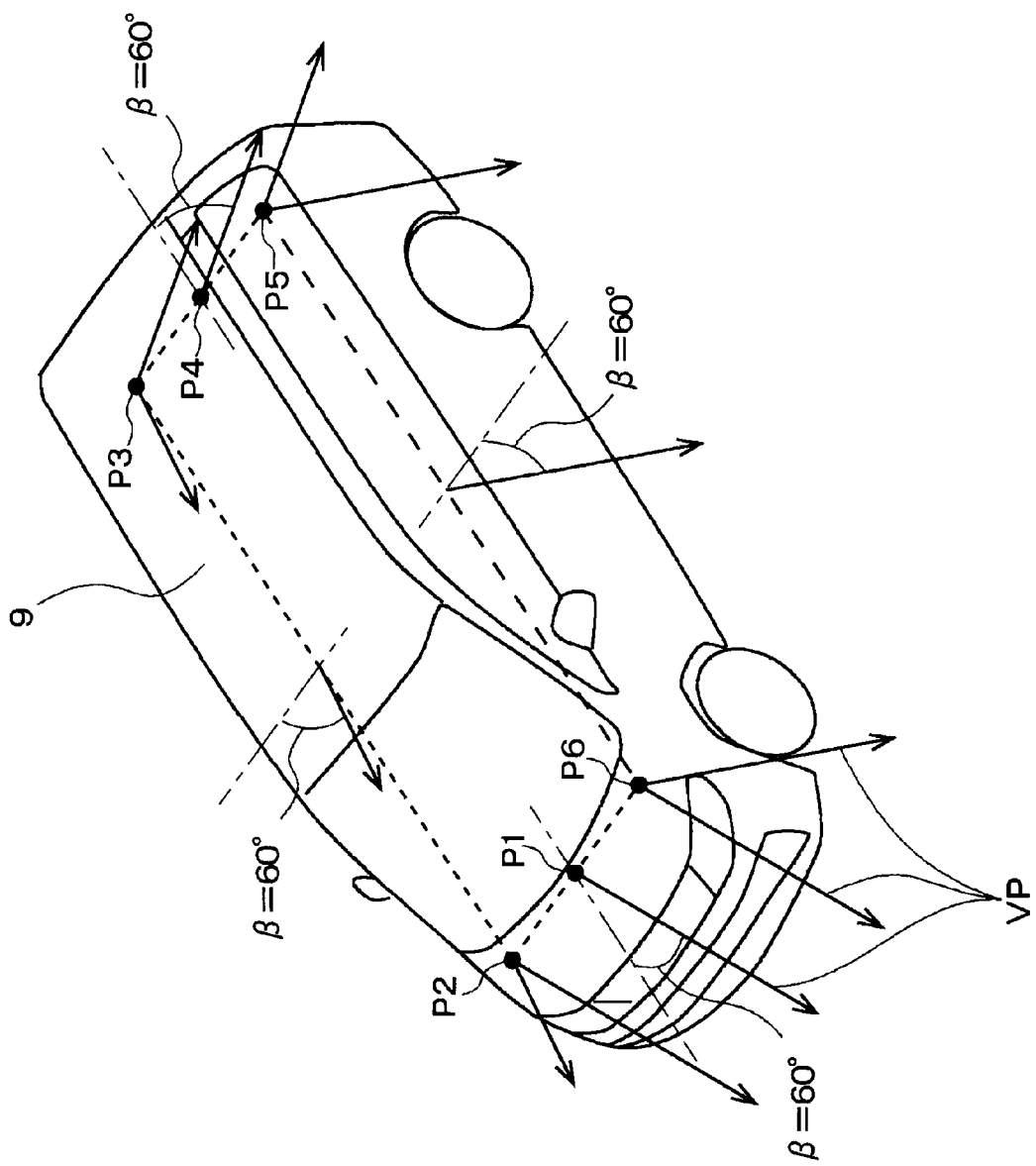
FIG. 17 depicts a depression angle of a line of sight of the virtual perspective in the image display system of FIG. 1.

FIG. 17 depicts a depression angle β of the line of sight of the virtual perspective VP adjusted by the image control unit 20a. On the projection plane TS, a size of the projection area R1 (a length in the direction of getting away from the vehicle 9) becomes smallest and a size of the non-projection area R2 (a length in the direction of getting away from the vehicle 9) becomes greatest at the left and the right of the entire surroundings of the vehicle 9 (refer to FIG. 16). When the image control unit 20a sets the depression angle β of the line of sight of the virtual perspective VP to a specific angle (for example, 60°), the in-vehicle perspective image can be made not to include the non-projection area R2 even though the line of sight of the virtual perspective VP is made to face towards the left or the right of the vehicle 9.

For this reason, the image control unit 20a is configured to set the depression angle β of the line of sight of the virtual perspective VP to the specific angle (60°) in the circling mode M2. As shown in FIG. 17, the image control unit 20a always keeps the depression angle β of the line of sight of the virtual perspective VP at the specific angle (60°), even though the plan view angle of the line of sight of the virtual perspective VP is altered so that the line of sight of the virtual perspective VP circles the surroundings of the vehicle 9. That is, the image control unit 20a is configured to keep the depression angle β of the line of sight of the virtual perspective VP at the specific angle (60°), irrespective of the direction of the line of sight of the virtual perspective.

Figure 18:
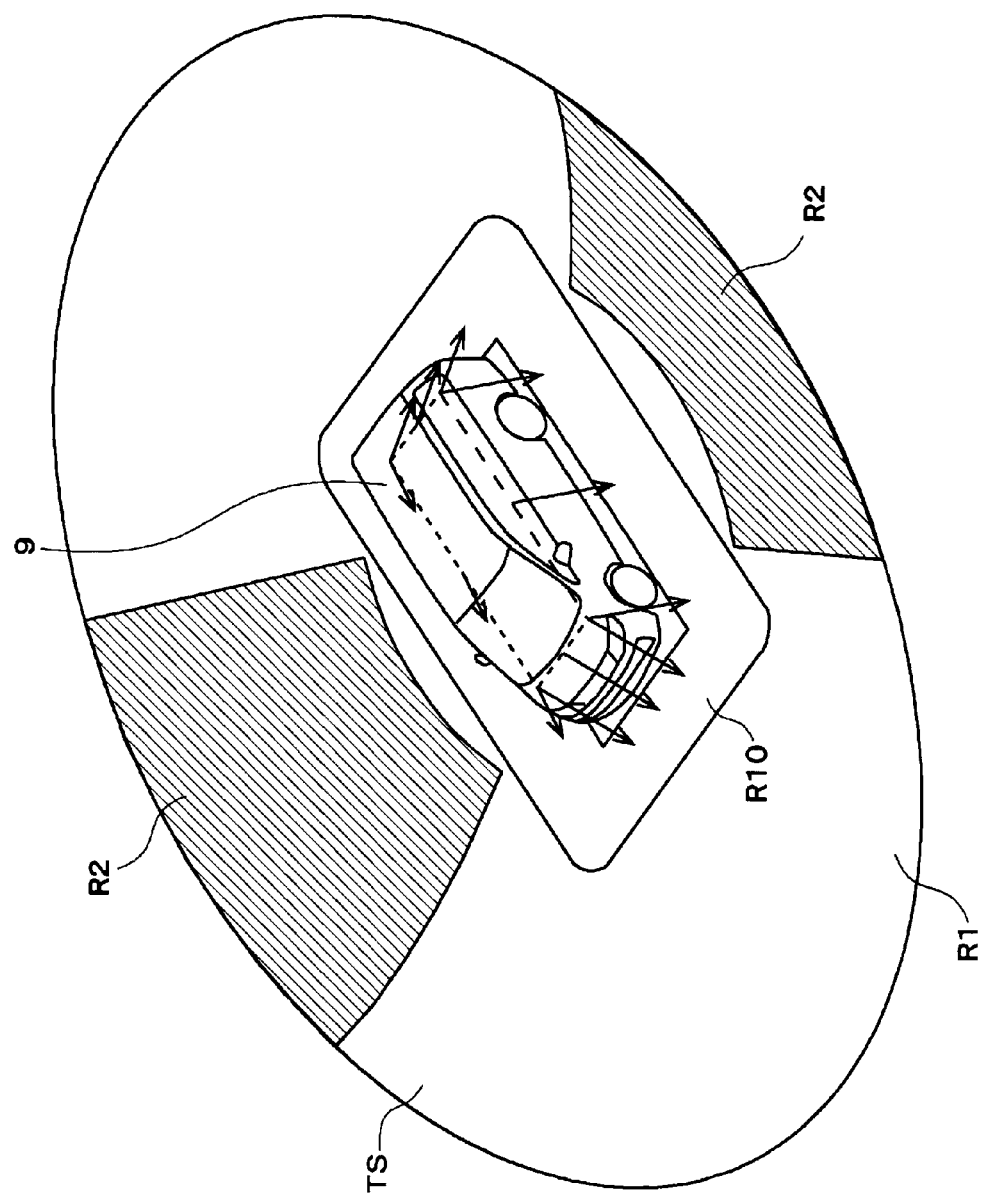
FIG. 18 depicts a using area that is to be used for generation of the in-vehicle perspective image in the image display system of FIG. 1.

FIG. 18 depicts a using area R10 of the projection plane TS, which is to be used for generation of the in-vehicle perspective image by the image generation unit 22, when the depression angle β of the line of sight of the virtual perspective VP is adjusted as described above with reference to FIG. 17. The using area R10 is an area surrounding the vehicle 9 relatively in the vicinity of the vehicle 9. The using area R10 includes only the projection area R1 having data and does not include the non-projection areas R2 having no data.

When the depression angle β of the line of sight of the virtual perspective VP is kept at the specific angle (60°), even though the line of sight of the virtual perspective VP is made to face towards a direction in which the size of the projection area R1 becomes smallest, the in-vehicle perspective image does not include the non-projection areas R2. For this reason, even though the line of sight of the virtual perspective VP is made to face towards the other direction, the in-vehicle perspective image does not include the non-projection areas R2. Therefore, in the circling mode M2, even when the plan view angle of the line of sight of the virtual perspective VP is altered so as to circle the surroundings of the vehicle 9, the in-vehicle perspective image can be made not to include the non-projection areas R2 all the time. As a result, it is possible to prevent the user who sees the in-vehicle perspective image from feeling uncomfortable.

Also, in the circling mode M2, the image control unit 20a is configured to keep the depression angle β of the line of sight of the virtual perspective VP. Therefore, the movement of the line of sight of the virtual perspective VP is not complex. For this reason, the in-vehicle perspective images to be continuously generated in the circling mode M2 can be indicated so that the shape of the periphery of the vehicle 9 can be easily understood.

<1-4-3. Operation Flow>

Figure 19:
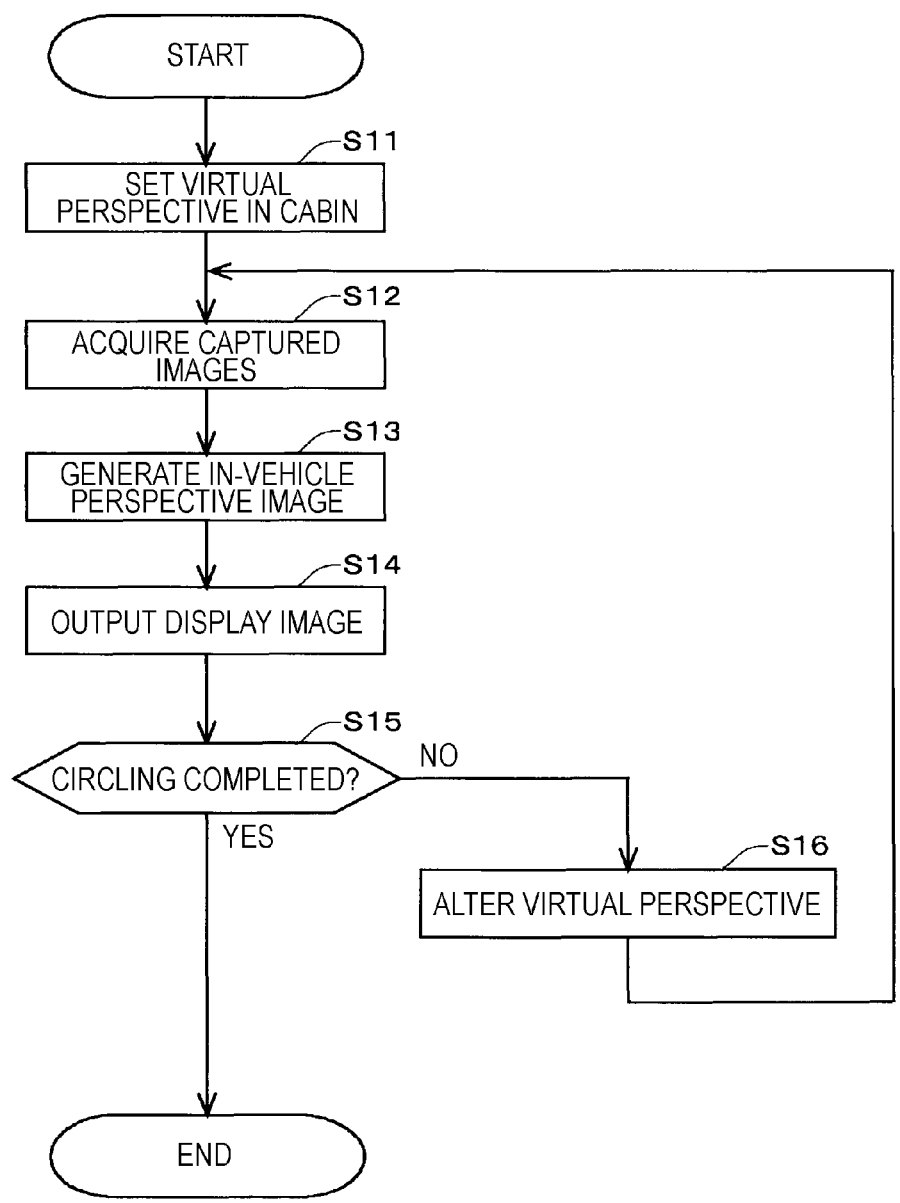
FIG. 19 depicts an operation flow of the image display system of FIG. 1.

Subsequently, an operation flow of the image display system 10 in the circling mode M2 is described with reference to FIG. 19.

When the operation mode is the circling mode M2, the image control unit 20a first sets the virtual perspective VP within the cabin (step S11). The image control unit 20a sets the plan view angle so that the line of sight of the virtual perspective VP faces towards the front of the vehicle 9, which is the initial direction, and also sets the position of the virtual perspective VP to the front central position P1, which is the initial position. Also, the image control unit 20a sets the depression angle of the line of sight of the virtual perspective VP to the specific angle (60°) at which the virtual perspective image does not include the non-projection area R2 even when the line of sight of the virtual perspective VP is made to face towards the left or the right of the vehicle 9.

Then, each of the four cameras 5 provided for the vehicle 9 captures the periphery of the vehicle 9. The image acquisition unit 21 acquires the four captured image data obtained from each of the four cameras 5 (step S12).

Then, the image generation unit 22 generates the in-vehicle perspective image by using the four acquired captured image data (step S13). Then, the image adjustment unit 23 generates the display image DP including the generated in-vehicle perspective image, and the image output unit 24 outputs the display image DP to the display device 3 (step S14). Thereby, the display image DP including the in-vehicle perspective image is displayed on the display device 3.

Then, the image control unit 20a alters the plan view angle of the line of sight of the virtual perspective VP or the position of the virtual perspective VP (step S16). Then, the processing returns to step S12, and the same processing as steps S12 to S14 is repeated. The processing (steps S12 to S14 and S16) is repeated with a predetermined period (for example, a period of 1/30 second).

In step S16, the image control unit 20a does not alter the plan view angle of the line of sight of the virtual perspective VP and the position of the virtual perspective VP at the same time, but keeps the one while altering the other, as described above (refer to FIG. 8). Also, the image control unit 20a keeps the depression angle of the line of sight of the virtual perspective VP at the specific angle, irrespective of the plan view angle of the line of sight of the virtual perspective VP and the position of the virtual perspective VP (refer to FIG. 17).

By the above processing, the image generation unit 22 continuously generates the in-vehicle perspective image while the image control unit 20a gradually alters the virtual perspective VP. As a result, the animation indicating the shape of the periphery of the vehicle 9 so as to circle the surroundings of the vehicle 9 is performed on the display device 3.

When the line of sight of the virtual perspective VP goes around the surroundings of the vehicle 9 and the position of the virtual perspective VP returns to the front central position P1, which is the initial position (YES in step S15), the operation of the image display system 10 in the circling mode M2 is over.

2. Second Illustrative Embodiment

Subsequently, a second illustrative embodiment is described. In the below, the differences from the first illustrative embodiment are mainly described, and the descriptions about the same or similar configurations and operations as or to the first illustrative embodiment are omitted.

In the first illustrative embodiment, the image control unit 20a is configured not to alter the plan view angle of the line of sight of the virtual perspective VP and the position of the virtual perspective VP at the same time in the circling mode M2. In the second illustrative embodiment, the image control unit 20a is configured to alter the plan view angle of the line of sight of the virtual perspective VP and the position of the virtual perspective VP at the same time alter.

Figure 20:
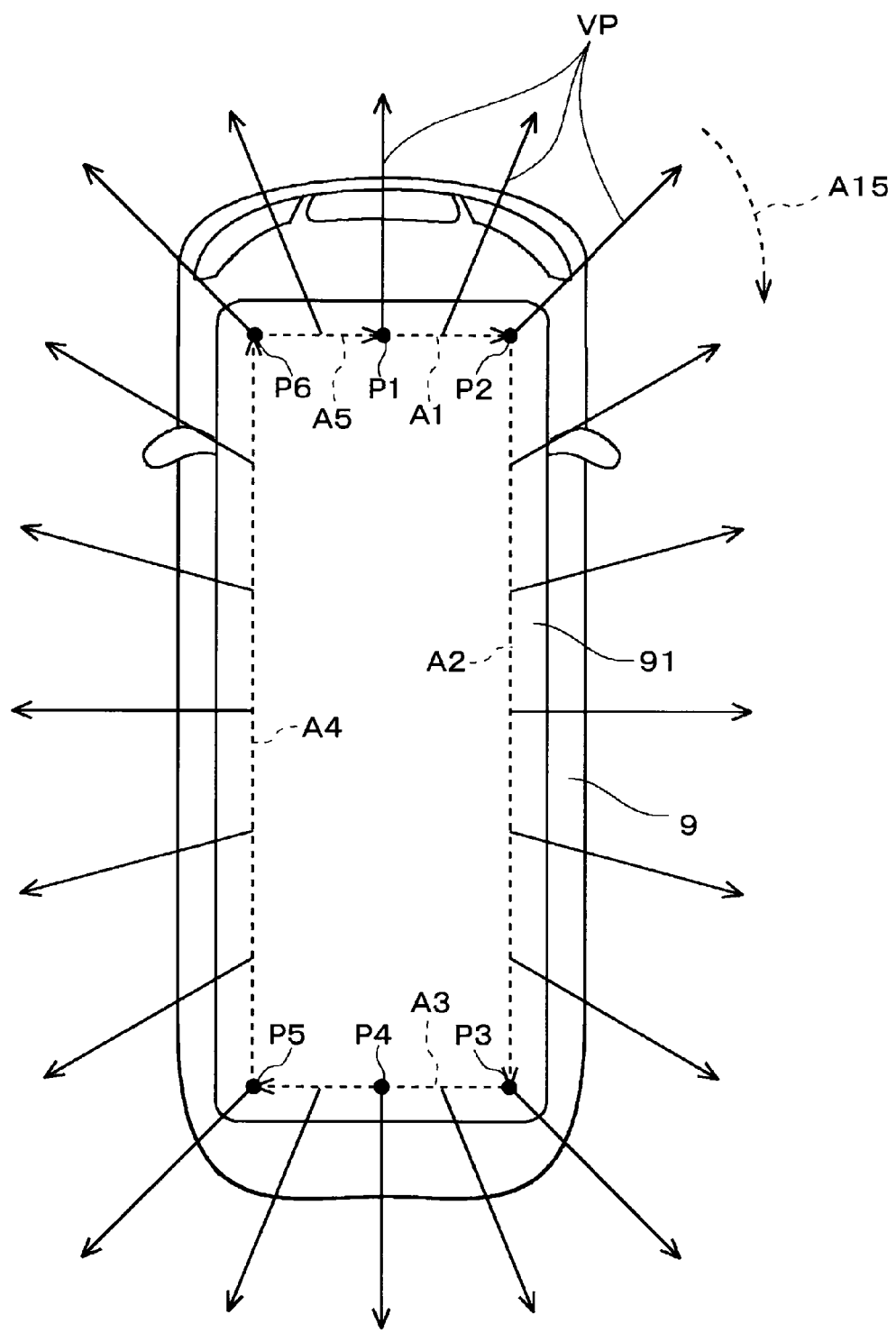
FIG. 20 depicts a moving path of the virtual perspective in an image display system in accordance with a second illustrative embodiment.

FIG. 20 depicts a moving path of the virtual perspective VP in the circling mode M2 of the second illustrative embodiment. Like the first illustrative embodiment, also in the second illustrative embodiment, the image control unit 20a is configured to linearly move the position of the virtual perspective VP along the peripheral edges of the cabin 91 so as to go around (from the front central position P1 to the front central position P1 again via the positions P2 to P6) the inside of the cabin 91 of the vehicle 9. However, the image control unit 20a is configured to continuously move the position of the virtual perspective VP without stopping the position of the virtual perspective VP at the positions P2, P3, P5, P6.

Also, the image control unit 20a is configured to continuously alter the plan view angle of the line of sight of the virtual perspective VP during the movement of the position of the virtual perspective VP (a dashed arrow A15). Thereby, in the circling mode M2, the plan view angle of the line of sight of the virtual perspective VP and the position of the virtual perspective VP are altered at the same time.

Also in the second illustrative embodiment, the image control unit 20a is configured to move the position of the virtual perspective VP in the circling mode M2, in correspondence to the direction of the line of sight of the virtual perspective VP. That is, when the line of sight of the virtual perspective VP is made to face towards the front of the vehicle 9, the image control unit 20a moves the position of the virtual perspective VP to the front side of the cabin 91. Likewise, when the line of sight of the virtual perspective VP is made to face towards the rear of the vehicle 9, the image control unit 20a moves the position of the virtual perspective VP to the rear side of the cabin 91. Also, when the line of sight of the virtual perspective VP is made to face towards the right of the vehicle 9, the image control unit 20a moves the position of the virtual perspective VP to the right side of the cabin 91. Also, when the line of sight of the virtual perspective VP is made to face towards the left of the vehicle 9, the image control unit 20a moves the position of the virtual perspective VP to the left side of the cabin 91. Thereby, it is possible to improve the visibility of a photographic subject image of the vehicle 9 that is to be included in the in-vehicle perspective image.

As described above, in the second illustrative embodiment, since the plan view angle of the line of sight of the virtual perspective VP and the position of the virtual perspective VP are altered at the same time, it is possible to shorten a time period for which the line of sight of the virtual perspective circles the surroundings of the vehicle 9. That is, it is possible to relatively shorten a time period for which the animation indicating the shape of the periphery of the vehicle 9 so as to circle the surroundings of the vehicle 9 is performed (for example, 15 seconds). Therefore, the user can check the entire shape of the surroundings of the vehicle 9 in a relatively short time period.

3. Third Illustrative Embodiment

Subsequently, a third illustrative embodiment is described. In the below, the differences from the second illustrative embodiment are mainly described, and the descriptions about the same or similar configurations and operations as or to the second illustrative embodiment are omitted.

In the second illustrative embodiment, the image control unit 20a is configured to linearly move the position of the virtual perspective VP along the peripheral edges of the cabin 91. In the third illustrative embodiment, the image control unit 20a is configured to move the position of the virtual perspective VP in a substantially elliptical shape. Also in the third illustrative embodiment, the image control unit 20a is configured to alter the plan view angle of the line of sight of the virtual perspective VP and the position of the virtual perspective VP at the same time.

Figure 21:
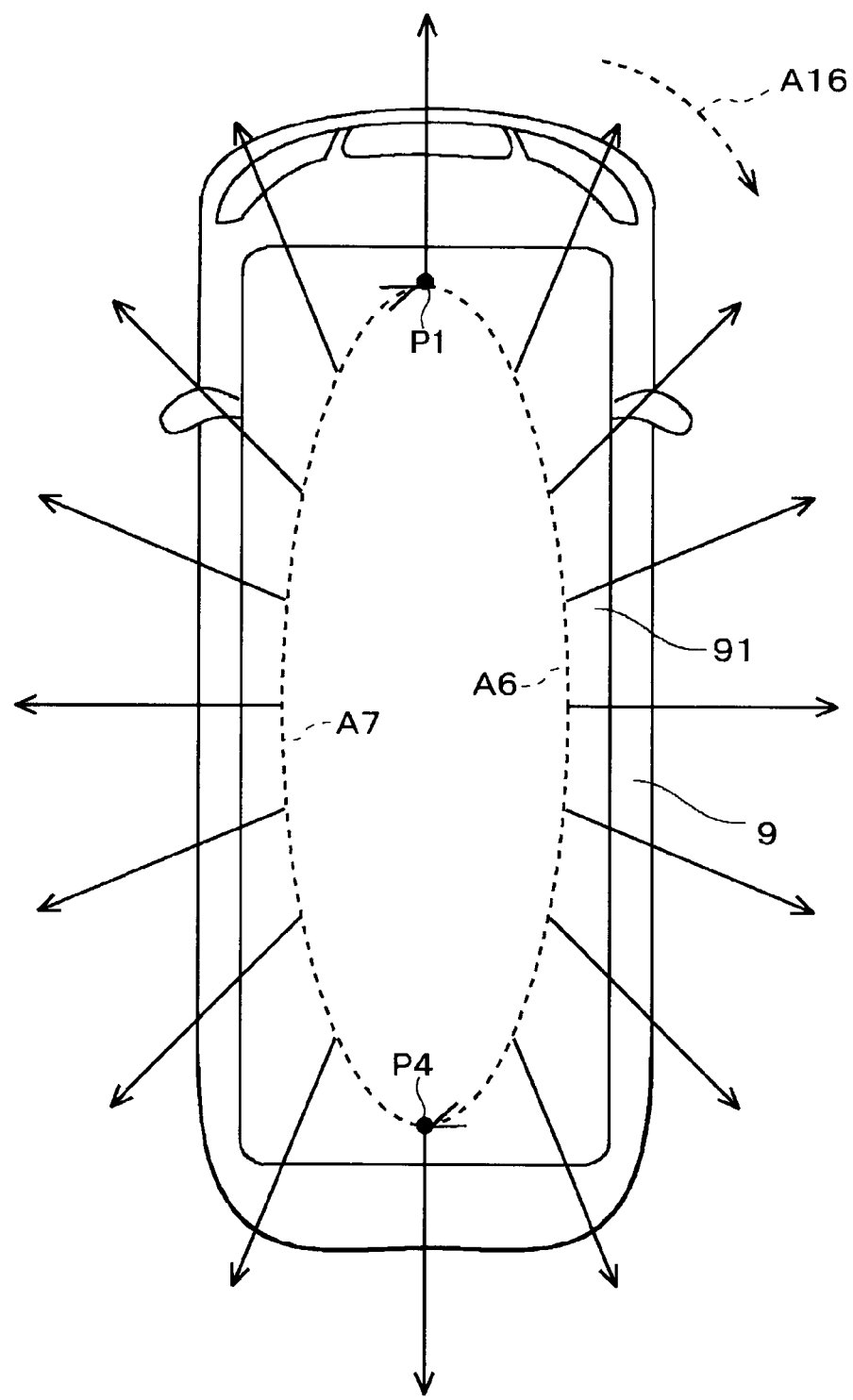
FIG. 21 depicts a moving path of the virtual perspective in an image display system in accordance with a third illustrative embodiment.

FIG. 21 depicts a moving path of the virtual perspective VP in the circling mode M2 of the third illustrative embodiment. As shown in FIG. 21, in the third illustrative embodiment, as a route of moving the position of the virtual perspective VP, a route having a substantially elliptical shape of which a long axis follows the front-back direction of the vehicle 9 is set within the cabin 91 of the vehicle 9.

First, the image control unit 20a sets the plan view angle of the line of sight of the virtual perspective VP so as to face towards the front of the vehicle 9, which is the initial direction, and sets the position of the virtual perspective VP at the front central position P1, which is the initial position.

Then, the image control unit 20a moves the position of the virtual perspective VP in the clockwise direction along a right arc of the substantially elliptical route from the front central position P1 to the rear central position P4 (a dashed arrow A6). Further, the image control unit 20a moves the position of the virtual perspective VP in the clockwise direction along a left arc of the substantially elliptical route from the rear central position P4 to the front central position P1 (a dashed arrow A7). The image control unit 20a continuously alters the plan view angle of the line of sight of the virtual perspective VP even during the movement of the position of the virtual perspective VP (a dashed arrow A16).

Also in the third illustrative embodiment, the image control unit 20a is configured to move the position of the virtual perspective VP in the circling mode M2, in correspondence to the direction of the line of sight of the virtual perspective VP. That is, when the line of sight of the virtual perspective VP is made to face towards the front of the vehicle 9, the image control unit 20a moves the position of the virtual perspective VP to the front side of the cabin 91. Likewise, when the line of sight of the virtual perspective VP is made to face towards the rear of the vehicle 9, the image control unit 20a moves the position of the virtual perspective VP to the rear side of the cabin 91. Also, when the line of sight of the virtual perspective VP is made to face towards the right of the vehicle 9, the image control unit 20a moves the position of the virtual perspective VP to the right side of the cabin 91. Also, when the line of sight of the virtual perspective VP is made to face towards the left of the vehicle 9, the image control unit 20a moves the position of the virtual perspective VP to the left side of the cabin 91. Thereby, it is possible to improve the visibility of a photographic subject image of the vehicle 9 that is to be included in the in-vehicle perspective image.

As described above, in the third illustrative embodiment, since the position of the virtual perspective VP is moved in the substantially elliptical shape, it is possible to shorten the moving distance of the virtual perspective VP. Therefore, it is possible to further shorten the time period in which the line of sight of the virtual perspective VP circles the surroundings of the vehicle 9, and the user can check the entire shape of the surroundings of the vehicle 9 in a shorter time period.

Also, the long axis of the substantially elliptical shape, which is the route along which the position of the virtual perspective VP is moved, follows the front-back direction of the vehicle 9. For this reason, it is possible to largely move the position of the virtual perspective VP to the front side and the rear side of the cabin 91 of the vehicle 9. Therefore, even when the line of sight of the virtual perspective VP is made to face towards the front or the rear of the vehicle 9, it is possible to reduce the parts of the vehicle body to be indicated as the vehicle image 90 to be included in the in-vehicle perspective image and to enlarge a photographic subject image to be checked.

4. Fourth Illustrative Embodiment

Subsequently, a fourth illustrative embodiment is described. In the below, the differences from the first illustrative embodiment are mainly described, and the descriptions about the same or similar configurations and operations as or to the first illustrative embodiment are omitted.

In the first illustrative embodiment, the image control unit 20a is configured to move the position of the virtual perspective VP in the front-back direction and in the left-right direction of the vehicle 9. In the fourth illustrative embodiment, the image control unit 20a is configured to move the position of the virtual perspective VP only in the front-back direction of the vehicle 9.

Figure 22:
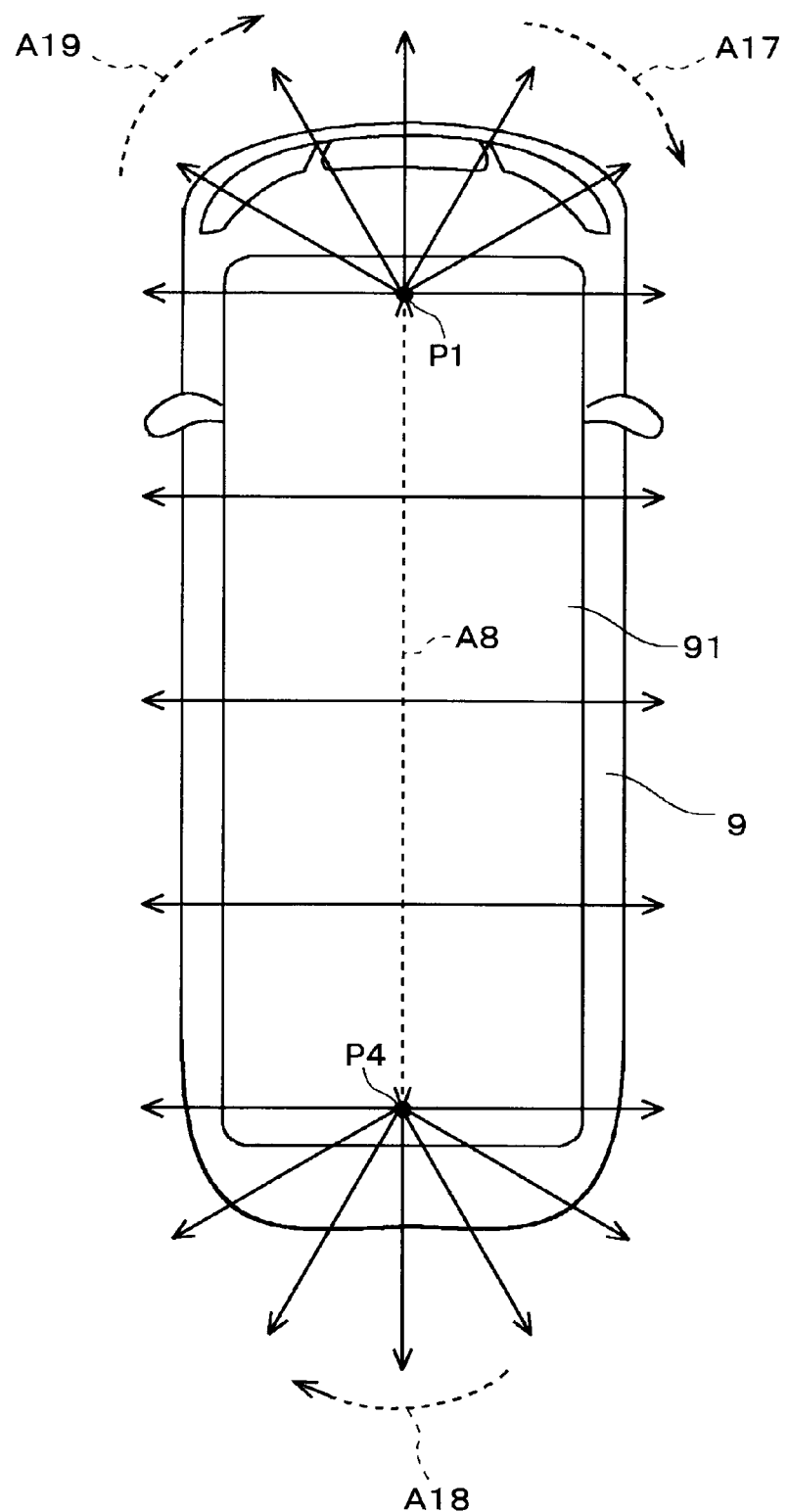
FIG. 22 depicts a moving path of the virtual perspective in an image display system in accordance with a fourth illustrative embodiment.

FIG. 22 depicts a moving path of the virtual perspective VP in the circling mode M2 of the fourth illustrative embodiment. In the fourth illustrative embodiment, as the route of moving the position of the virtual perspective VP, a linear route along the front-back direction of the vehicle 9 is set within the cabin 91 of the vehicle 9.

First, the image control unit 20a sets the plan view angle of the line of sight of the virtual perspective VP so as to face towards the front of the vehicle 9, which is the initial direction, and sets the position of the virtual perspective VP at the front central position P1, which is the initial position.

Then, the image control unit 20a continuously alters the plan view angle of the line of sight of the virtual perspective VP so that the line of sight of the virtual perspective VP faces towards the right in the left-right direction of the vehicle 9 (a dashed arrow A17). That is, the image control unit 20a alters the plan view angle of the line of sight of the virtual perspective VP in the clockwise direction by 90° with keeping the position of the virtual perspective VP at the front central position P1.

When the line of sight of the virtual perspective VP faces towards the right of the vehicle 9, the image control unit 20a linearly moves rearwards the position of the virtual perspective VP from the front central position P1 to the rear central position P4 with keeping the plan view angle of the line of sight of the virtual perspective VP (a dashed arrow A8).

When the position of the virtual perspective VP is moved to the rear central position P4, the image control unit 20a stops moving the position of the virtual perspective VP, and then continuously alters the plan view angle of the line of sight of the virtual perspective VP so that the line of sight of the virtual perspective VP faces towards the left in the left-right direction of the vehicle 9 (a dashed arrow A18). That is, the image control unit 20a alters the plan view angle of the line of sight of the virtual perspective VP in the clockwise direction by 180° with keeping the position of the virtual perspective VP at the position P4.

When the line of sight of the virtual perspective VP faces towards the left of the vehicle 9, the image control unit 20a linearly moves forwards the position of the virtual perspective VP from the rear central position P4 to the front central position P1 with keeping the plan view angle of the line of sight of the virtual perspective VP (a dashed arrow A8).

When the position of the virtual perspective VP is moved to the front central position P1, the image control unit 20a stops moving the position of the virtual perspective VP, and then continuously alters the plan view angle of the line of sight of the virtual perspective VP so that the line of sight of the virtual perspective VP faces towards the front in the front-back direction of the vehicle 9 (a dashed arrow A19). That is, the image control unit 20a alters the plan view angle of the line of sight of the virtual perspective VP in the clockwise direction by 90° with keeping the position of the virtual perspective VP at the front central position P1.

Also in the fourth illustrative embodiment, the image control unit 20a is configured to move the position of the virtual perspective VP in the circling mode M2, in correspondence to the direction of the line of sight of the virtual perspective VP. That is, when the line of sight of the virtual perspective VP is made to face towards the front of the vehicle 9, the image control unit 20a moves the position of the virtual perspective VP to the front side of the cabin 91. Likewise, when the line of sight of the virtual perspective VP is made to face towards the rear of the vehicle 9, the image control unit 20a moves the position of the virtual perspective VP to the rear side of the cabin 91. Thereby, it is possible to improve the visibility of a photographic subject image of the vehicle 9 that is to be included in the in-vehicle perspective image.

As described above, in the fourth illustrative embodiment, since the position of the virtual perspective VP is linearly moved only in the front-back direction, it is possible to shorten the moving distance of the virtual perspective VP. Therefore, it is possible to shorten the time period for which the line of sight of the virtual perspective circles the surroundings of the vehicle 9. Also, the user can check the entire shape of the surroundings of the vehicle 9 in a relatively short time period.

Meanwhile, in FIG. 22, the image control unit 20*a* does not alter the plan view angle of the line of sight of the virtual perspective VP and the position of the virtual perspective VP at the same time. However, like the second illustrative embodiment, the image control unit 20*a* may be configured to alter the plan view angle of the line of sight of the virtual perspective VP and the position of the virtual perspective VP at the same time.

5. Fifth Illustrative Embodiment

Subsequently, a fifth illustrative embodiment is described. In the below, the differences from the first illustrative embodiment are mainly described, and the descriptions about the same or similar configurations and operations as or to the first illustrative embodiment are omitted.

In the first illustrative embodiment, the image control unit 20*a* is configured to keep the depression angle of the line of sight of the virtual perspective VP at the specific angle, in the circling mode M2. In the fifth illustrative embodiment, the image control unit 20*a* is configured to alter the depression angle of the line of sight of the virtual perspective VP, in correspondence to the size of the projection area R1 on the projection plane TS in a direction facing towards the line of sight of the virtual perspective VP.

As described above, on the projection plane TS, the size (a length in the direction of getting away from the vehicle 9) of the projection area R1 becomes smallest at the left and the right of the vehicle 9. Therefore, the size (a length in the direction of getting away from the vehicle 9) of the projection area R1 is larger at the front or rear of the vehicle 9 on the projection plane TS, as compared to the left and the right of the vehicle 9. For this reason, when the line of sight of the virtual perspective VP is made to face towards the front or rear of the vehicle 9, the in-vehicle perspective image does not include the non-projection areas R2 even though the line of sight of the virtual perspective VP is made to face upwards. In the fifth illustrative embodiment, the image control unit 20*a* is configured to alter the depression angle of the line of sight of the virtual perspective VP within a range in which the in-vehicle perspective image does not include the non-projection areas R2, in correspondence to the size of the projection area R1.

Figure 23:
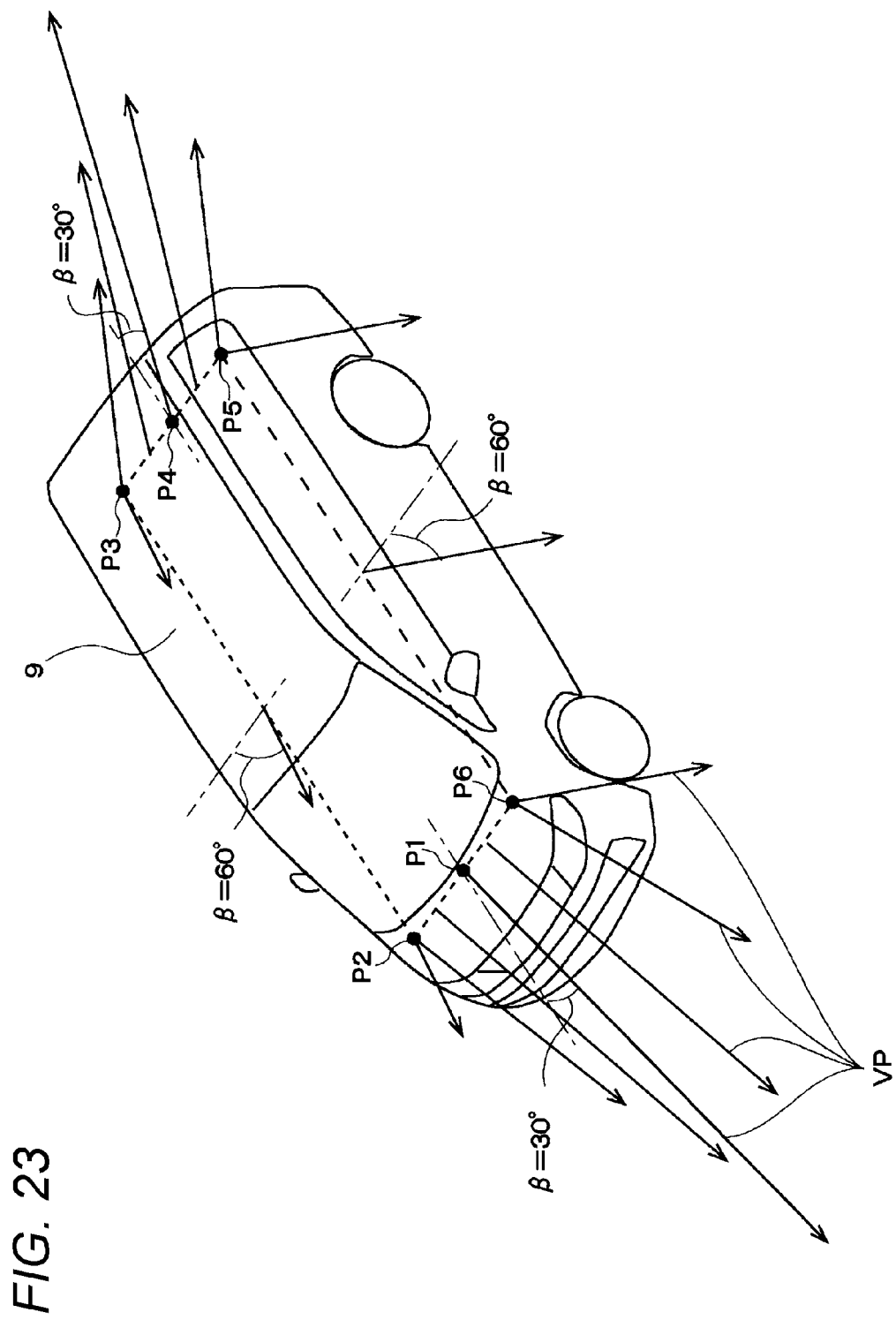
FIG. 23 depicts a depression angle of the line of sight of the virtual perspective in an image display system in accordance with a fifth illustrative embodiment.

FIG. 23 depicts the depression angle β of the line of sight of the virtual perspective VP in the circling mode M2 of the fifth illustrative embodiment. When the line of sight of the virtual perspective VP is made to face towards the left or the right of the vehicle 9, the image control unit 20*a* sets the depression angle β of the line of sight of the virtual perspective VP to the specific angle (60°), like the first illustrative embodiment. On the other hand, when the line of sight of the virtual perspective VP is made to face towards the front or rear of the vehicle 9, the image control unit 20*a* sets the depression angle β of the line of sight of the virtual perspective VP to be smaller than the specific angle (60°).

First, the image control unit 20*a* sets the plan view angle so that the line of sight of the virtual perspective VP faces the front of the vehicle 9, and also sets the position of the virtual perspective VP to the front central position P1, which is the initial position. At this time, the image control unit 20*a* sets the depression angle β of the line of sight of the virtual perspective VP to the smallest angle (for example, 30°).

Figure 24:
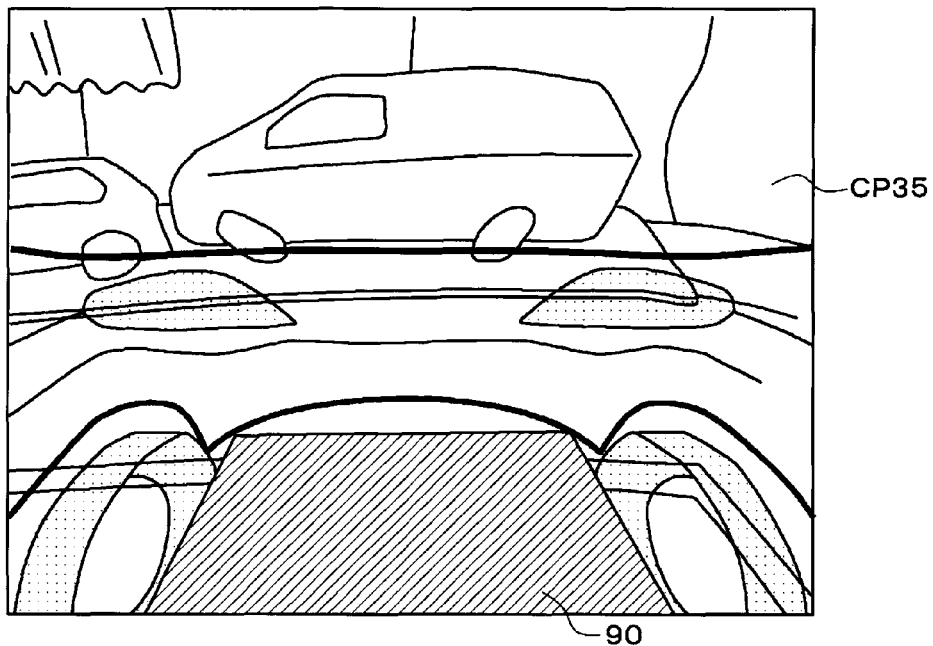
FIG. 24 depicts an example of the in-vehicle perspective image in the image display system of FIG. 23.

FIG. 24 depicts an example of an in-vehicle perspective image CP35 that is to be generated by the image generation unit 22 when the line of sight of the virtual perspective VP faces towards the front of the vehicle 9 and the position of the virtual perspective VP is the front central position P1. The in-vehicle perspective image CP35 can indicate a photographic subject relatively more distant from the vehicle 9, as compared to the in-vehicle perspective image CP31 of the first illustrative embodiment shown in FIG. 9.

While the depression angle β of the line of sight of the virtual perspective VP is the specific angle (60°) in FIG. 9, the depression angle β of the line of sight of the virtual perspective VP is the minimum angle (30°) in FIG. 24. Therefore, the line of sight of the virtual perspective VP in FIG. 24 is located at a more upward position than the line of sight of the virtual perspective VP in FIG. 9. Since the size of the projection area R1 is relatively large at the front of the vehicle 9 on the projection plane TS, the in-vehicle perspective image does not include the non-projection areas R2 even when the depression angle β of the line of sight of the virtual perspective VP is set to the minimum angle (30°).

Then, as shown in FIG. 23, the image control unit 20*a* moves the position of the virtual perspective VP from the front central position P1 towards the front right end position P2. During the movement, the image control unit 20*a* gradually changes the depression angle β of the line of sight of the virtual perspective VP from the minimum angle (30°) to the specific angle (60°). That is, the image control unit 20*a* makes the line of sight of the virtual perspective VP face gradually downwards.

Then, the image control unit 20*a* makes the line of sight of the virtual perspective VP face towards the right of the vehicle 9, and moves the position of the virtual perspective VP from the front right end position P2 towards the rear right end position P3. The size of the projection area R1 becomes smallest at the right of the vehicle 9 on the projection plane TS. For this reason, during the movement, the image control unit 20*a* keeps the depression angle β of the line of sight of the virtual perspective VP at the specific angle (60°) so that the in-vehicle perspective image does not include the non-projection area R2.

Then, the image control unit 20*a* makes the line of sight of the virtual perspective VP face towards the rear of the vehicle 9, and moves the position of the virtual perspective VP from the rear right end position P3 towards the rear central position P4. During the movement, the image control unit 20*a* gradually changes the depression angle β of the line of sight of the virtual perspective VP from the specific angle (60°) to the minimum angle (30°). That is, the image control unit 20*a* makes the line of sight of the virtual perspective VP face gradually upwards. When the position of the virtual perspective VP is the rear central position P4, the depression angle β of the line of sight of the virtual perspective VP becomes the minimum angle (30°).

Figure 25:
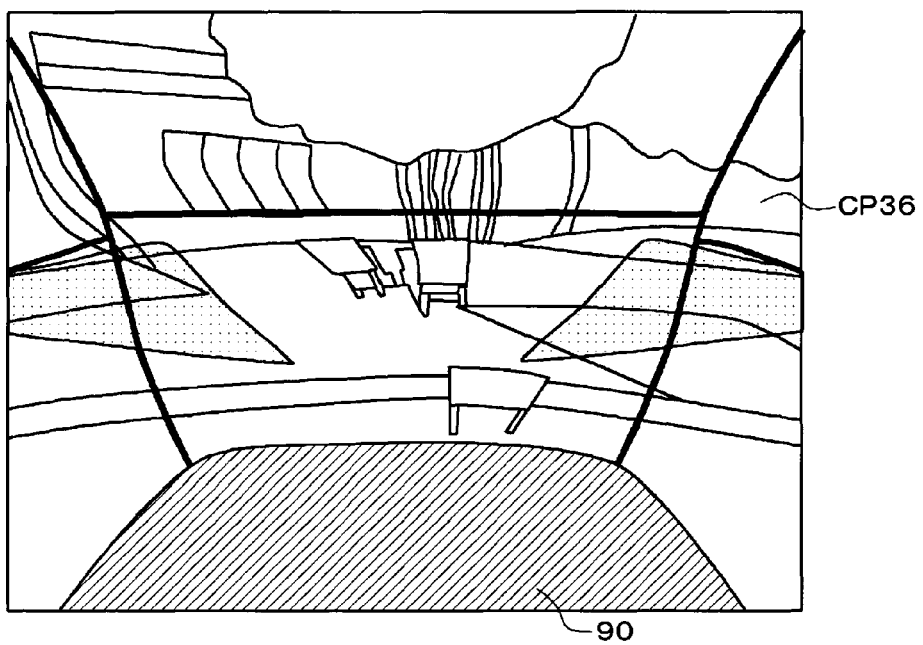
FIG. 25 depicts another example of the in-vehicle perspective image in the image display system of FIG. 23.

FIG. 25 depicts an example of an in-vehicle perspective image CP36 that is to be generated by the image generation unit 22 when the line of sight of the virtual perspective VP faces towards the rear of the vehicle 9 and the position of the virtual perspective VP is the rear central position P4. The in-vehicle perspective image CP36 can indicate a photographic subject relatively more distant from the vehicle 9, as compared to the in-vehicle perspective image CP33 of the first illustrative embodiment shown in FIG. 11.

While the depression angle β of the line of sight of the virtual perspective VP is the specific angle (60°) in FIG. 11, the depression angle β of the line of sight of the virtual perspective VP is the minimum angle (30°) in FIG. 25. Therefore, the line of sight of the virtual perspective VP in FIG. 25 is located at a more upward position than the line of sight of the virtual perspective VP in FIG. 11. Since the size of the projection area R1 is relatively large at the rear of the vehicle 9 on the projection plane TS, the in-vehicle perspective image does not include the non-projection areas R2 even when the depression angle β of the line of sight of the virtual perspective VP is set to the minimum angle (30°).

Then, as shown in FIG. 23, the image control unit 20a moves the position of the virtual perspective VP from the rear central position P4 towards the rear left end position P5. During the movement, the image control unit 20a gradually changes the depression angle β of the line of sight of the virtual perspective VP from the minimum angle (30°) to the specific angle (60°). That is, the image control unit 20a makes the line of sight of the virtual perspective VP face gradually downwards.

Then, the image control unit 20a makes the line of sight of the virtual perspective VP face towards the left of the vehicle 9, and moves the position of the virtual perspective VP from the rear left end position P5 towards the front left end position P6. The size of the projection area R1 becomes smallest at the left of the vehicle 9 on the projection plane TS. For this reason, during the movement, the image control unit 20a keeps the depression angle β of the line of sight of the virtual perspective VP at the specific angle (60°) so that the in-vehicle perspective image does not include the non-projection area R2.

Then, the image control unit 20a makes the line of sight of the virtual perspective VP face towards the front of the vehicle 9, and moves the position of the virtual perspective VP from the front left end position P6 towards the front central position P1. During the movement, the image control unit 20a gradually changes the depression angle β of the line of sight of the virtual perspective VP from the specific angle (60°) to the minimum angle (30°). That is, the image control unit 20a makes the line of sight of the virtual perspective VP face gradually upwards. When the position of the virtual perspective VP returns to the front central position P1, which is the initial position, the depression angle β of the line of sight of the virtual perspective VP becomes the minimum angle (30°).

Figure 26:
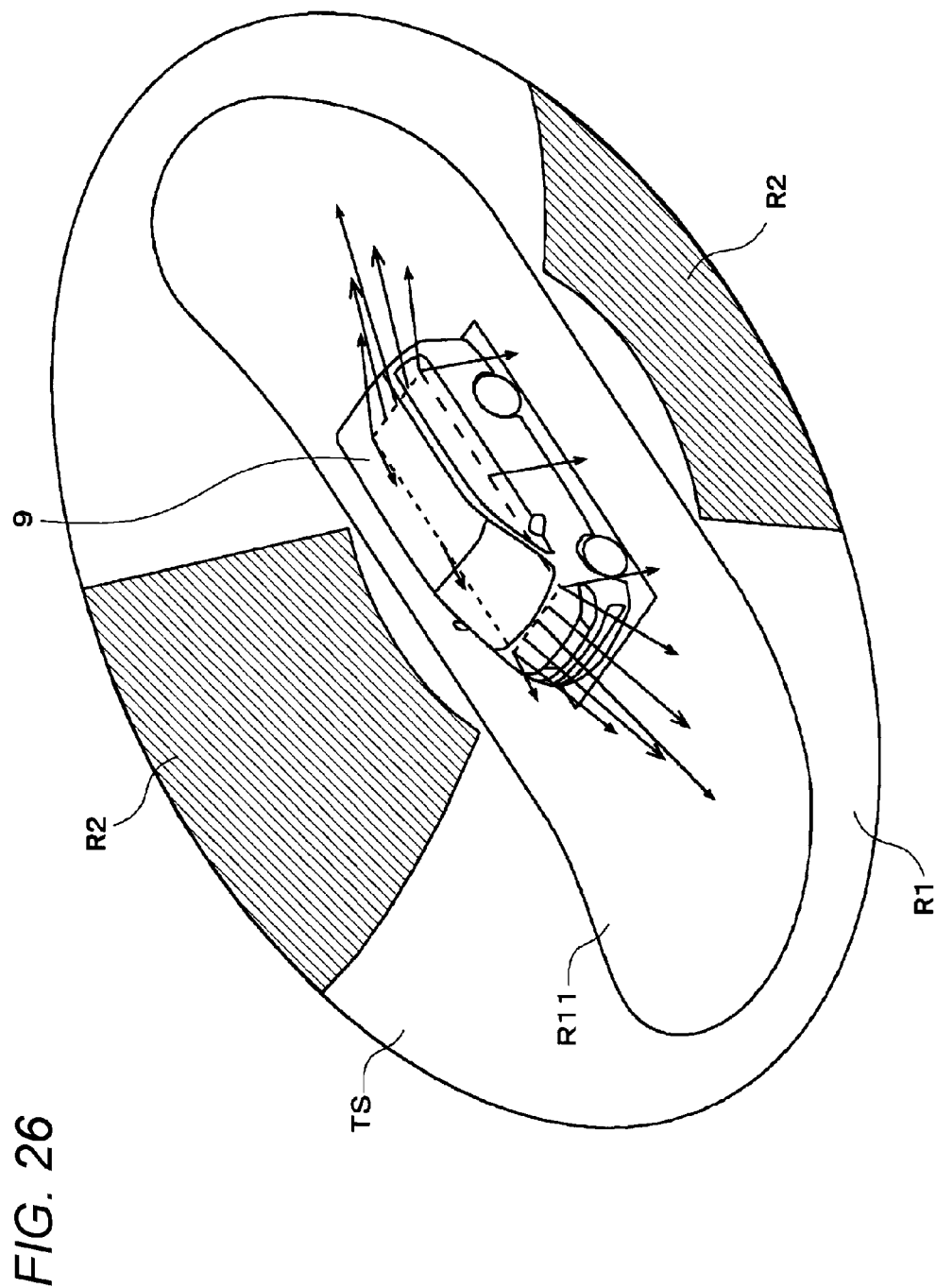
FIG. 26 depicts a using area that is to be used for generation of the in-vehicle perspective image in the image display system of FIG. 23.

FIG. 26 depicts a using area R11 of the projection plane TS, which is to be used for generation of the in-vehicle perspective image by the image generation unit 22, when the depression angle β of the line of sight of the virtual perspective VP is adjusted as described above with reference to FIG. 23. The using area R11 is an area that is long in the front-back direction of the vehicle 9. The using area R11 includes only the projection area R1 having data and does not include the non-projection areas R2 having no data. Therefore, when the plan view angle of the line of sight of the virtual perspective VP is altered to circle the surroundings of the vehicle 9 in the circling mode M2, the in-vehicle perspective image can be made not to include the non-projection areas R2. As a result, it is possible to prevent the user who visually recognizes the in-vehicle perspective image from feeling uncomfortable.

As described above, in the fifth illustrative embodiment, the image control unit 20a is configured to alter the depression angle β of the line of sight of the virtual perspective VP within the range in which the in-vehicle perspective image does not include the non-projection areas R2, in correspondence to the size of the projection area R1 on the projection plane TS in the direction of facing towards the line of sight of the virtual perspective VP. For this reason, it is possible to prevent the user who visually recognizes the in-vehicle perspective image from feeling uncomfortable and to indicate the photographic subject relatively distant from the vehicle 9 by the in-vehicle perspective image. When the line of sight of the virtual perspective VP is made to face towards the front or rear of the vehicle 9, the image control unit 20a sets the depression angle β of the line of sight of the virtual perspective VP to be smaller than the specific angle (60°). Therefore, the in-vehicle perspective image can indicate the relatively distant photographic subject existing in the traveling direction of the vehicle 9.

6. Sixth Illustrative Embodiment

Subsequently, a sixth illustrative embodiment is described. In the below, the differences from the first illustrative embodiment are mainly described, and the descriptions about the same or similar configurations and operations as or to the first illustrative embodiment are omitted.

In the first illustrative embodiment, the image control unit 20a is configured to keep the depression angle of the line of sight of the virtual perspective VP at the specific angle all the time in the circling mode M2. In the sixth illustrative embodiment, the image control unit 20a keeps the depression angle of the line of sight of the virtual perspective VP at the specific angle (60°) when the position of the virtual perspective VP is a position except for the front central position P1 and the rear central position P4, like the first illustrative embodiment. On the other hand, when the position of the virtual perspective VP is the front central position P1 and the rear central position P4, the image control unit 20a sets the depression angle of the line of sight of the virtual perspective VP to be smaller than the specific angle (60°).

Figure 27:
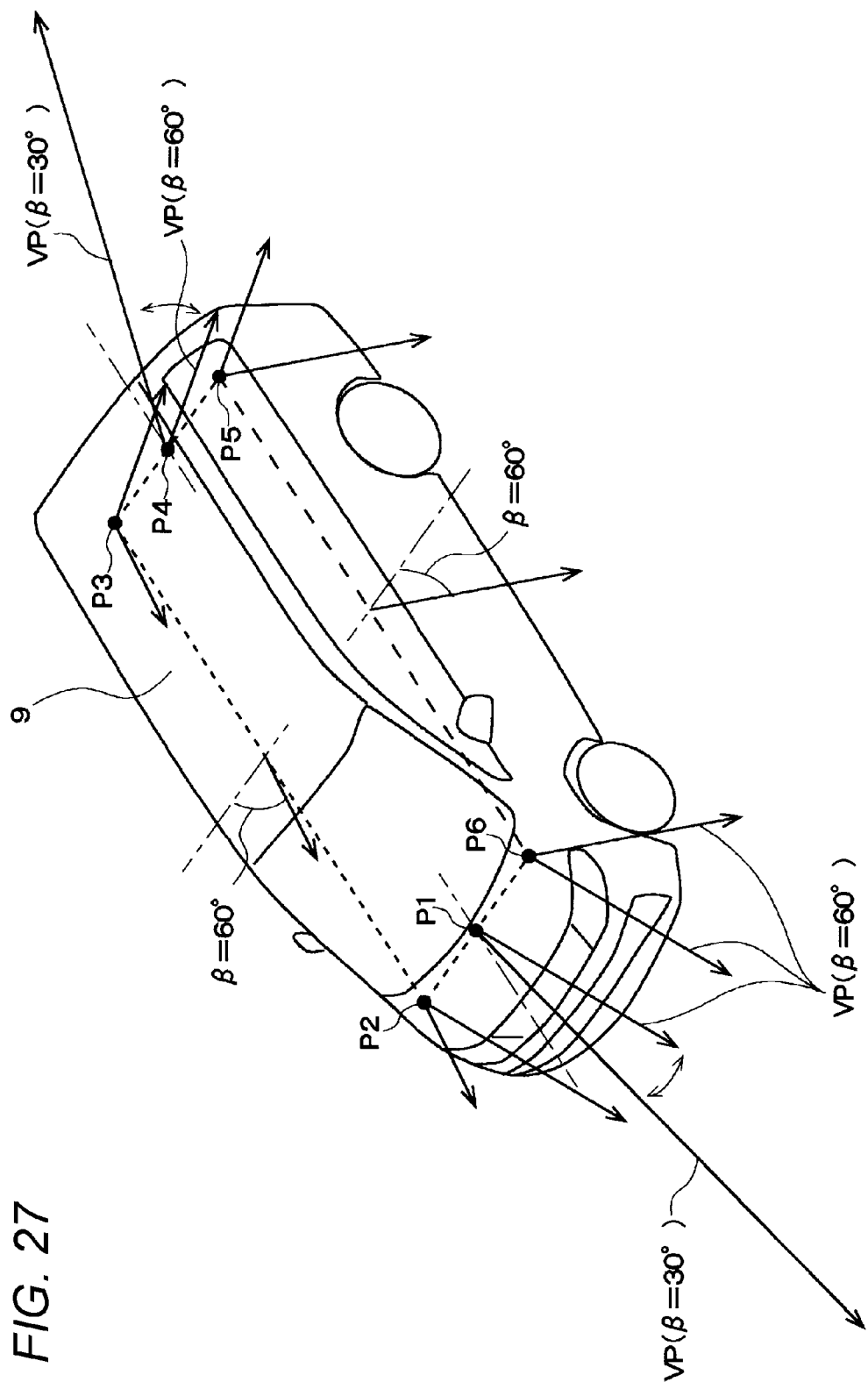
FIG. 27 depicts a depression angle of the line of sight of the virtual perspective in an image display system in accordance with a sixth illustrative embodiment.

FIG. 27 depicts the depression angle β of the line of sight of the virtual perspective VP in the circling mode M2 of the sixth illustrative embodiment.

First, the image control unit 20a sets the plan view angle so that the line of sight of the virtual perspective VP faces towards the front of the vehicle 9, and also sets the position of the virtual perspective VP to the front central position P1, which is the initial position. At this time, the image control unit 20a sets the depression angle β of the line of sight of the virtual perspective VP to the minimum angle (30°). Thereby, the image generation unit 22 generates an in-vehicle perspective image CP35 indicating a photographic subject relatively distant from the vehicle 9, as shown in FIG. 24.

Then, the image control unit 20a gradually changes the depression angle β of the line of sight of the virtual perspective VP from the minimum angle (30°) to the specific angle (60°) with keeping the position of the virtual perspective VP at the front central position P1. That is, the image control unit 20a makes the line of sight of the virtual perspective VP face gradually downwards.

When the depression angle β of the line of sight of the virtual perspective VP is set to the specific angle (60°), the image control unit 20a alters the plan view angle of the line of sight of the virtual perspective VP and the position of the virtual perspective VP, like the first illustrative embodiment. Thereby, the image control unit 20a moves the position of the virtual perspective VP from the front central position P1 to the rear central position P4 via the position P2 and the position P3. Also, the image control unit 20a alters the plan view angle so that the line of sight of the virtual perspective VP faces towards the right of the vehicle 9 and the rear of the vehicle 9. During the movement, the image control unit 20a keeps the depression angle β of the line of sight of the virtual perspective VP at the specific angle (60°).

When the position of the virtual perspective VP is moved to the rear central position P4, the image control unit 20a gradually changes the depression angle β of the line of sight of the virtual perspective VP from the specific angle (60°) to the minimum angle (30°) with keeping the position of the virtual perspective VP at the rear central position P4. That is, the image control unit 20a makes the line of sight of the virtual perspective VP face gradually upwards. When the depression angle β of the line of sight of the virtual perspective VP becomes the minimum angle (30°), the image generation unit 22 generates an in-vehicle perspective image CP36 indicating a photographic subject relatively distant from the vehicle 9, as shown in FIG. 25.

Then, the image control unit 20a gradually alters the depression angle β of the line of sight of the virtual perspective VP from the minimum angle (30°) to the specific angle (60°) with keeping the position of the virtual perspective VP at the rear central position P4. That is, the image control unit 20a returns the line of sight of the virtual perspective VP so that it faces gradually downwards.

When the depression angle β of the line of sight of the virtual perspective VP is set to the specific angle (60°), the image control unit 20a alters the plan view angle of the line of sight of the virtual perspective VP and the position of the virtual perspective VP, like the first illustrative embodiment. Thereby, the image control unit 20a moves the position of the virtual perspective VP from the rear central position P4 to the front central position P1 via the position P5 and the position P6. Also, the image control unit 20a alters the plan view angle so that the line of sight of the virtual perspective VP faces towards the left of the vehicle 9 and the front of the vehicle 9. During the movement, the image control unit 20a keeps the depression angle β of the line of sight of the virtual perspective VP at the specific angle (60°).

As described above, in the sixth illustrative embodiment, when the position of the virtual perspective VP is a position except for the specific position P1, P4, the depression angle of the line of sight of the virtual perspective VP is kept at the specific angle, and when the position of the virtual perspective is the specific position P1, P4, the depression angle of the line of sight of the virtual perspective is set to be smaller than the specific angle. For this reason, when the position of the virtual perspective VP is the specific position P1, P4, it is possible to indicate a photographic subject relatively distant from the vehicle 9 by the in-vehicle perspective image while simplifying the movement of the line of sight of the virtual perspective VP. That is, the in-vehicle perspective image can indicate the relatively distant photographic subject existing in the traveling direction of the vehicle 9.

7. Modified Embodiments of First to Sixth Illustrative Embodiment

The disclosure is not limited to the above illustrative embodiments, and a variety of changes can be made. In the below, modified embodiments are described. All illustrative embodiments including the above illustrative embodiments and the modified embodiments to be described can be appropriately combined.

In the above illustrative embodiments, the image generation unit 22 is configured to generate the virtual perspective image by using all the four captured image data acquired from the four cameras 5. However, the image generation unit 22 may be configured to generate the virtual perspective image by using one to three captured image data (at least one captured image data) selected from the four captured image data. In this case, the image generation unit 22 may be configured to project only the captured image data, which is to be used for generation of the virtual perspective image, of the four captured image data on the projection plane TS.

In the above illustrative embodiments, when the plan view angle of the line of sight of the virtual perspective VP is altered so that the line of sight of the virtual perspective VP circles the surroundings of the vehicle 9, the line of sight of the virtual perspective VP goes around the surroundings of the vehicle 9. However, the line of sight of the virtual perspective VP may be moved within a range less than one circle or beyond one circle. Also, in the above illustrative embodiments, the line of sight of the virtual perspective VP is configured to circle the surroundings of the vehicle 9 in the clockwise direction. However, the line of sight of the virtual perspective VP may be configured to circle the surroundings of the vehicle 9 in a counterclockwise direction.

In the above illustrative embodiments, the part except for the vehicle body bottom of the vehicle image 90 is transparent or semi-transparent but may be non-transparent.

In the above illustrative embodiments, the front camera 5F, the rear camera 5B and the side camera 5L, 5R have the different depression angles of the optical axes. However, when a depression angle of the optical axis of at least one of a plurality of cameras configured to acquire a plurality of captured images is different from those of the other cameras, it is possible to appropriately apply the technology of adjusting the depression angle of the line of sight of the virtual perspective described with reference to the above illustrative embodiments.

As the method of altering the plan view angle of the line of sight of the virtual perspective VP and the position of the virtual perspective VP, the different methods have been described in the first to fourth illustrative embodiments. However, the user may select any method that is to be executed. Also, as the method of altering the depression angle of the line of sight of the virtual perspective VP, the different methods have been described in the first, fifth and sixth illustrative embodiments. However, the user may select any method that is to be executed.

8. Seventh Illustrative Embodiment

<8-1. Configuration>

Figure 28:
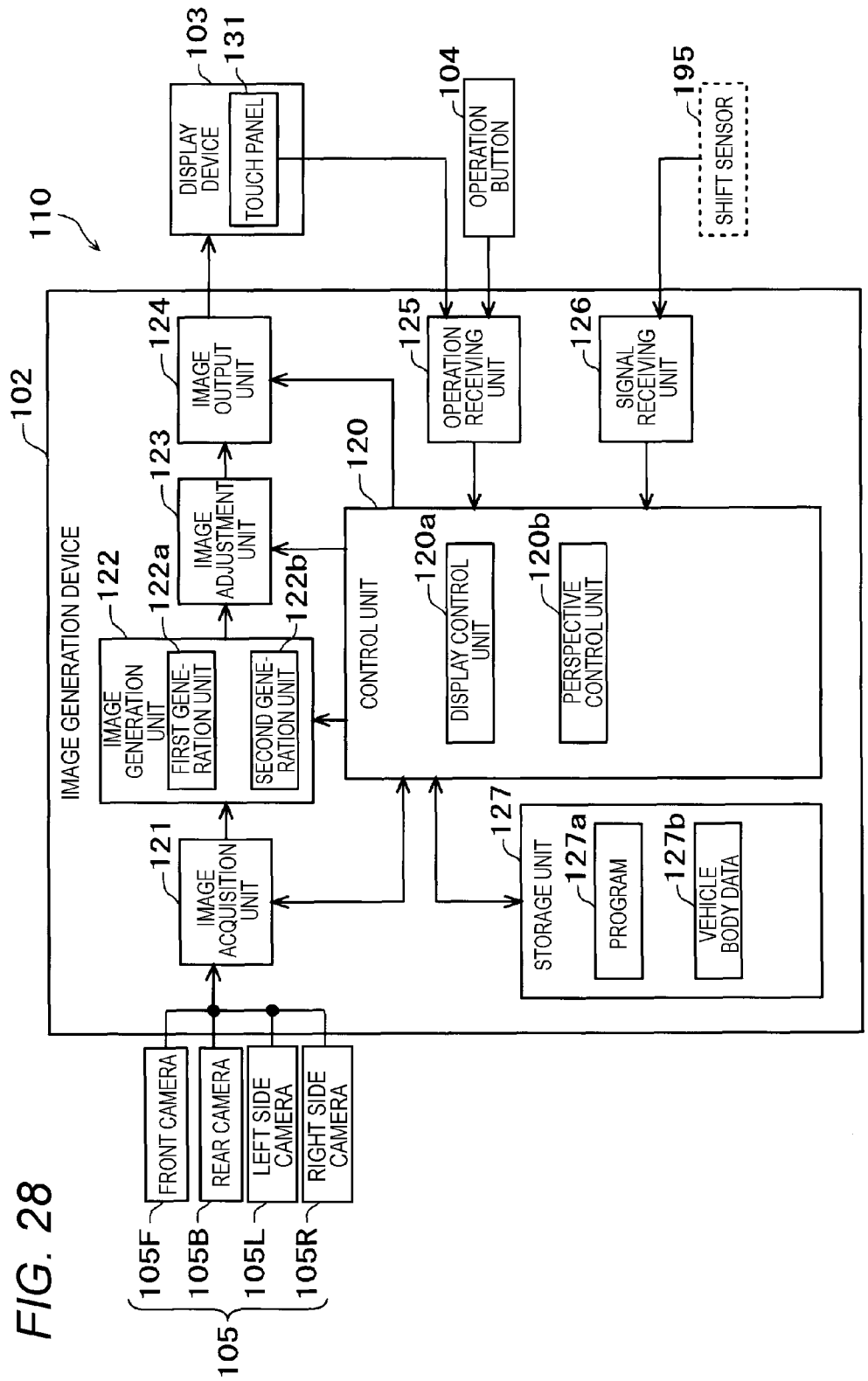
FIG. 28 depicts a configuration of an image display system in accordance with a seventh illustrative embodiment.

FIG. 28 depicts a configuration of an image display system 110 according to a seventh illustrative embodiment. The image display system 110 is used for a vehicle (an automobile, in this illustrative embodiment), and has functions of generating an image indicating an area of a periphery of the vehicle and displaying the same within a cabin. A user (representatively, a driver) of the image display system 110 can recognize a shape of the periphery of the vehicle substantially in real time by using the image display system 110.

As shown in FIG. 28, the image display system 110 has a plurality of cameras 105, an image generation device 102, a display device 103, and an operation button 104. Each of the plurality of cameras 105 is configured to capture a periphery of the vehicle, to acquire a captured image, and to input the captured image into the image generation device 102. The image generation device 102 is configured to generate a display image to be displayed on the display device 103 by using the captured image indicative of the periphery of the vehicle. The display device 103 is configured to display the display image generated at the image generation device 102. Also, the operation button 104 is configured to receive a user's operation.

Each of the plurality of cameras 105 has a lens and an imaging device, and is configured to electronically acquire the captured image indicative of the periphery of the vehicle. The plurality of cameras 105 includes a front camera 105F, a rear camera 105B, a left side camera 105L, and a right side camera 105R. The four cameras 105 are disposed at different positions of the vehicle 109 and are configured to capture different directions of the periphery of the vehicle 109.

Figure 29:
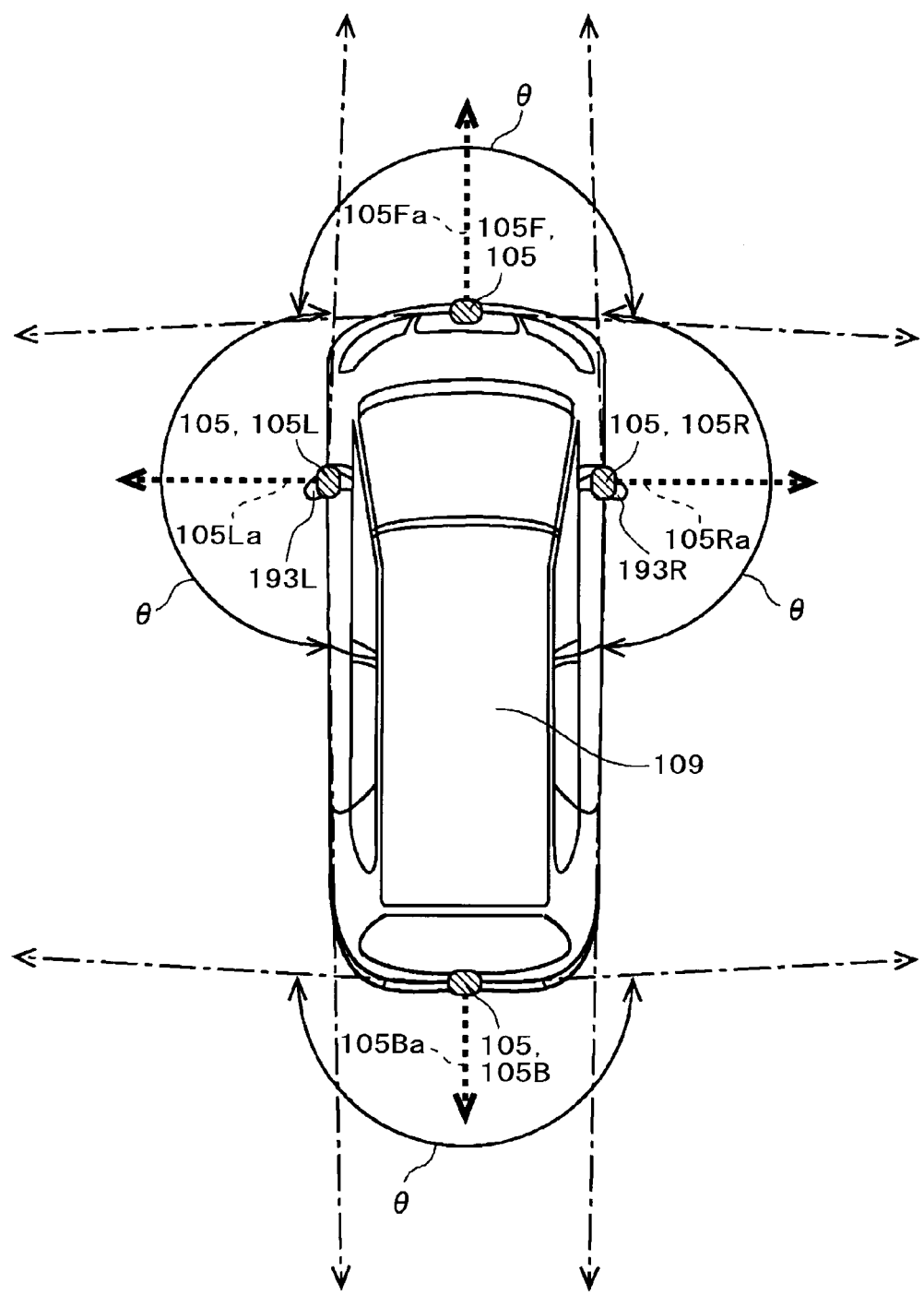
FIG. 29 depicts directions in which the four cameras of the image display system shown in FIG. 28 take pictures, respectively.

FIG. 29 depicts directions in which the four cameras 105 take pictures, respectively. The front camera 105F is provided at a front end of the vehicle 109, and an optical axis 105Fa thereof is made to face forwards in a front-back direction of the vehicle 109. The rear camera 105B is provided at a rear end of the vehicle 109, and an optical axis 105Ba thereof is made to face rearwards in the front-back direction of the vehicle 109. The left side camera 105L is provided at a left side-view mirror 193L, and an optical axis 105La thereof is made to face leftwards in a left-right direction of the vehicle 109. Also, the right side camera 105R is provided at a right side-view mirror 193R, and an optical axis 105Ra thereof is made to face rightwards in the left-right direction of the vehicle 109.

As the lens of each camera 105, a wide angle lens such as a fish eye lens is adopted. Each camera 105 has a 180 degree or greater angle of view $\theta$. For this reason, it is possible to capture the entire surroundings of the vehicle 109 by using the four cameras 105.

As shown in FIG. 28, the display device 103 has a thin display panel such as a liquid crystal panel, for example, and is configured to display a variety of information and images thereon. For example, the display device 103 is disposed on an instrument panel of the vehicle 9 so that the user can visually recognize a screen of the display panel. The display device 103 is disposed in the same housing as the image generation device 102, so that it may be integrated with the image generation device 102. Alternatively, the display device 103 may be a separate device from the image generation device 102. Also, the display device 103 has a touch panel 131 overlapped over the display panel and can receive a user's operation. The display device 103 may have other functions such as a navigation function of guiding a route to a destination, in addition to the display function.

The operation button 104 is an operation member configured to receive the user's operation. The operation button 104 is provided for a steering wheel of the vehicle 109, for example, and is configured to mainly receive an operation from the driver. The user can make a variety of operations on the image display system 110 through the operation button 104 and the touch panel 131 of the display device 103. When the user's operation is made on any one of the operation button 104 and the touch panel 131, an operation signal indicative of contents of the operation is input into the image generation device 102.

The image generation device 102 is an electronic device capable of executing a variety of image processing. The image generation device 102 has an image acquisition unit 121, an image generation circuit 122, an image adjustment unit 123, and an image output unit 124.

The image acquisition unit 121 (an example of the acquisition unit) is configured to acquire the four captured image data from the four cameras 105. The image acquisition unit 121 has an image processing function of converting an analog captured image into a digital captured image, for example. The image acquisition unit 121 is configured to execute predetermined image processing for the acquired captured image data and to input the processed captured image data into the image generation circuit 122.

The image generation circuit 122 is a hardware circuit configured to generate a virtual perspective image by using the captured image. The image generation circuit 122 has a first generation unit 122a and a second generation unit 122b having the same function. Each of the first generation unit 122a and the second generation unit 122b is configured to synthesize the four captured images acquired from the four cameras 105 and to generate a virtual perspective image indicating the periphery of the vehicle 109 as seen from a virtual perspective. Each of the first generation unit 122a and the second generation unit 122b is configured to continuously (temporally continuously) generate the virtual perspective image by using the captured image data obtained just previously at the respective cameras 105. Thereby, each of the first generation unit 122a and the second generation unit 122b generates the virtual perspective image indicating substantially in real time the periphery of the vehicle 109. A method with which the first generation unit 122a and the second generation unit 122b generate the virtual perspective images will be described in detail later.

The image adjustment unit 123 is configured to generate a display image that is to be displayed on the display device 103. The image adjustment unit 123 can generate a display image in which the virtual perspective image generated at the first generation unit 122a and the virtual perspective image generated at the second generation unit 122b are arranged in a line.

The image output unit 124 is configured to display the display image generated at the image adjustment unit 123 on the display device 103. Thereby, the virtual perspective image, which indicates substantially in real time the periphery of the vehicle 109 as seen from the virtual perspective, is displayed on the display device 103.

Also, the image generation device 102 further has a control unit 120, an operation receiving unit 125, a signal receiving unit 126 and a storage unit 127. The control unit 120 is a microcomputer having a CPU, a RAM, a ROM and the like, for example, and is configured to collectively control the entire image generation device 102.

The operation receiving unit 125 is configured to receive operation signals that are to be transmitted from the operation button 104 and the touch panel 131 when the user makes an operation. Thereby, the operation receiving unit 125 receives the user's operation. The operation receiving unit 125 is configured to input the received operation signal into the control unit 120.

The signal receiving unit 126 is configured to receive a signal, which is to be transmitted from another device provided for the vehicle 109 separately from the image generation device 102, and to input the same into the control unit 120. The signal receiving unit 126 can receive a signal indicative of a shift position that is to be transmitted from a shift sensor 195 of the vehicle 109.

The storage unit 127 is a non-volatile memory such as a flash memory, for example, and is configured to store therein a variety of information. The storage unit 127 is configured to store therein a program 127a serving as the firmware and a variety of data that is to be used for generation of the virtual perspective image by the image generation circuit 122. The data that is to be used for generation of the virtual perspective image includes vehicle body data 127b indicative of a shape and a size of the vehicle body of the vehicle 109.

A variety of functions of the control unit 120 are implemented by execution (calculation processing of the CPU, in response to the program 127a) of the program 127a stored in the storage unit 127. A display control unit 120a and a perspective control unit 120b shown in FIG. 28 are parts of functional units that are to be implemented by the execution of the program 127a.

The display control unit 120a is configured to control operations of the image display system 110 relating to the display. For example, the display control unit 120a is configured to alter an operation mode of the image display system 110, in correspondence to a state of the vehicle 109 and a user's operation. Also, the display control unit 120a is configured to control the image adjustment unit 123 to generate a display image in which the virtual perspective image generated at the first generation unit 122a and the virtual perspective image generated at the second generation unit 122b are arranged in a line. Thereby, the display control unit 120a displays the virtual perspective image generated at the first generation unit 122a and the virtual perspective image generated at the second generation unit 122b at the same time on the display device 103.

The perspective control unit 120b is configured to control a position of the virtual perspective and a direction of the line of sight in the virtual perspective images generated by each of the first generation unit 122a and the second generation unit 122b. For example, the perspective control unit 120b is configured to alter a direction of the line of sight of the virtual perspective.

<8-2. Generation of Virtual Perspective Image>

Subsequently, a method with which the first generation unit 122a and the second generation unit 122b of the image generation circuit 122 generate the virtual perspective images indicative of the shape of the periphery of the vehicle 109 as seen from the virtual perspective is described.

Figure 30:
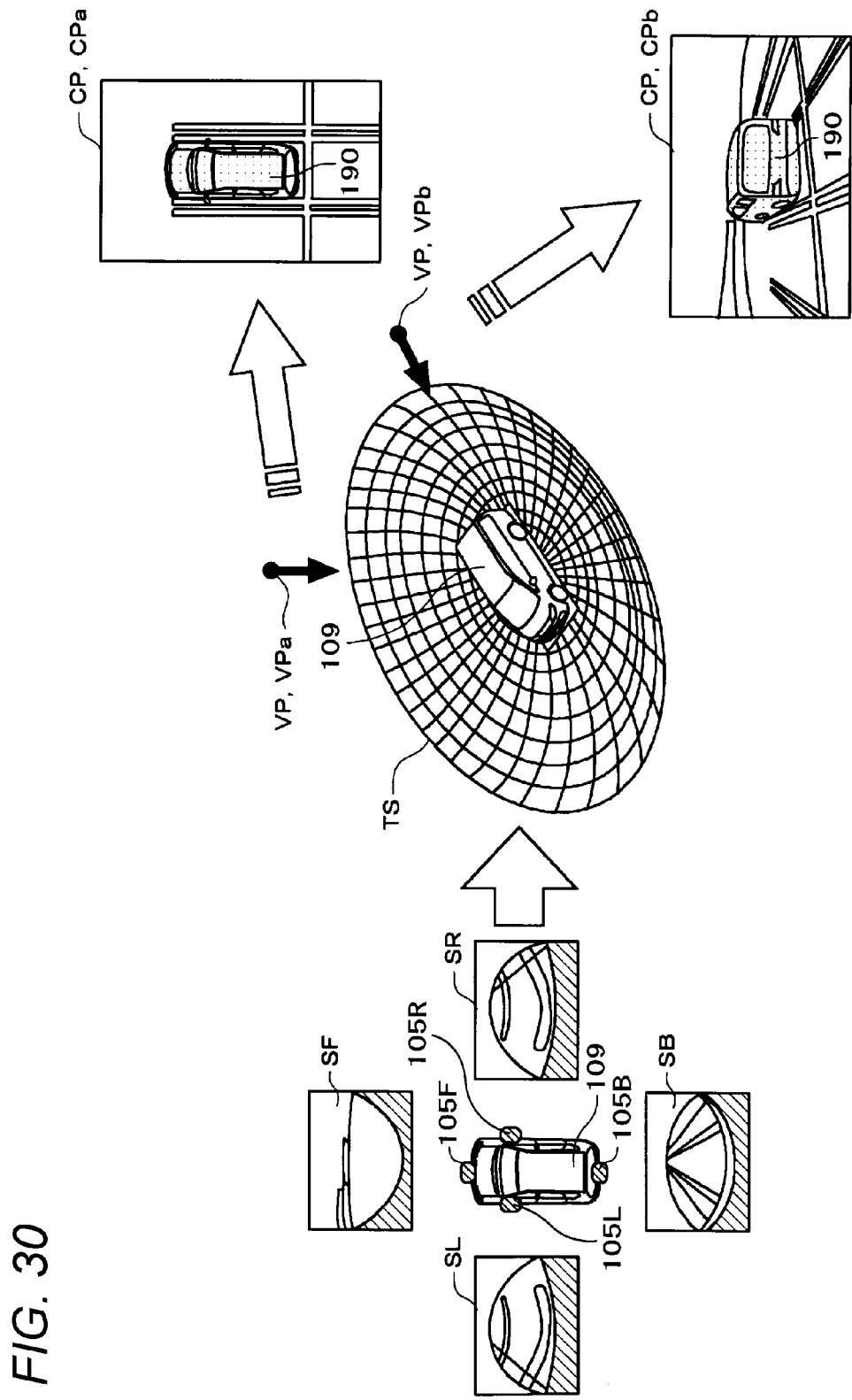
FIG. 30 illustrates a method with which the image display system shown in FIG. 28 generates a virtual perspective image.

FIG. 30 illustrates a method with which the first generation unit 122a generates a virtual perspective image. The first generation unit 122a is configured to generate a virtual perspective image having realistic sensation close to the reality by using a virtual three-dimensional projection plane TS for generation of the virtual perspective image.

The front camera 105F, the rear camera 105B, the left side camera 105L, and the right side camera 105R acquire four captured images SF, SB, SL, SR indicating the front, the rear, the left and the right of the vehicle 109, respectively. The four captured images SF, SB, SL, SR include data of the entire surroundings of the vehicle 109.

The first generation unit 122a projects the data (values of pixels) included in the four captured images SF, SB, SL, SR to the projection plane TS, which is a three-dimensional curved surface in a virtual three dimensional space. The projection plane TS has a substantially semispherical shape (a bowl shape), for example, and a central area (a bottom part of the bowl) thereof is defined as a position of the vehicle 109. Also, an outside of the position of the vehicle 109 on the projection plane TS is equivalent to an area of the periphery of the vehicle 109.

A correspondence relation between a position of the data included in the captured images SF, SB, SL, SR and a position of the projection plane TS is defined in advance. Table data indicating the correspondence relation is stored in the storage unit 127. The first generation unit 122a projects the data included in the four captured images SF, SB, SL, SR to the corresponding positions of the projection plane TS by using the table data.

The first generation unit 122a projects the data of the captured image SF of the front camera 105F to a part of the projection plane TS, which corresponds to the front of the vehicle 109. Also, the first generation unit 122a projects the data of the captured image SB of the rear camera 105B to a part of the projection plane TS, which corresponds to the rear of the vehicle 109. Also, the first generation unit 122a projects the data of the captured image SL of the left side camera 105L to a part of the projection plane TS, which corresponds to the left of the vehicle 109 and projects the data of a direction image SR of the right side camera 105R to a part of the projection plane TS, which corresponds to the right of the vehicle 109.

When the captured image data is projected to the projection plane TS in this way, the first generation unit 122a virtually configures a polygon model indicating a three dimensional shape of the vehicle 109 by using the vehicle body data 127b stored in the storage unit 127. The model of the vehicle 109 is arranged in a central area of the projection plane TS, which is the position of the vehicle 109 in the virtual three dimensional space.

On the other hand, the perspective control unit 120b sets a virtual perspective VP with respect to the three dimensional space. The virtual perspective VP is defined by a position and a direction of the line of sight. The perspective control unit 120b can set the virtual perspective VP at any position in any direction of the line of sight in the three dimensional space.

Then, the first generation unit 122a generates a virtual perspective image CP by using an area of a part of the projection plane TS corresponding to the virtual perspective VP set by the perspective control unit 120b. That is, the first generation unit 122a cuts, as an image, data of an area of the projection plane TS, which is included in a predetermined view angle as seen from the virtual perspective VP. The cut image includes a photographic subject image of the periphery of the vehicle 109. The first generation unit 122a makes a rendering for the model of the vehicle 109 in correspondence to the set virtual perspective VP and superimposes a resultant two-dimensional vehicle image 190 on the cut image. The vehicle image 190 indicates a shape of the vehicle body of the vehicle 109 as seen from the virtual perspective VP. Thereby, the first generation unit 122a generates a virtual perspective image CP indicative of the periphery of the vehicle 109 and the vehicle body of the vehicle 109 as seen from the virtual perspective VP.

For example, as shown in FIG. 30, when the perspective control unit 120b sets a virtual perspective VPa of which a position is set just above the vehicle 109 and a direction of the line of sight is made to face downwards, the first generation unit 122a generates a virtual perspective image (a bird's-eye view image) CPa looking down the periphery of the vehicle 109 and the vehicle body of the vehicle 109. Also, when the perspective control unit 120b sets a virtual perspective VPb of which a position is set at a left rear of the vehicle 109 and a direction of the line of sight is made to face towards the front of the vehicle 9, the first generation unit 122a generates a virtual perspective image CPb indicating the periphery of the vehicle 109 and the vehicle body of the vehicle 9 as seen from the left rear of the vehicle 109.

Figure 31:
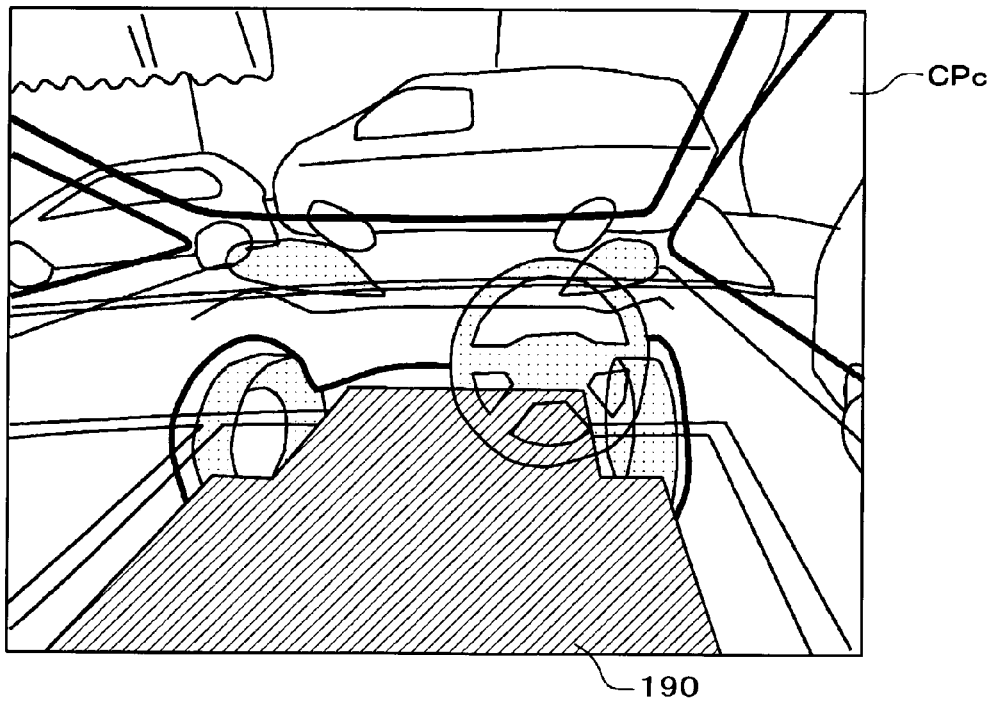
FIG. 31 depicts a virtual perspective image indicating a periphery of the vehicle as seen from a cabin in the image display system of FIG. 28.

Also, the perspective control unit 120b can set the position of the virtual perspective VP not only at the outside of the vehicle 109 but also within the cabin of the vehicle 109. When the perspective control unit 120b sets the position of the virtual perspective VP within the cabin of the vehicle 9, the first generation unit 122a generates a virtual perspective image CPc having realistic sensation indicating the periphery of the vehicle 109 and the vehicle body (interior) of the vehicle 109 as seen from the cabin of the vehicle 9, as shown in FIG. 31.

In the virtual perspective image CPc, the vehicle image 190 indicating the vehicle body (interior) of the vehicle 109 as seen from the perspective within the cabin is superimposed on the photographic subject image of the periphery of the vehicle 109 as seen from the perspective within the cabin of the vehicle 109. The user can check the shape of the surroundings of the vehicle 109 and intuitively recognize the shape of the periphery of the vehicle 109 by checking the virtual perspective image CPc.

The vehicle image 190, which is included in the virtual perspective image CPc as seen from the perspective within the cabin, is divided into a part corresponding to a vehicle body bottom and a part except for the vehicle body bottom. In the vehicle image 190, the part corresponding to the vehicle body bottom is made to be non-transparent. On the other hand, the part except for the vehicle body bottom in the vehicle image 190 is made to be transparent or semi-transparent, except for parts having a feature such as a tire and a frame. Thereby, even when the vehicle image 190 is included in the virtual perspective image CPc as seen from the perspective within the cabin, the user can check the shape of the photographic subject of the periphery of the vehicle 109.

A method with which the second generation unit 122b generates the virtual perspective image is the same as the above method of the first generation unit 122a.

The second generation unit 122b can generate a virtual perspective image, independently of the first generation unit 122a. Also, the perspective control unit 120b can set a virtual perspective of the virtual perspective image, which is to be generated by the second generation unit 122b, to a position and a direction of the line of sight different from the virtual perspective of the virtual perspective image, which is to be generated by the first generation unit 122a. Therefore, the first generation unit 122a and the second generation unit 122b can generate the virtual perspective images indicating the periphery of the vehicle 109 as seen from the different virtual perspectives at the same time.

<8-3. Operation Modes>

Figure 32:
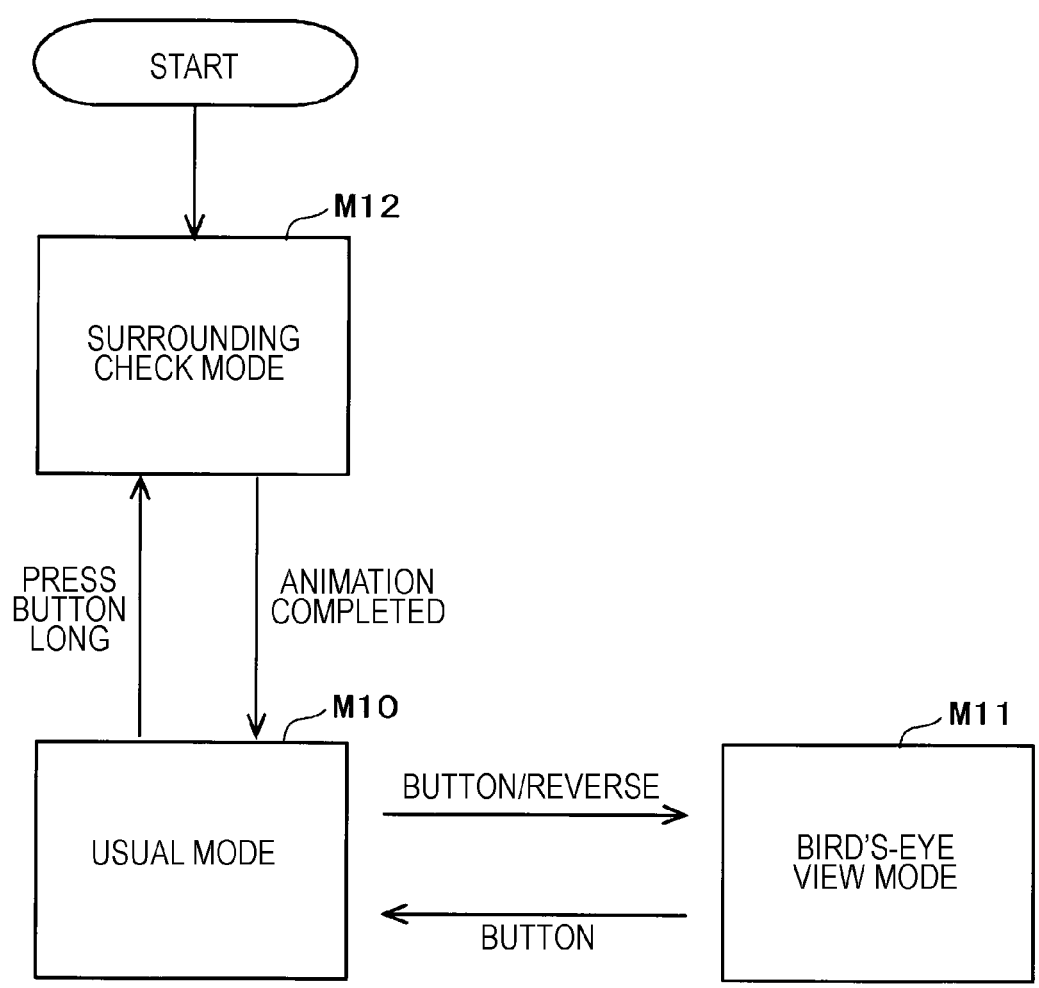
FIG. 32 depicts transition of the operation modes of the image display system shown in FIG. 28.

Subsequently, operation modes of the image display system 110 are described. FIG. 32 depicts transitions of the operation modes of the image display system 110. The image display system 110 has three operation modes of a usual mode M10, a bird's-eye view mode M11 and a surrounding check mode M12. The display control unit 120a is configured to switch the operation modes of the control unit 120, in correspondence to a state of the vehicle 109 and a user's operation.

The usual mode M10 is an operation mode in which a function of the image generation device 102 is not used. When the display device 103 has a navigation function, a map image and the like based on the navigation function are displayed on the display device 103 in the usual mode M10.

The bird's-eye view mode M11 and the surrounding check mode M12 are operation modes of using the functions of the image generation device 102. In these operation modes, the virtual perspective images, which are continuously generated by the image generation device 102, are displayed on the display device 103. Therefore, the user can recognize the shape of the periphery of the vehicle 109 substantially in real time by checking the virtual perspective images displayed on the display device 103.

The bird's-eye view mode M11 is an operation mode of displaying a bird's-eye view image, which is a virtual perspective image looking down the periphery of the vehicle 109 from the perspective just above the vehicle 109. The surrounding check mode M12 is an operation mode of displaying a virtual perspective image, which indicates the periphery of the vehicle 109 as seen from a perspective within the cabin of the vehicle 109.

In the surrounding check mode M12, the display device 103 is configured to display two virtual perspective images as seen from the perspectives within the cabin at the same time. The directions of the lines of sight of the virtual perspectives of the two virtual perspective images are respectively altered, and an animation indicating the surroundings of the vehicle 109 is performed on the display device 103. The user can check the shape of the surroundings of the vehicle 109 by checking the two virtual perspective images.

As shown in FIG. 32, when the image display system 110 starts, the display control unit 120a first sets the operation mode thereof to the surrounding check mode M12. In the surrounding check mode M12, an animation indicating the surroundings of the vehicle 109 is performed. When the animation is over, the display control unit 120a switches the operation mode to the usual mode M10. Also, in the usual mode M10, when the user presses the operation button 104 long (when the user continues to press the operation button for a predetermined time period or longer), the display control unit 120a switches the operation mode to the surrounding check mode M12.

Also, in the usual mode M10, when the user presses the operation button 104 for a usual time period or the shift position of the vehicle 109 is reversed, the display control unit 120a switches the operation mode to the bird's-eye view mode M11. Also, in the bird's-eye view mode M11, when the user presses the operation button 104, the display control unit 120a switches the operation mode to the usual mode M10.

<8-4. Surrounding Check Mode>

Subsequently, the surrounding check mode M12 is described in more detail. As described above, in the surrounding check mode M12, the display device 103 (an example of the display unit) is configured to display the two virtual perspectives images as seen from the perspectives within the cabin at the same time. More specifically, the display device 103 is configured to display the display image in which the virtual perspective image generated by the first generation unit 122a and the virtual perspective image generated by the second generation unit 122b are arranged in a line. In the below, the virtual perspective image generated by the first generation unit 122a is referred to as 'first image,' and the virtual perspective image generated by the second generation unit 122b is referred to as 'second image.' Also, the virtual perspective of the first image is referred to as 'first virtual perspective', and the virtual perspective of the second image is referred to as 'second virtual perspective.'

Figure 33:
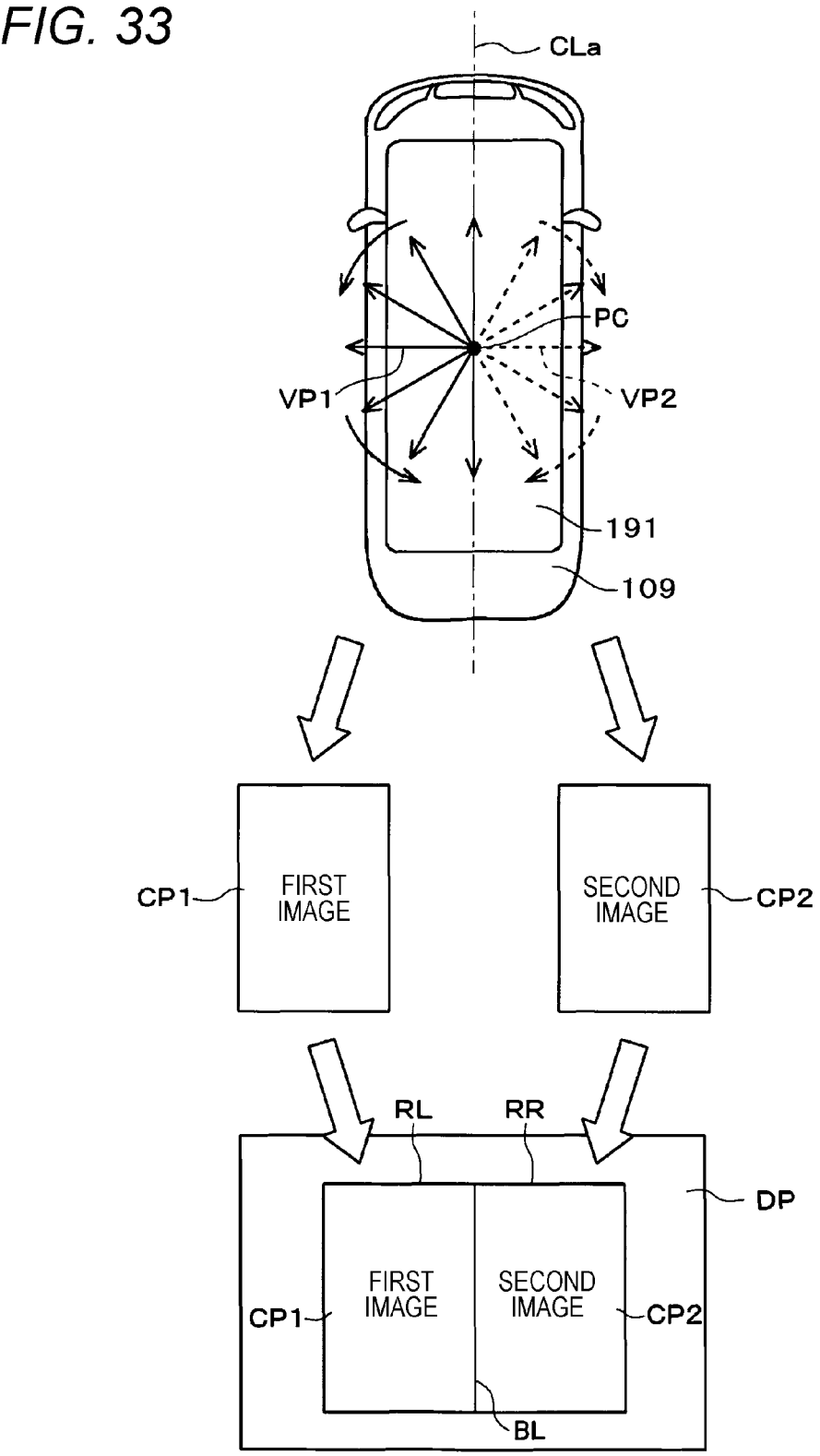
FIG. 33 illustrates a method with which the image display system shown in FIG. 28 generates a display image.

FIG. 33 illustrates a method of generating the display image DP that is to be displayed by the display device 103 in the surrounding check mode M12. In the surrounding check mode M12, the perspective control unit 120b sets both positions of a first virtual perspective VP1 and a second virtual perspective VP2 within the cabin 191 of the vehicle 109.

The first generation unit 122a generates a first image CP1 indicating the periphery of the vehicle 109 as seen from the first virtual perspective VP1. On the other hand, the second generation unit 122b generates a second image CP2 indicating the periphery of the vehicle 109 as seen from the second virtual perspective VP2. The first generation unit 122a and the second generation unit 122b generate the first image CP1 and the second image CP2 at the same time.

The image adjustment unit 123 generates a display image DP in which the first image CP1 and the second image CP2 generated as described above are arranged to be adjacent right and left. As shown in FIG. 33, the image adjustment unit 123 arranges the first image CP1 at a left side of a boundary line BL and the second image CP2 at a right side of the boundary line BL under control of the display control unit 120a, respectively.

In this way, the display device 103 displays the display image DP including both the first image CP1 and the second image CP2. Therefore, the display device 103 displays the first image CP1 in a display area RL positioned at the relatively left side and the second image CP2 in a display area RR positioned at the relatively right side.

Also, the perspective control unit 120b gradually alters the directions of the lines of sight of the two virtual perspectives VP1, VP2, respectively. At a state where the perspective control unit 120b gradually alters the directions of the two virtual perspectives VP1, VP2 in this way, the first generation unit 122a and the second generation unit 122b continuously (temporally continuously) generate the first image CP1 and the second image CP2, respectively. Thereby, the animations indicating the shape of the periphery of the vehicle 109 are respectively performed in the display area RL and the display area RR of the display device 103.

Figure 34:
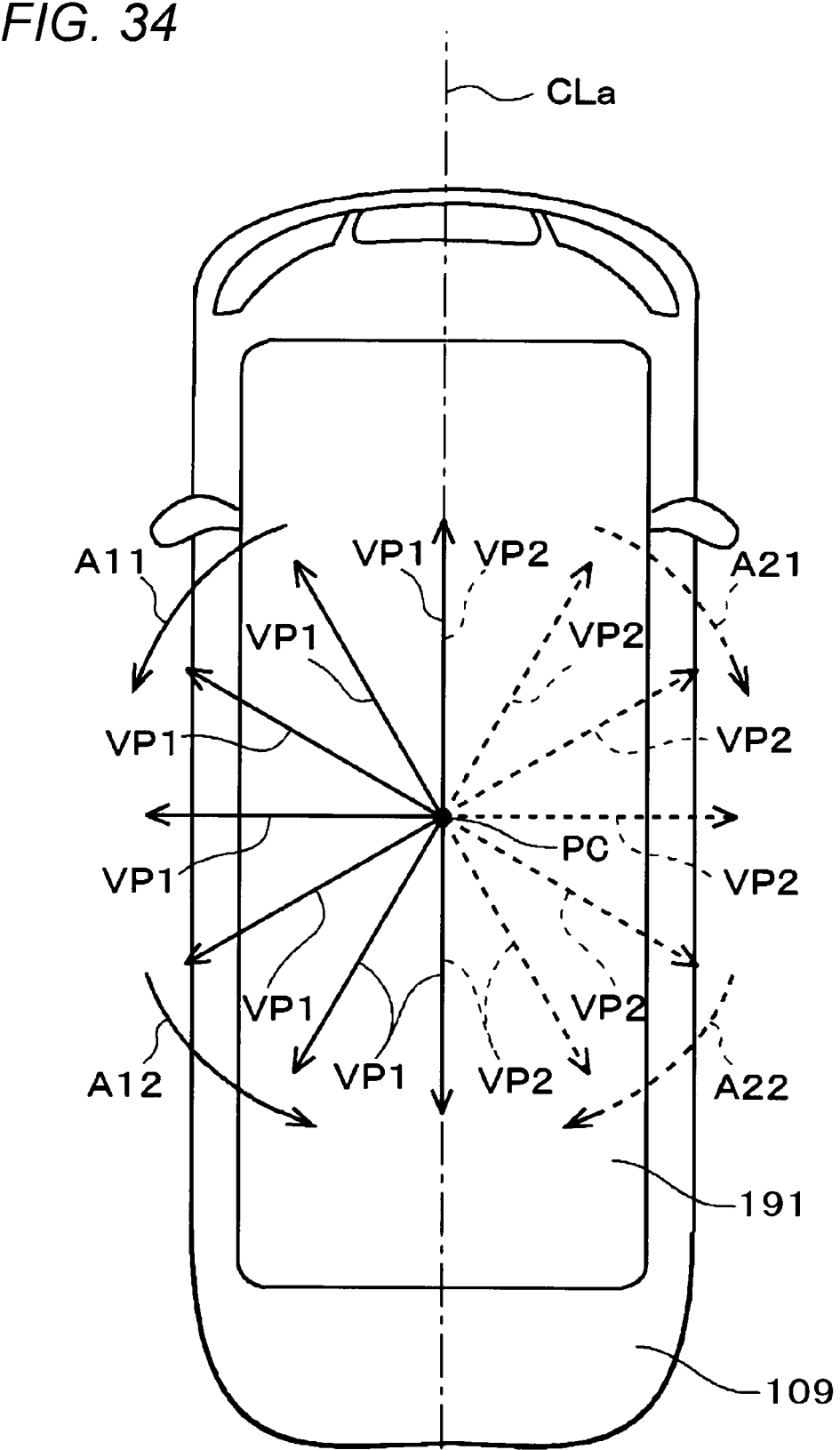
FIG. 34 depicts moving paths of two virtual perspectives in the image display system of FIG. 28.

FIG. 34 depicts moving paths of the two virtual perspectives VP1, VP2 in the surrounding check mode M12, showing the vehicle 109 in a plan view. In FIG. 34, the first virtual perspective VP1 is indicated by a solid arrow, and the second virtual perspective VP2 is indicated by a dashed arrow. The start points of the arrows indicating the virtual perspectives VP1, VP2 indicate positions of the virtual perspectives VP1, VP2. Also, the directions of the arrows indicating the virtual perspectives VP1, VP2 indicate the directions of the lines of sight (angles relative to the vehicle 109 in a plan view) of the virtual perspectives VP1, VP2.

As shown in FIG. 34, the perspective control unit 120b sets both the positions of the first virtual perspective VP1 and the second virtual perspective VP2 to a central position PC of the vehicle 109 within the cabin 191. The central position PC is a position becoming a substantial center of the vehicle 109 in the front-back direction and a substantial center of the vehicle 109 in the left-right direction. The perspective control unit 120b keeps the position of the first virtual perspective VP1 and the position of the second virtual perspective VP2 at the central position PC.

In the meantime, the perspective control unit 120b (an example of the altering control unit) alters the direction of the line of sight of the first virtual perspective VP1 and the direction of the line of sight of the second virtual perspective VP2 in opposite directions from the front of the vehicle 109 to the opposite rear of the vehicle 109.

Specifically, the perspective control unit 120b first makes the directions of the lines of sight of both the first virtual perspective VP1 and the second virtual perspective VP2 face towards the front in the front-back direction of the vehicle 109, which is the initial direction. Then, the perspective control unit 120b continuously alters the direction of the line of sight of the first virtual perspective VP1 in the counterclockwise direction (an arrow A11) and the direction of the line of sight of the second virtual perspective VP2 in the clockwise direction (an arrow A21) at a constant angular speed, respectively.

Thereby, the perspective control unit 120b continuously alters the direction of the line of sight of the first virtual perspective VP1 from the front of the vehicle 109 to the rear in the front-back direction of the vehicle 109, which is the final direction, via the left of the vehicle 109 (arrows A11, A12). Also, at the same time, the perspective control unit 120b continuously alters the direction of the line of sight of the second virtual perspective VP2 from the front of the vehicle 109 to the rear in the front-back direction of the vehicle 109, which is the final direction, via the right of the vehicle 109 (arrows A21, A22).

The perspective control unit 120b alters the directions of the lines of sight of both the first virtual perspective VP1 and the second virtual perspective VP2 in the opposite directions at the same angular speed. For this reason, the direction of the line of sight of the first virtual perspective VP1 and the direction of the line of sight of the second virtual perspective VP2 are always symmetric with respect to a left-right central line CLa following the front-back direction of the vehicle 109.

In this way, the direction of the line of sight of the first virtual perspective VP1 is altered from the front of the vehicle 109 to the rear of the vehicle 109 via the left of the vehicle 109. On the other hand, the direction of the line of sight of the second virtual perspective VP2 is altered from the front of the vehicle 109 to the rear of the vehicle 109 via the right of the vehicle 109. Therefore, as shown in FIG. 33, the animation to circle a left half of the surroundings of the vehicle 109 is performed in the display area RL of the display device 103 indicating the first image CP1 based on the first virtual perspective VP1. Also, at the same time, the animation to circle a right half of the surroundings of the vehicle 109 is performed in the display area RR of the display device 103 indicating the second image CP2 based on the second virtual perspective VP2.

Figure 35:
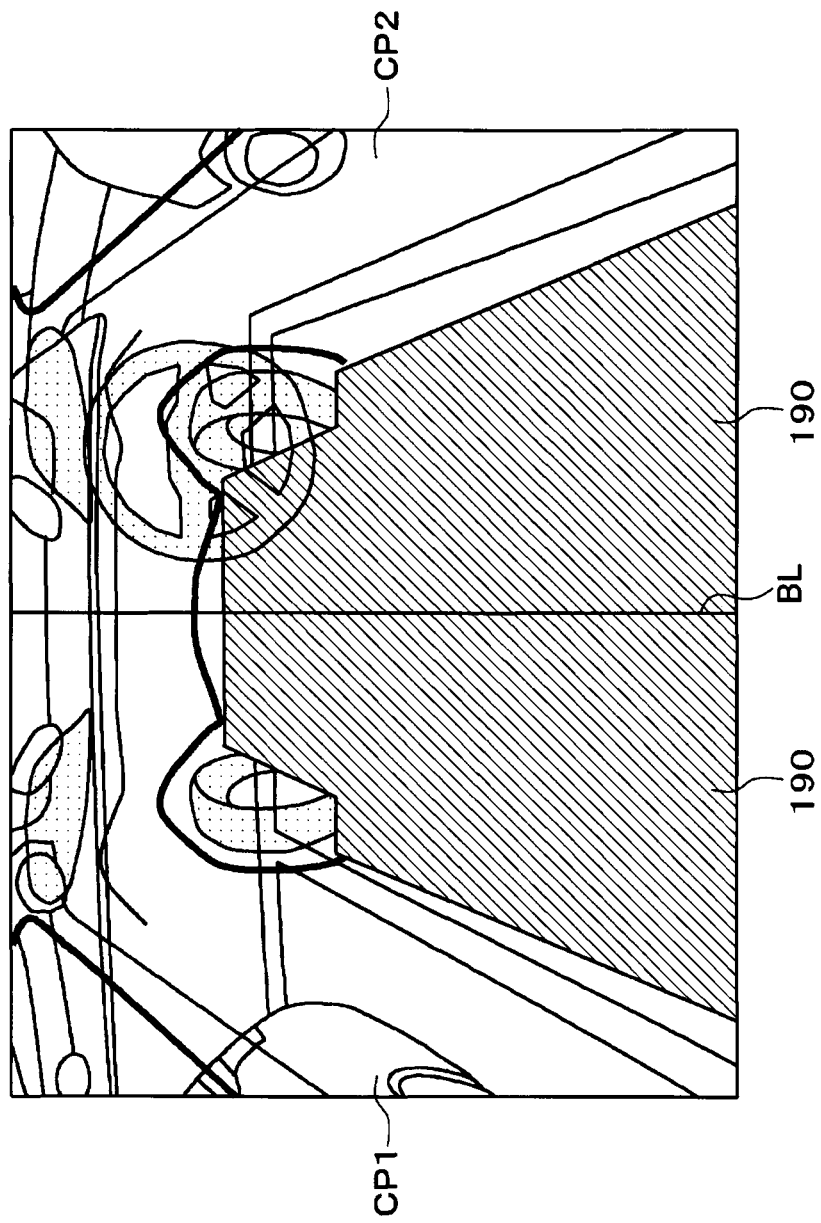
FIG. 35 depicts examples of a first image and a second image in the image display system of FIG. 28.

FIG. 35 depicts examples of the first image CP1 and the second image CP2 when the directions of the lines of sight of both the first virtual perspective VP1 and the second virtual perspective VP2 are made to face towards the front of the vehicle 109, which is the initial direction. The first image CP1 indicates a shape of the left front of the vehicle 109, and the second image CP2 indicates a shape of the right front of the vehicle 109. In this case, one image in which the boundary line BL is omitted and the first image CP1 and the second image CP2 are integrated may also be made.

Figure 36:
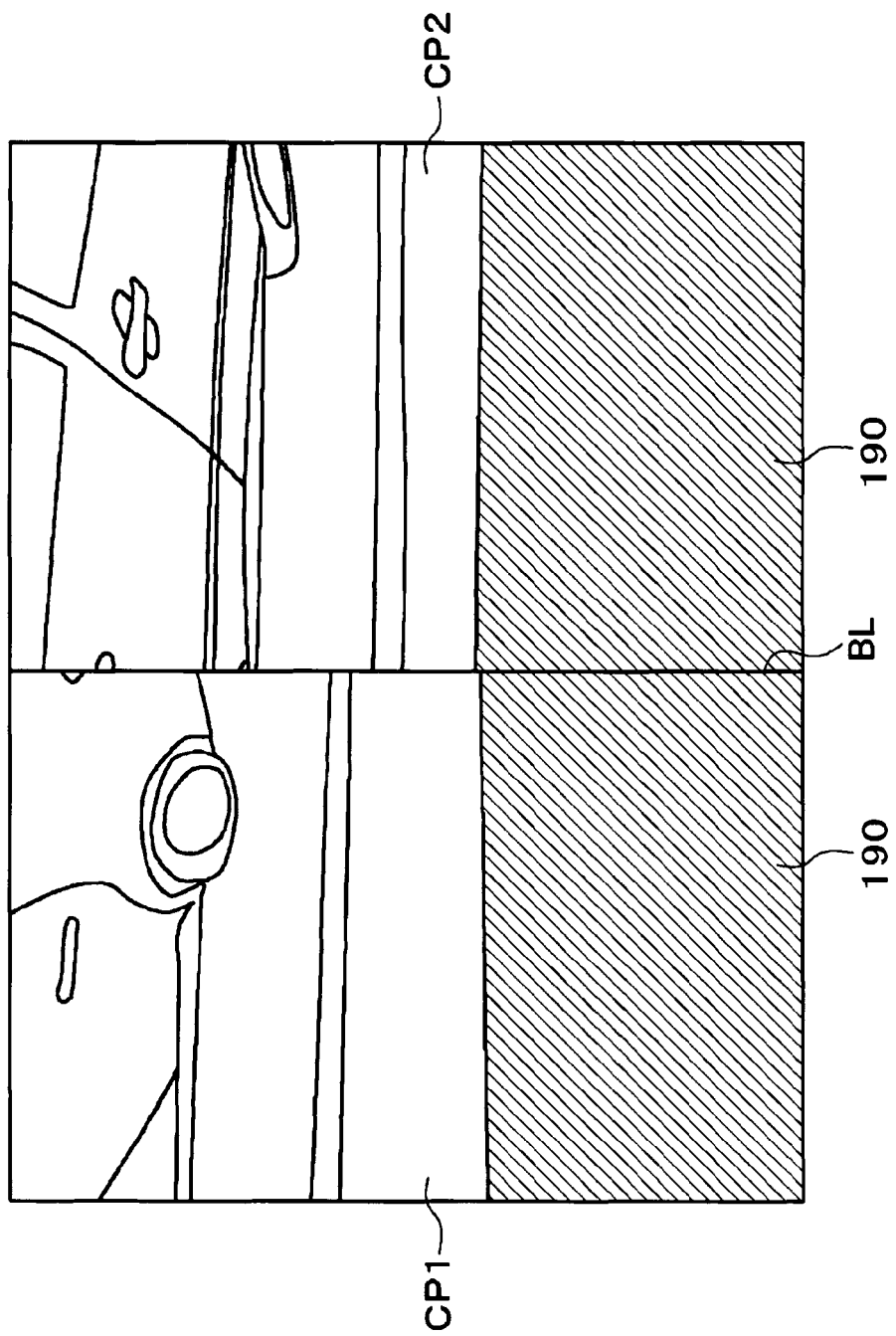
FIG. 36 depicts other examples of the first image and the second image in the image display system of FIG. 28.

FIG. 36 depicts examples of the first image CP1 and the second image CP2 when the direction of the line of sight of the first virtual perspective VP1 is made to face towards the left of the vehicle 109 and the direction of the line of sight of the second virtual perspective VP2 is made to face towards the right of the vehicle 109, respectively, subsequently to FIG. 35. The first image CP1 indicates a shape of the left of the vehicle 109, and the second image CP2 indicates a shape of the right of the vehicle 109.

Figure 37:
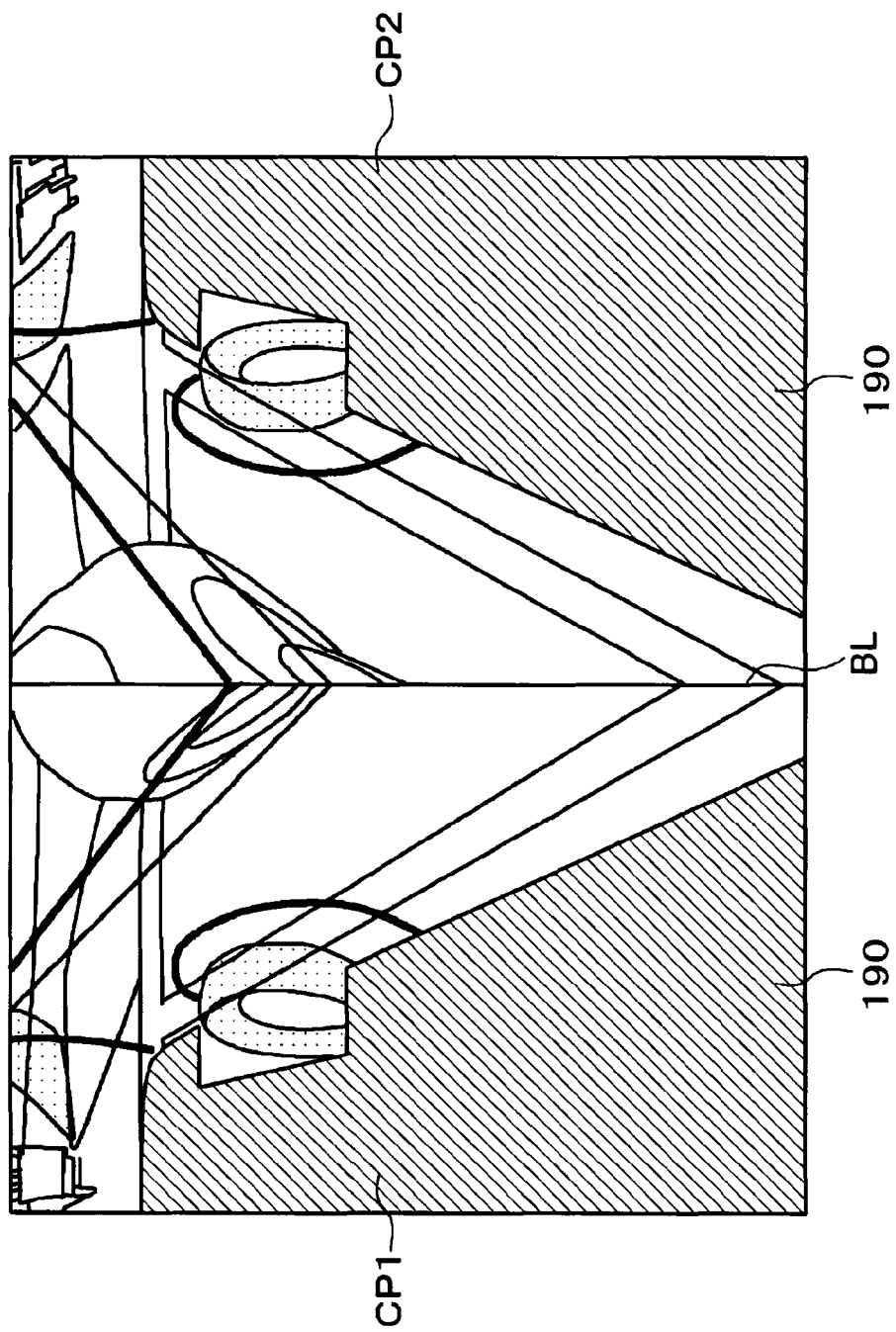
FIG. 37 depicts other examples of the first image and the second image in the image display system of FIG. 28.

FIG. 37 depicts examples of the first image CP1 and the second image CP2 when the directions of the lines of sight of both the first virtual perspective VP1 and the second virtual perspective VP2 are made to face towards the rear of the vehicle 109, which is the final direction, subsequently to FIG. 36. The first image CP1 indicates a shape of the left rear of the vehicle 109, and the second image CP2 indicates a shape of the right rear of the vehicle 109.

The user can check the first image CP1, which indicates the left half of the surroundings of the vehicle 109, and the second image CP2, which indicates the right half of the surroundings of the vehicle 109, at the same time. Therefore, the user can check the entire shape of the surroundings of the vehicle 109 in a relatively short time period.

Figure 38:
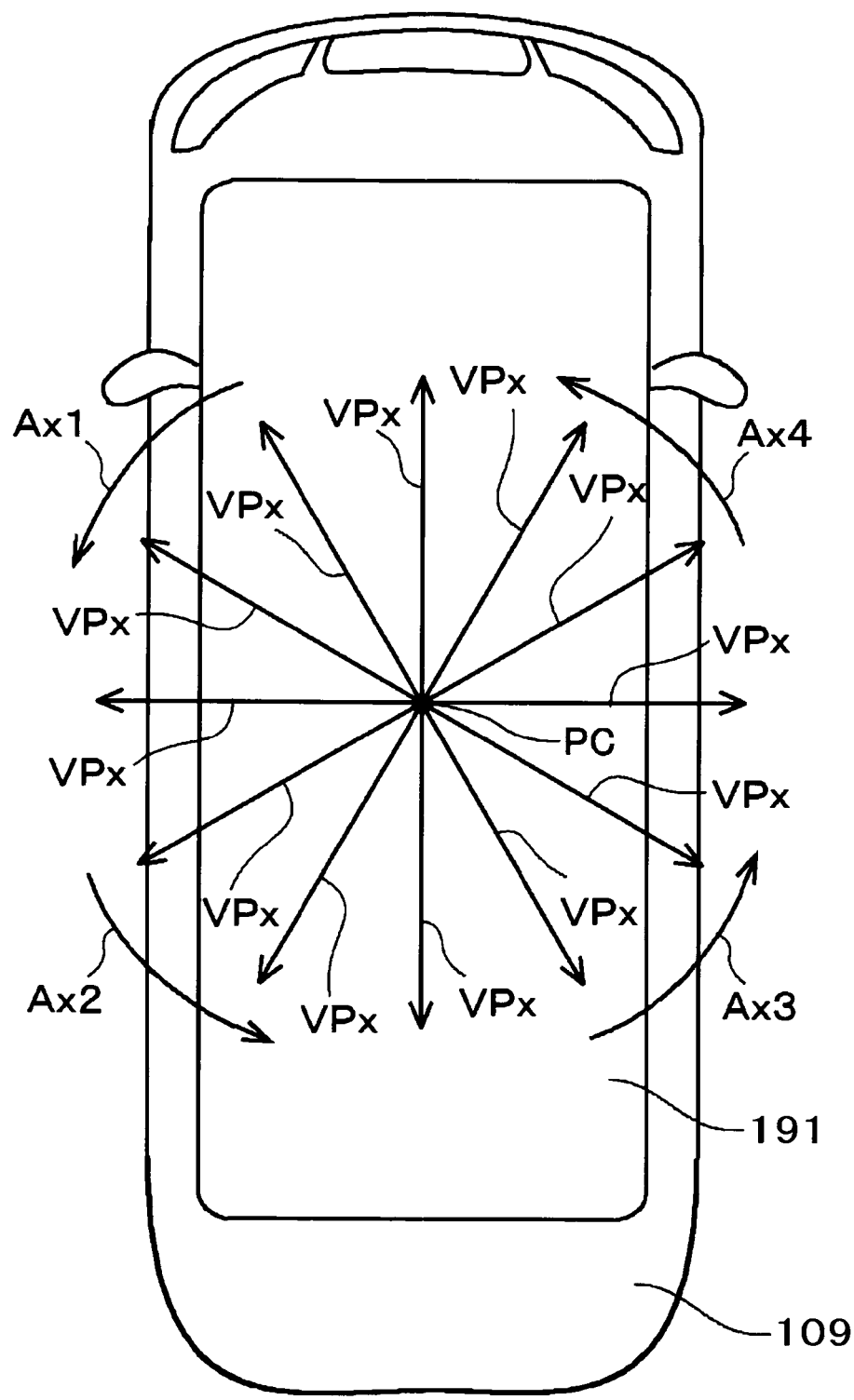
FIG. 38 depicts a moving path of the virtual perspective in accordance with a comparative example.

FIG. 38 depicts a moving path of a virtual perspective VPx in a comparative example. In the comparative example, only one virtual perspective VPx is set. The direction of the line of sight of the virtual perspective VPx is altered to go around from the front of the vehicle 109 in the counterclockwise direction and to return to the front of the vehicle 109 (arrows Ax1, Ax2, Ax3, Ax4).

Figure 39:
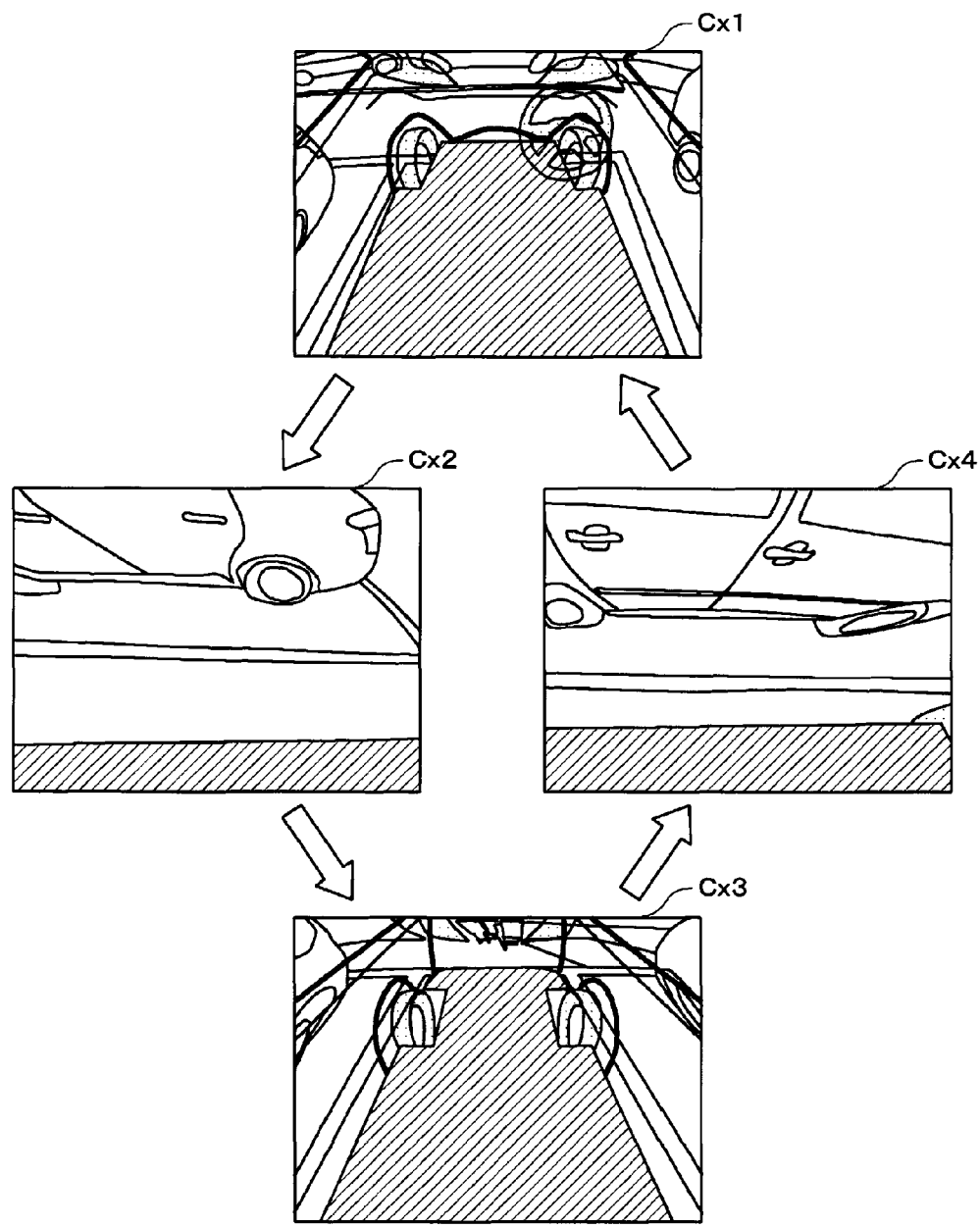
FIG. 39 depicts an example of a virtual perspective image generated by the virtual perspective in accordance with the comparative example.

FIG. 39 depicts an example of a virtual perspective image that is to be generated in the comparative example. In this case, virtual perspective images Cx1, Cx2, Cx3, Cx4 indicating the front, the left, the rear and the right of the vehicle 109 are respectively generated in correspondence to the direction of the line of sight of the virtual perspective VPx. When the direction of the line of sight of the virtual perspective VPx returns to the front of the vehicle 109, the virtual perspective image Cx1 indicating the front of the vehicle 109 is again generated.

According to this comparative example, it is necessary to alter the direction of the line of sight of the virtual perspective by 360° so that the virtual perspective image indicates the entire surroundings of the vehicle 109. For this reason, the time is relatively much consumed so that the virtual perspective image indicates the entire periphery of the vehicle.

In contrast, the image display system 110 of this illustrative embodiment is configured to respectively alter the directions of the lines of sight of the two virtual perspectives VP1, VP2 in the opposite directions by 180° (refer to FIG. 34) and to display the first image CP1 and the second image CP2 generated on the basis of the two virtual perspectives VP1, VP2 at the same time. For this reason, if the angular speed at which the direction of the line of sight is altered is the same as the comparative example, the image display system 110 can indicate the entire surroundings of the vehicle 109 in a half time period of the comparative example. Therefore, the user can check the entire shape of the surroundings of the vehicle 109 in a relatively short time period by using the image display system 110.

Also, the display device 103 is configured to display the first image CP1 mainly indicating the left of the vehicle 109 in the display area RL positioned at the relatively side left and to display the second image CP2 mainly indicating the right of the vehicle 109 in the display area RR positioned at the relatively right side (refer to FIG. 33). For this reason, the user can intuitively recognize at which of the left and the right of the vehicle 109 the photographic subjects indicated by the first image CP1 and the second image CP2 are respectively positioned.

Also, the direction of the line of sight of the first virtual perspective VP1 and the direction of the line of sight of the second virtual perspective VP2 are symmetric with respect to the left-right central line CLa of the vehicle 109 (refer to FIG. 34). For this reason, the user can easily recognize the positions of the photographic subjects indicated by each of the first image CP1 and the second image CP2.

<8-5. Operation Flow>

Figure 40:
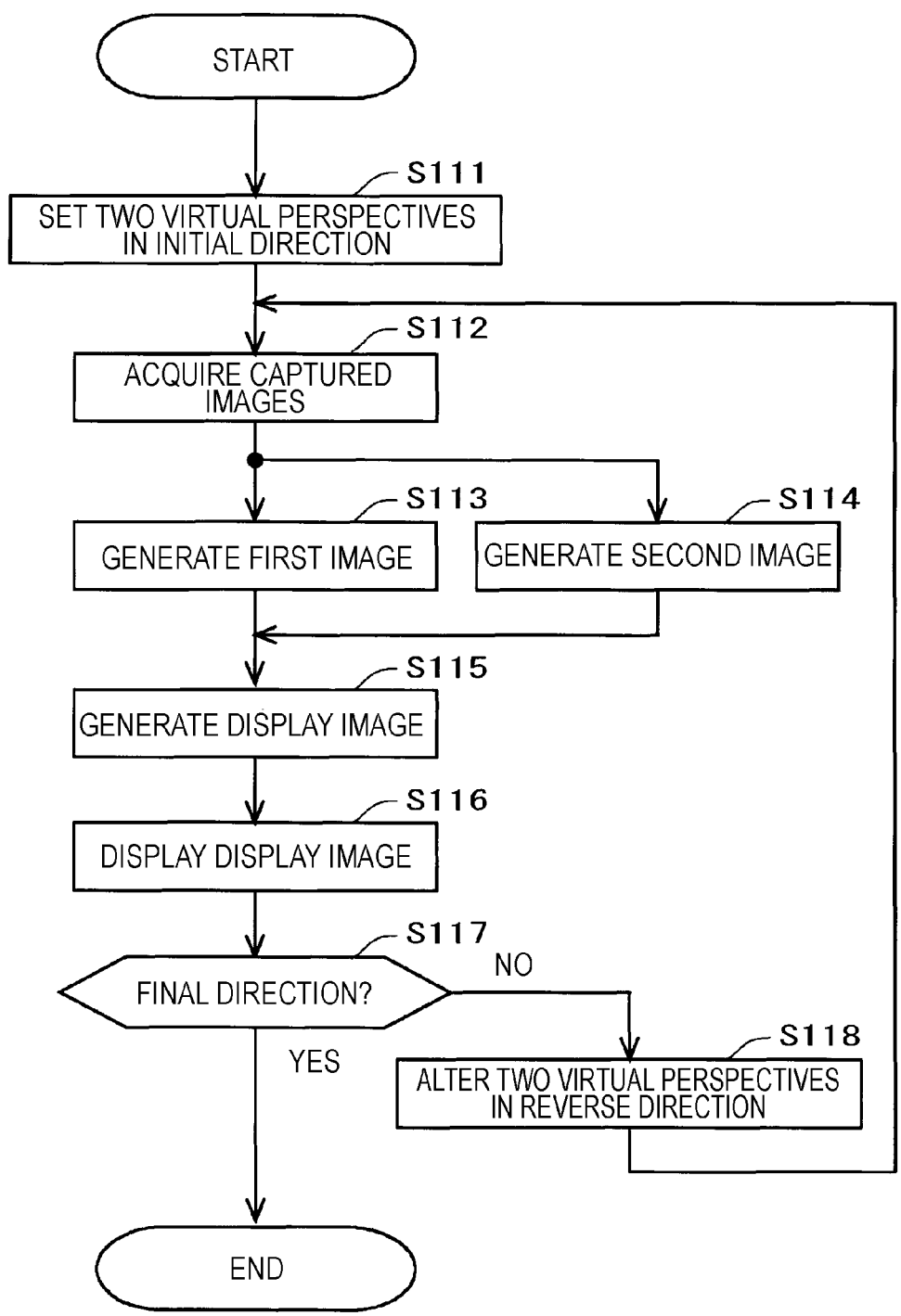
FIG. 40 depicts an operation flow of the image display system shown in FIG. 28.

Subsequently, an operation flow of the image display system 110 in the surrounding check mode M12 is described. FIG. 40 depicts an operation flow of the image display system 110 in the surrounding check mode M12.

When the operation mode is the surrounding check mode M12, the perspective control unit 120b first sets the positions and the directions of the lines of sight of the first virtual perspective VP1 and the second virtual perspective VP2 (step S111). The perspective control unit 120b sets the positions of both the two virtual perspectives VP1, VP2 to the central position PC within the cabin 191, and also makes the directions of the lines of sight of both the two virtual perspectives VP1, VP2 face towards the front of the vehicle 109, which is the initial direction.

Then, each of the four cameras 105 provided for the vehicle 109 captures the periphery of the vehicle 109. The image acquisition unit 121 acquires the four captured image data obtained from the four cameras 105 (step S112).

Then, the first generation unit 122a of the image generation circuit 122 generates the first image CP1 by using the four captured image data (step S113). At the same time, the second generation unit 122b of the image generation circuit 122 generates the second image CP2 by using the four captured image data (step S114).

Then, the image adjustment unit 123 generates the display image DP in which the first image CP1 generated by the first generation unit 122a and the second image CP2 generated by the second generation unit 122b are arranged in a line (step S115). The image adjustment unit 123 arranges the first image CP1 at the relatively left side and the second image CP2 at the relatively right side.

Then, the image output unit 124 outputs the display image DP to the display device 103. Thereby, the display device 103 displays the display image DP including both the first image CP1 and the second image CP2 (step S116). The display device 103 displays the first image CP1 in the display area RL positioned at the relatively left side and the second image CP2 in the display area RR positioned at the relatively right side.

Then, as shown in FIG. 34, the perspective control unit 120b alters a little the directions of the lines of sight of the two virtual perspectives VP1, VP2 in the opposite directions (step S118). The processing returns to step S112, and the same processing as steps S112 to S116 is repeated. The processing (steps S112 to S116, S118) is repeated with a predetermined period (for example, a period of 1/30 second).

By the above processing, while the perspective control unit 120b gradually alters the directions of the two virtual perspectives VP1, VP2, the first generation unit 122a and the second generation unit 122b continuously generates the first image CP1 and the second image CP2, respectively. As a result, the animations indicating the shape of the periphery of the vehicle 109 are respectively performed in the display area RL and the display area RR of the display device 103.

When the perspective control unit 120b alters the directions of the two virtual perspectives VP1, VP2 to the rear of the vehicle 109, which is the final direction (Yes in step S117), the operation of the image display system 110 in the surrounding check mode M12 is over.

9. Eighth Illustrative Embodiment

Subsequently, an eighth illustrative embodiment is described. In the below, the differences from the seventh illustrative embodiment are mainly described, and the descriptions about the same or similar configurations and operations as or to the seventh illustrative embodiment are omitted.

In the seventh illustrative embodiment, the perspective control unit 120b is configured to keep the positions of both the first virtual perspective VP1 and the second virtual perspective VP2 at the central position PC in the surrounding check mode M12. In the eighth illustrative embodiment, the perspective control unit 120b is configured to move the positions of the first virtual perspective VP1 and the second virtual perspective VP2.

Figure 41:
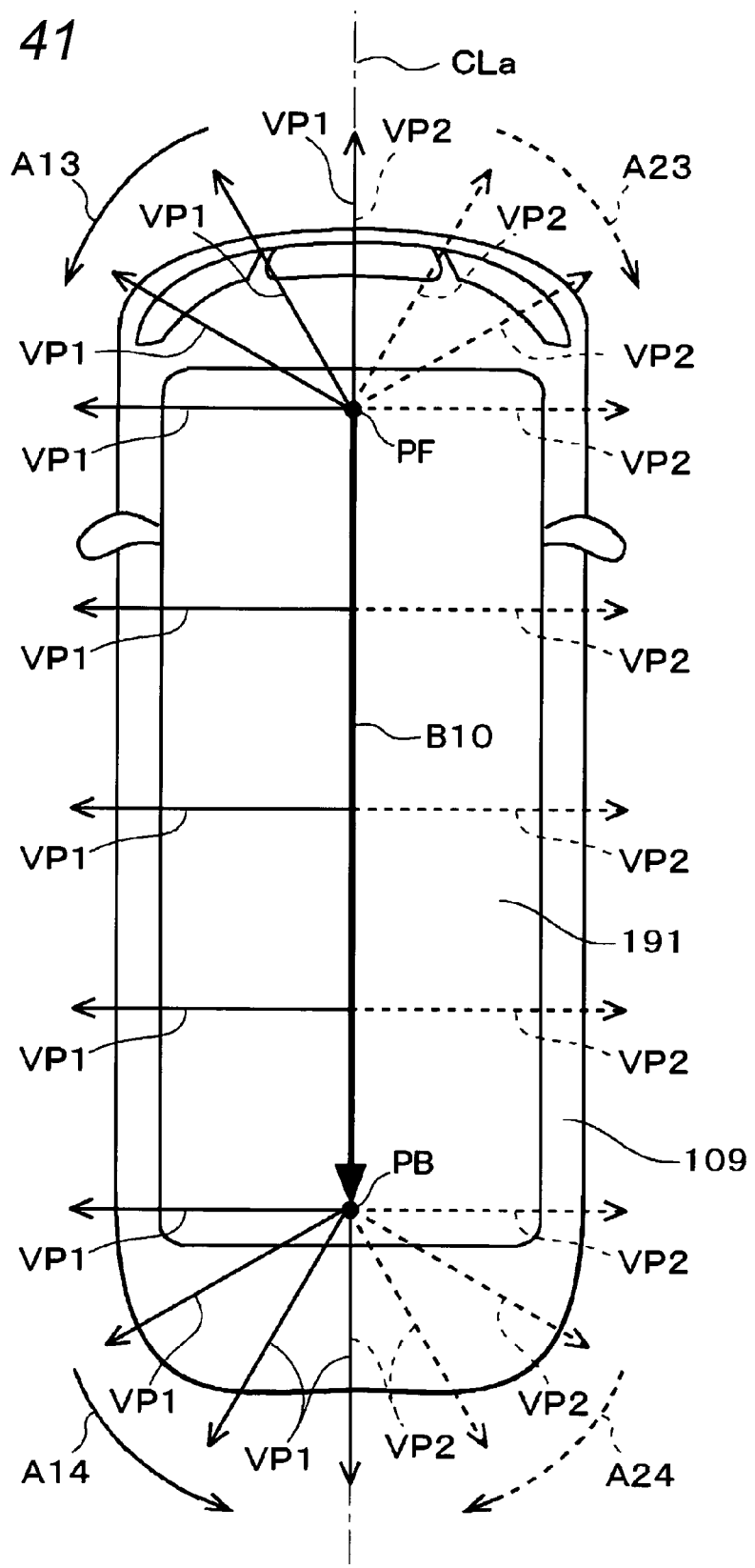
FIG. 41 depicts moving paths of two virtual perspectives in an image display system in accordance with an eighth illustrative embodiment.

FIG. 41 depicts moving paths of the two virtual perspectives VP1, VP2 in the surrounding check mode M12 of the eighth illustrative embodiment. The perspective control unit 120b (an example of the moving control unit) is configured to linearly move the positions of the first virtual perspective VP1 and the second virtual perspective VP2 in the front-back direction of the vehicle 109.

Also in the eighth illustrative embodiment, the direction of the line of sight of the first virtual perspective VP1 and the direction of the line of sight of the second virtual perspective VP2 are always symmetric with respect to the left-right central line CLa following the front-back direction of the vehicle 109. Also, the position of the first virtual perspective VP1 and the position of the second virtual perspective VP2 are always the same.

First, the perspective control unit 120b makes the directions of the lines of sight of both the first virtual perspective VP1 and the second virtual perspective VP2 face towards the front in the front-back direction of the vehicle 109, which is the initial direction. Also, the perspective control unit 120b sets the positions of both the first virtual perspective VP1 and the second virtual perspective VP2 to a position of the front central position (hereinafter, referred to as 'front central position') PF of the cabin 191, which is the initial position.

Then, the perspective control unit 120b alters the directions of the lines of sight of both the first virtual perspective VP1 and the second virtual perspective VP2 in the opposite directions by 90° with keeping the positions of both the first virtual perspective VP1 and the second virtual perspective VP2 at the front central position PF. That is, the perspective control unit 120b continuously alters the direction of the line of sight of the first virtual perspective VP1 in the counterclockwise direction at the constant angular speed so that it faces towards the left in the left-right direction of the vehicle 109 (an arrow A13). Also, at the same time, the perspective control unit 120b continuously alters the direction of the line of sight of the second virtual perspective VP2 in the clockwise direction at the constant angular speed so that it faces towards the right in the left-right direction of the vehicle 109 (an arrow A23).

Then, the perspective control unit 120b moves the positions of both the first virtual perspective VP1 and the second virtual perspective VP2 to the rear along the front-back direction of the vehicle 109 with keeping the directions of the lines of sight of the first virtual perspective VP1 and the second virtual perspective VP2. That is, the perspective control unit 120b continuously moves the positions of both the first virtual perspective VP1 and the second virtual perspective VP2 from the front central position PF to a position of the rear center (hereinafter, referred to as 'rear central position') PB of the cabin 191, which is the final position, at the constant speed (an arrow B10).

Then, the perspective control unit 120b alters the directions of the lines of sight of both the first virtual perspective VP1 and the second virtual perspective VP2 in the opposite directions by 90° with keeping the positions of both of the first virtual perspective VP1 and the second virtual perspective VP2 at the rear central position PB. That is, the perspective control unit 120b continuously alters the direction of the line of sight of the first virtual perspective VP1 in the counterclockwise direction at the constant angular speed so that it faces towards the rear in the front-back direction of the vehicle 109 (an arrow A14). Also, at the same time, the perspective control unit 120b continuously alters the direction of the line of sight of the second virtual perspective VP2 in the clockwise direction at the constant angular speed so that it faces towards the rear in the front-back direction of the vehicle 109 (an arrow A24). Thereby, the directions of the lines of sight of both the first virtual perspective VP1 and the second virtual perspective VP2 are finally made to face towards the rear of the vehicle 109, which is the final direction.

In this way, the perspective control unit 120b is configured to move the position of the first virtual perspective VP1 in correspondence to the direction of the line of sight of the first virtual perspective VP1, and to move the position of the second virtual perspective VP2 in correspondence to the direction of the line of sight of the second virtual perspective VP2.

That is, when making the direction of the line of sight of the first virtual perspective VP1 face towards the front of the vehicle 109, the perspective control unit 120b sets the position of the first virtual perspective VP1 at the front side of the cabin 191. Also, when making the direction of the line of sight of the first virtual perspective VP1 face towards the rear of the vehicle 109, the perspective control unit 120b sets the position of the first virtual perspective VP1 at the rear side of the cabin 191. Likewise, when making the direction of the line of sight of the second virtual perspective VP2 face towards the front of the vehicle 109, the perspective control unit 120b sets the position of the second virtual perspective VP2 at the front side of the cabin 191. Also, when making the direction of the line of sight the second virtual perspective VP2 face towards the rear of the vehicle 109, the perspective control unit 120b sets the position of the second virtual perspective VP2 at the rear side of the cabin 191. In this way, the positions of the virtual perspectives VP1, VP2 are also moved to come close to the directions of the lines of sight of the virtual perspectives VP1, VP2, so that it is possible to improve the visibility of the photographic subject images of the vehicle 109 included in the virtual perspective images CP1, CP2.

Figure 42:
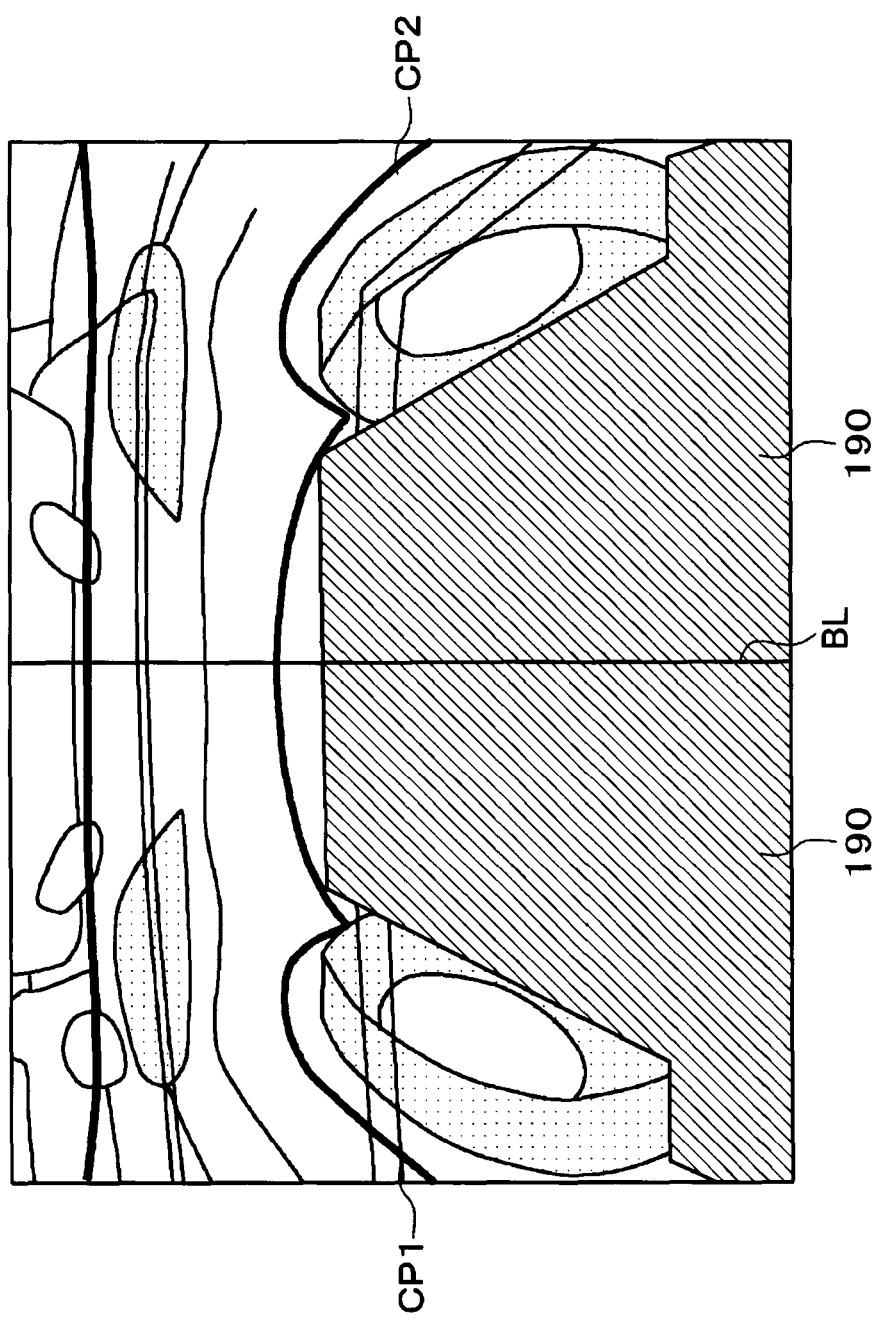
FIG. 42 depicts examples of the first image and the second image in the image display system of FIG. 41.

FIG. 42 depicts examples of the first image CP1 and the second image CP2 when the directions of the lines of sight of both the first virtual perspective VP1 and the second virtual perspective VP2 are made to face towards the front of the vehicle 109, which is the initial direction, in the eighth illustrative embodiment. The first image CP1 indicates a shape of the left front of the vehicle 109, and the second image CP2 indicates a shape of the right front of the vehicle 109.

Figure 43:
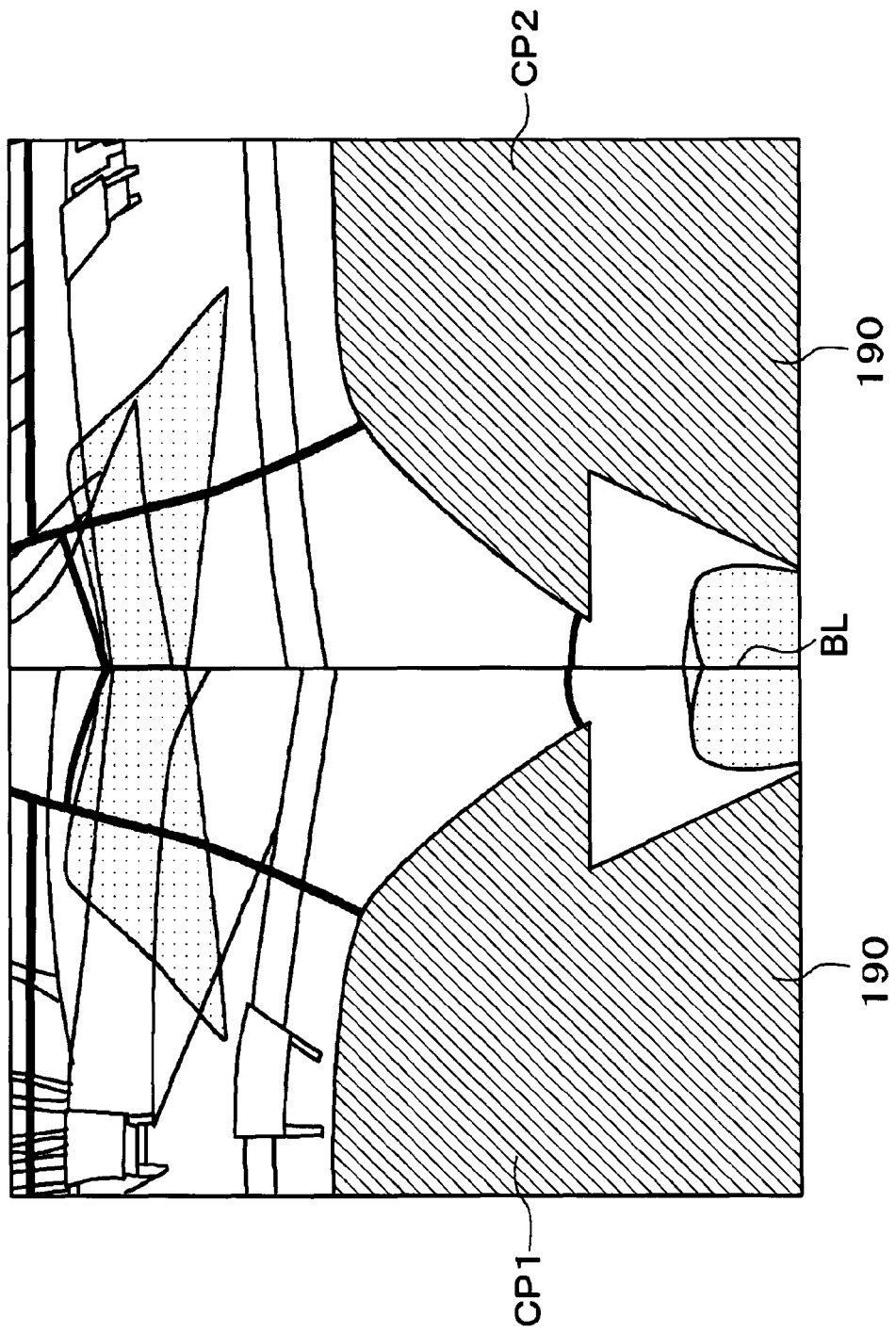
FIG. 43 depicts other examples of the first image and the second image in the image display system of FIG. 41.

Also, FIG. 43 depicts examples of the first image CP1 and the second image CP2 when the directions of the lines of sight of both the first virtual perspective VP1 and the second virtual perspective VP2 are made to face towards the rear of the vehicle 109, which is the final direction, in the eighth illustrative embodiment. The first image CP1 indicates a shape of the left rear of the vehicle 109, and the second image CP2 indicates a shape of the right rear of the vehicle 109.

In the eighth illustrative embodiment, since the positions of the virtual perspectives VP1, VP2 are moved, the distances from the positions of the virtual perspectives VP1, VP2 to the vehicle body end portion of the vehicle 109 are shorter, as compared to the seventh illustrative embodiment. For this reason, in the virtual perspective images CP1, CP2 (refer to FIGS. 42 and 43) of the eighth illustrative embodiment, the parts of the vehicle body indicated as the vehicle image 190 are smaller, as compared to the virtual perspective images CP1, CP2 (refer to FIGS. 35 and 37) of the seventh illustrative embodiment.

Also, in the eighth illustrative embodiment, the distance from the positions of the virtual perspectives VP1, VP2 to the photographic subjects of the periphery of the vehicle 109 are also shorter, as compared to the seventh illustrative embodiment. For this reason, in the virtual perspective images CP1, CP2 (refer to FIGS. 42 and 43) of the eighth illustrative embodiment, the photographic subject images to be included are larger, as compared to the virtual perspective images CP1, CP2 (refer to FIGS. 35 and 37) of the seventh illustrative embodiment. Therefore, the visibility of the photographic subject images of the periphery of the vehicle 109 that are to be included in the virtual perspective images CP1, CP2 is improved.

In general, since the vehicle is long in the front-back direction, it is possible to effectively improve the visibility of the photographic subject images to be included in the virtual perspective images CP1, CP2 by moving the positions of the virtual perspectives VP1, VP2 in the front-back direction of the vehicle 109, in correspondence to the directions of the lines of sight of the virtual perspectives VP1, VP2.

10. Ninth Illustrative Embodiment

Subsequently, a ninth illustrative embodiment is described. In the below, the differences from the eighth illustrative embodiment are mainly described, and the descriptions about the same or similar configurations and operations as or to the eighth illustrative embodiment are omitted.

In the eighth illustrative embodiment, the perspective control unit 120b is configured to move the positions of the first virtual perspective VP1 and the second virtual perspective VP2 only in the front-back direction of the vehicle 109. In the ninth illustrative embodiment, the perspective control unit 120b is configured to move the positions of the first virtual perspective VP1 and the second virtual perspective VP2 in the front-back direction and in the left-right direction of the vehicle 109.

Figure 44:
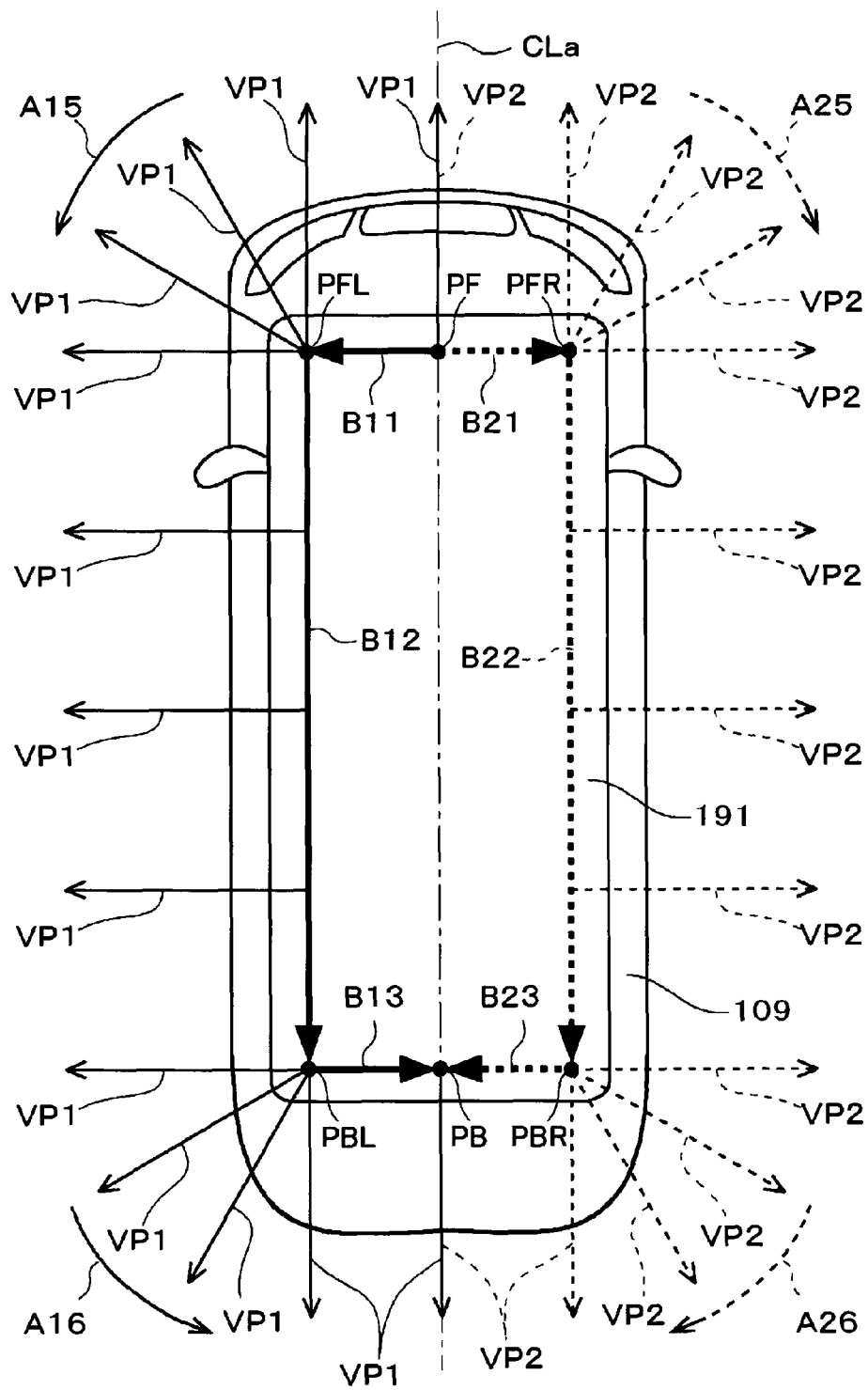
FIG. 44 depicts moving paths of two virtual perspectives in an image display system in accordance with a ninth illustrative embodiment.

FIG. 44 depicts moving paths of the two virtual perspectives VP1, VP2 in the surrounding check mode M12 of the ninth illustrative embodiment. As shown, the perspective control unit 120b linearly moves the positions of the first virtual perspective VP1 and the second virtual perspective VP2 along the peripheral edges of the cabin 191 in the front-back direction and in the left-right direction of the vehicle 109.

Also in the ninth illustrative embodiment, the direction of the line of sight of the first virtual perspective VP1 and the direction of the line of sight of the second virtual perspective VP2 are always symmetric with respect to the left-right central line CLa following the front-back direction of the vehicle 109. Also, the position of the first virtual perspective VP1 and the position of the second virtual perspective VP2 are always symmetric with respect to the left-right central line CLa.

First, the perspective control unit 120b makes the directions of the lines of sight of both the first virtual perspective VP1 and the second virtual perspective VP2 face towards the front in the front-back direction of the vehicle 109, which is the initial direction. Also, the perspective control unit 120b sets the positions of both the first virtual perspective VP1 and the second virtual perspective VP2 to the front central position PF, which is the initial position.

Then, the perspective control unit 120b moves the positions of the first virtual perspective VP1 and the second virtual perspective VP2 in the opposite directions along the left-right direction of the vehicle 109 with keeping the directions of the lines of sight of both the first virtual perspective VP1 and the second virtual perspective VP2. That is, the perspective control unit 120b continuously moves leftwards the position of the first virtual perspective VP1 from the front central position PF to a front left end position PFL of the cabin 191 along a front peripheral edge of the cabin 191 at a constant speed (an arrow B11). Also, at the same time, the perspective control unit 120b continuously moves rightwards the position of the second virtual perspective VP2 from the front central position PF to a front right end position PFR of the cabin 191 along the front peripheral edge of the cabin 191 at a constant speed (an arrow B21).

Then, the perspective control unit 120b alters the directions of the lines of sight of the first virtual perspective VP1 and the second virtual perspective VP2 in the opposite directions by 90° with keeping the positions of both the first virtual perspective VP1 and the second virtual perspective VP2. That is, the perspective control unit 120b continuously alters the direction of the line of sight of the first virtual perspective VP1 in the counterclockwise direction at the constant angular speed so that it faces towards the left in the left-right direction of the vehicle 109 (an arrow A15). Also, at the same time, the perspective control unit 120b continuously alters the direction of the line of sight of the second virtual perspective VP2 in the clockwise direction at the constant angular speed so that it faces towards the right in the left-right direction of the vehicle 109 (an arrow A25).

Then, the perspective control unit 120b moves rearwards the positions of both the first virtual perspective VP1 and the second virtual perspective VP2 along the front-back direction of the vehicle 109 with keeping the directions of the lines of sight of the first virtual perspective VP1 and the second virtual perspective VP2. That is, the perspective control unit 120b continuously moves rearwards the position of the first virtual perspective VP1 from the front left end position PFL of the cabin 191 to a rear left end position PBL along a left peripheral edge of the cabin 191 at the constant speed (an arrow B12). Also, at the same time, the perspective control unit 120b continuously moves rearwards the position of the second virtual perspective VP2 from the front right end position PFR of the cabin 191 to a rear right end position PBR along a right peripheral edge of the cabin 191 at the constant speed (an arrow B22).

Then, the perspective control unit 120b alters the directions of the lines of sight of both the first virtual perspective VP1 and the second virtual perspective VP2 in the opposite directions by 90° with keeping the positions of both the first virtual perspective VP1 and the second virtual perspective VP2. That is, the perspective control unit 120b continuously alters the direction of the line of sight of the first virtual perspective VP1 in the counterclockwise direction at the constant angular speed so that it faces towards the rear in the front-back direction of the vehicle 109, which is the final direction (an arrow A16). Also, at the same time, the perspective control unit 120b continuously alters the direction of the line of sight of the second virtual perspective VP2 in the clockwise direction at the constant angular speed so that it faces towards the rear in the front-back direction of the vehicle 109, which is the final direction (an arrow A26).

Then, the perspective control unit 120b moves the positions of both the first virtual perspective VP1 and the second virtual perspective VP2 in the opposite directions along the left-right direction of the vehicle 109 with keeping the directions of the lines of sight of the first virtual perspective VP1 and the second virtual perspective VP2. That is, the perspective control unit 120b continuously moves rightwards the position of the first virtual perspective VP1 from the rear left end position PBL of the cabin 191 to the rear central position PB along a rear peripheral edge of the cabin 191 at the constant speed (an arrow B13). Also, at the same time, the perspective control unit 120b continuously moves leftwards the position of the second virtual perspective VP2 from the rear right end position PBR of the cabin 191 to the rear central position PB along the rear peripheral edge of the cabin 191 at the constant speed (an arrow B23). Thereby, the positions of both the first virtual perspective VP1 and the second virtual perspective VP2 are finally moved to the rear central position PB, which is the final position.

In this way, in the ninth illustrative embodiment, the perspective control unit 120b moves the positions of the virtual perspectives VP1, VP2 in the front-back direction and in the left-right direction of the vehicle 109 so that they come close to the directions of the lines of sight of the virtual perspectives VP1, VP2. That is, when making the direction of the line of sight of the first virtual perspective VP1 face towards the left of the vehicle 109, the perspective control unit 120b moves the position of the first virtual perspective VP1 to the left side of the cabin 191. Also, when making the direction of the line of sight of the second virtual perspective VP2 face towards the right of the vehicle 109, the perspective control unit 120b moves the position of the second virtual perspective VP2 to the right side of the cabin 191. For this reason, it is possible to more effectively improve the visibility of the photographic subject images to be included in the virtual perspective images CP1, CP2.

Figure 45:
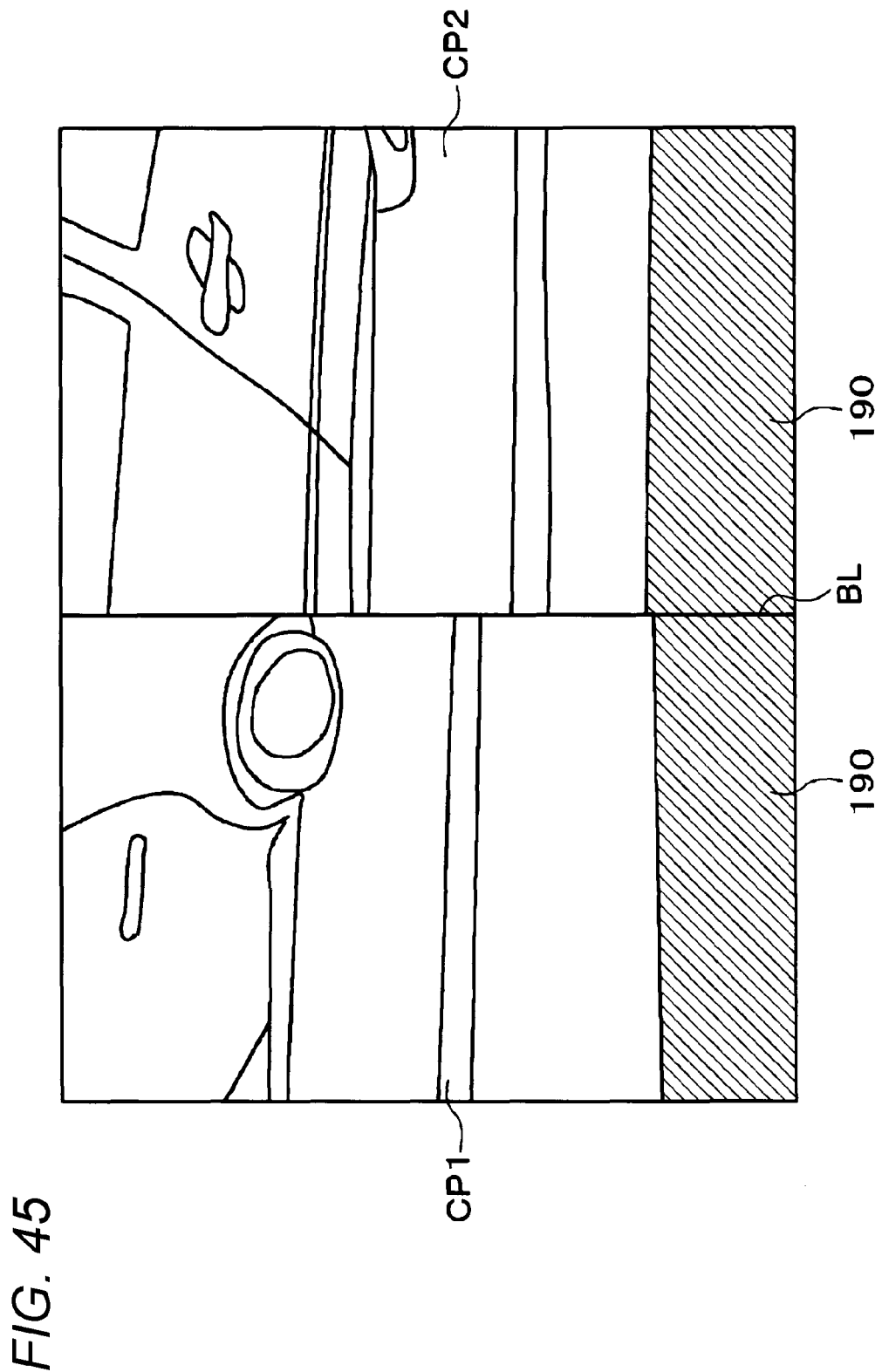
FIG. 45 depicts examples of the first image and the second image in the image display system of FIG. 44.

FIG. 45 depicts examples of the first image CP1 and the second image CP2 when the direction of the line of sight of the first virtual perspective VP1 is made to face towards the left of the vehicle 109 and the direction of the line of sight of the second virtual perspective VP2 is made to face towards the right of the vehicle 109, in the ninth illustrative embodiment. The first image CP1 indicates a shape of the left of the vehicle 109, and the second image CP2 indicates a shape of the right of the vehicle 109.

In the virtual perspective images CP1, CP2 of the ninth illustrative embodiment shown in FIG. 45, the parts of the vehicle body indicated as the vehicle image 190 are smaller and the included photographic subject images are larger, as compared to the virtual perspective images CP1, CP2 (refer to FIG. 36) of the seventh illustrative embodiment. In this way, in the ninth illustrative embodiment, even when the directions of the lines of sight of the virtual perspectives VP1, VP2 are made to face towards the sides of the vehicle 109, it is possible to improve the visibility of the photographic subject images of the periphery of the vehicle 109 to be included in the virtual perspective images CP1, CP2.

Also, the perspective control unit 120b is configured to move the positions of the lines of sight of the virtual perspectives VP1, VP2 along the peripheral edges of the cabin 191 of the vehicle 109. For this reason, it is possible to further reduce the parts of the vehicle body, which are to be indicated by the vehicle image 190, and to more enlarge the photographic subject images.

11. Tenth Illustrative Embodiment

Subsequently, a tenth illustrative embodiment is described. In the below, the differences from the seventh illustrative embodiment are mainly described, and the descriptions about the same or similar configurations and operations as or to the seventh illustrative embodiment are omitted.

In the seventh illustrative embodiment, the perspective control unit 120b is configured to continuously alter the directions of the lines of sight of the first virtual perspective VP1 and the second virtual perspective VP2 at the constant angular speed. In the tenth illustrative embodiment, the perspective control unit 120b is configured to discretely or stepwise alter the directions of the lines of sight of the first virtual perspective VP1 and the second virtual perspective VP2.

Figure 46:
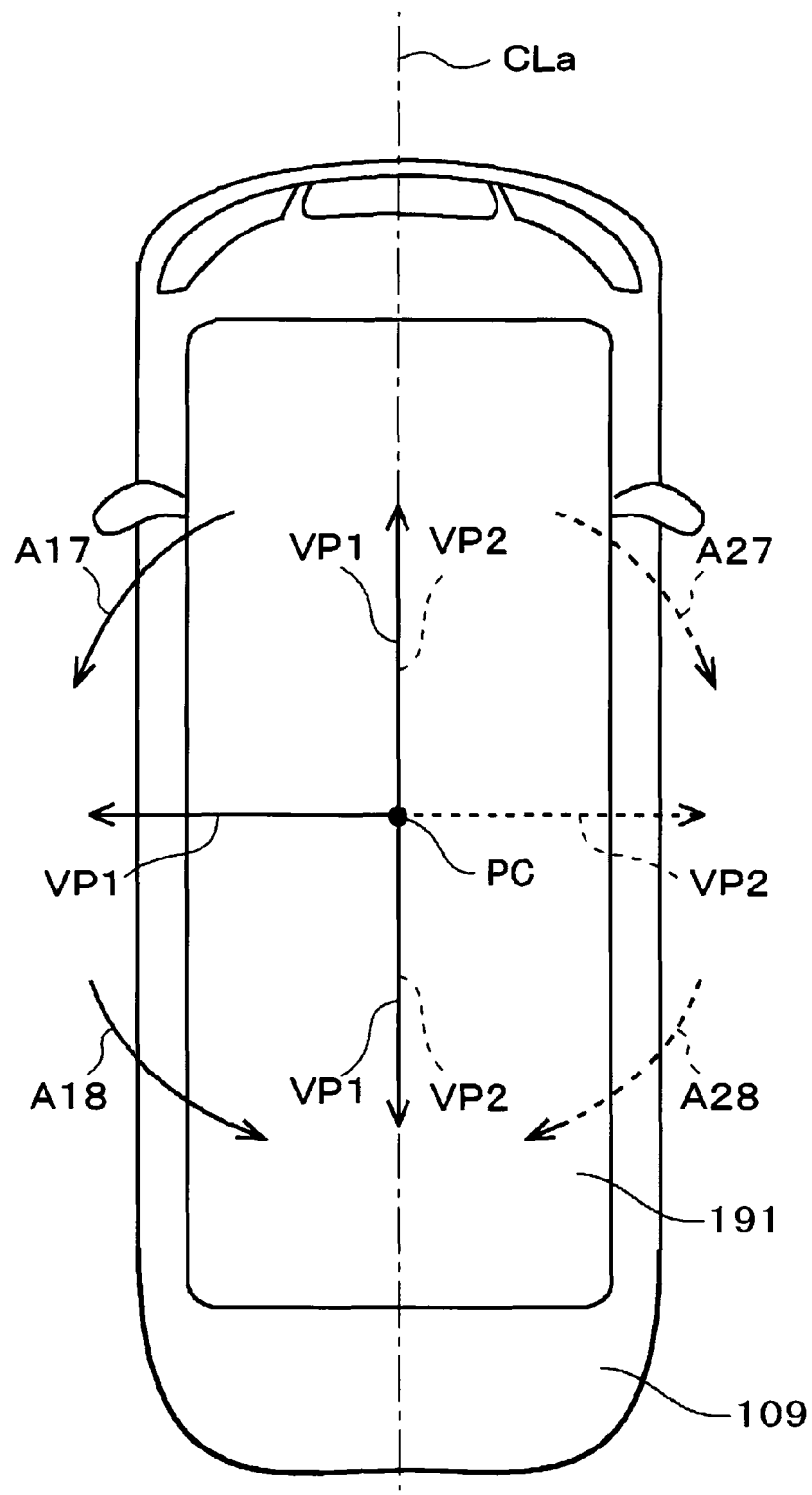
FIG. 46 depicts moving paths of two virtual perspectives in an image display system in accordance with a tenth illustrative embodiment.

FIG. 46 depicts moving paths of the two virtual perspectives VP1, VP2 in the surrounding check mode M12 of the tenth illustrative embodiment. Also in the tenth illustrative embodiment, the perspective control unit 120b sets the positions of both the first virtual perspective VP1 and the second virtual perspective VP2 to the central position PC of the vehicle 109 within the cabin 191. The perspective control unit 120b alters the direction of the line of sight of the first virtual perspective VP1 and the direction of the line of sight of the second virtual perspective VP2 from the front of the vehicle 109 to the opposite rear of the vehicle 109 in the opposite directions. However, in the tenth illustrative embodiment, as shown, the perspective control unit 120b makes the direction of the line of sight of the first virtual perspective VP1 face towards only the front, the left and the rear of the vehicle 109, and makes the direction of the line of sight of the second virtual perspective VP2 face towards only the front, the right and the rear of the vehicle 109.

First, the perspective control unit 120b makes the directions of the lines of sight of both the first virtual perspective VP1 and the second virtual perspective VP2 face towards the front in the front-back direction of the vehicle 109, which is the initial direction. The perspective control unit 120b keeps the directions of the lines of sight of both the first virtual perspective VP1 and the second virtual perspective VP2 for a predetermined time period (for example, 0.5 second).

Then, the perspective control unit 120b switches the directions of the lines of sight of both the first virtual perspective VP1 and the second virtual perspective VP2 in the opposite directions. That is, the perspective control unit 120b switches the direction of the line of sight of the first virtual perspective VP1 to the left in the left-right direction of the vehicle 109 (an arrow A17). At the same time, the perspective control unit 120b switches the direction of the line of sight of the second virtual perspective VP2 to the right in the left-right direction of the vehicle 109 (an arrow A27). The perspective control unit 120b keeps the directions of the lines of sight of the first virtual perspective VP1 and the second virtual perspective VP2 for a predetermined time period (for example, 0.5 second).

Then, the perspective control unit 120b switches the directions of the lines of sight of both the first virtual perspective VP1 and the second virtual perspective VP2 to the rear in the front-back direction of the vehicle 109, which is the final direction (arrows A18, A28). The perspective control unit 120b keeps the directions of the lines of sight of the first virtual perspective VP1 and the second virtual perspective VP2 for a predetermined time period (for example, 0.5 second).

In this way, in the tenth illustrative embodiment, the perspective control unit 120b is configured to discretely or stepwise alter the direction of the line of sight of the virtual perspective VP. For this reason, it is possible to reduce the time necessary to alter the direction of the line of sight of the virtual perspective VP. As a result, the user can check the entire shape of the surroundings of the vehicle 109 in a shorter time period.

Meanwhile, in the tenth illustrative embodiment, the angles of view of the first image CP1 and the second image CP2 are preferably set to be wider than the seventh illustrative embodiment. Also, like the eighth illustrative embodiment or the ninth illustrative embodiment, the perspective control unit 120b may move the positions of the virtual perspectives VP1, VP2, in correspondence to the directions of the lines of sight of the virtual perspectives VP1, VP2.

12. Eleventh Illustrative Embodiment

Subsequently, an eleventh illustrative embodiment is described. In the below, the differences from the seventh illustrative embodiment are mainly described, and the descriptions about the same or similar configurations and operations as or to the seventh illustrative embodiment are omitted.

In the seventh illustrative embodiment, in the surrounding check mode M12, the perspective control unit 120b is configured to alter the directions of the lines of sight of the first virtual perspective VP1 and the second virtual perspective VP2 from the front of the vehicle 109 to the opposite rear of the vehicle 109. In the eleventh illustrative embodiment, the perspective control unit 120b is configured to alter the directions of the lines of sight of the first virtual perspective VP1 and the second virtual perspective VP2 from the left of the vehicle 109 to the opposite right.

Figure 47:
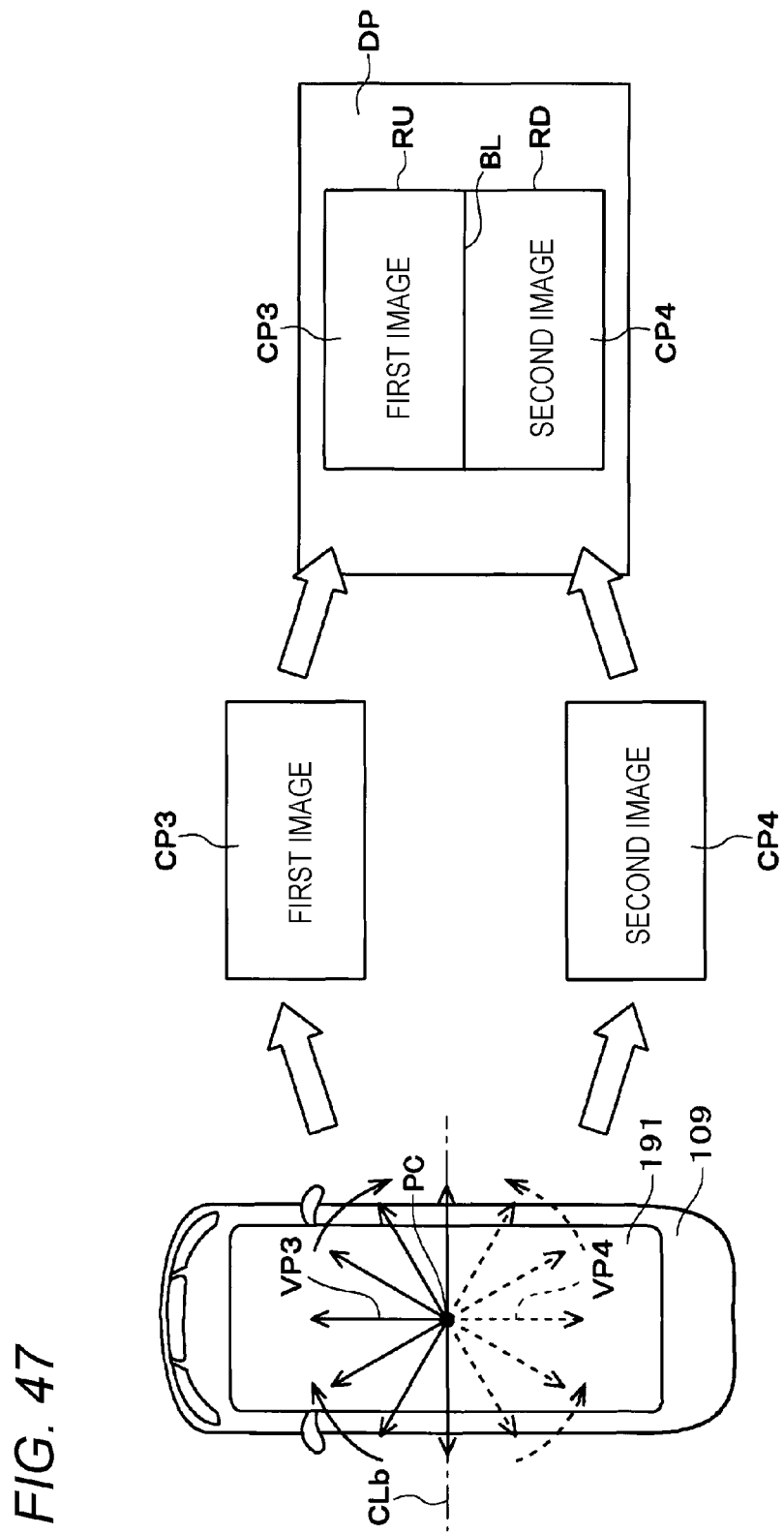
FIG. 47 depicts a method with which an image display system in accordance with an eleventh illustrative embodiment generates a display image.

FIG. 47 illustrates a method of generating the display image DP that is to be displayed by the display device 103 in the surrounding check mode M12 of the eleventh illustrative embodiment.

Also in the eleventh illustrative embodiment, the perspective control unit 120b keeps positions of both a first virtual perspective VP3 and a second virtual perspective VP4 at the central position PC of the vehicle 109 within the cabin 191. The first generation unit 122a generates a first image CP3 indicating the periphery of the vehicle 109 as seen from the first virtual perspective VP3, and the second generation unit 122b generates a second image CP4 indicating the periphery of the vehicle 109 as seen from the second virtual perspective VP4.

The image adjustment unit 123 generates the display image DP in which the first image CP3 and the second image CP4 generated in this way are arranged to be vertically adjacent to each other. As shown, the image adjustment unit 123 arranges the first image CP3 above the boundary line BL and the second image CP4 below the boundary line BL, respectively, under control of the display control unit 120a.

In this way, the display device 103 displays the display image DP including both the first image CP3 and the second image CP4. Therefore, the display device 103 displays the first image CP3 in a display area RU positioned at the relatively upper side and the second image CP4 in a display area RD positioned at the relatively lower side.

Also, the perspective control unit 120b gradually alters the directions of the lines of sight of the two virtual perspectives VP3, VP4. While the perspective control unit 120b gradually alters the directions of the two virtual perspectives VP3, VP4 in this way, the first generation unit 122a and the second generation unit 122b continuously generate the first image CP3 and the second image CP4, respectively. Thereby, the animations indicating the shape of the periphery of the vehicle 109 are respectively performed in the display area RU and the display area RD of the display device 103.

Figure 48:
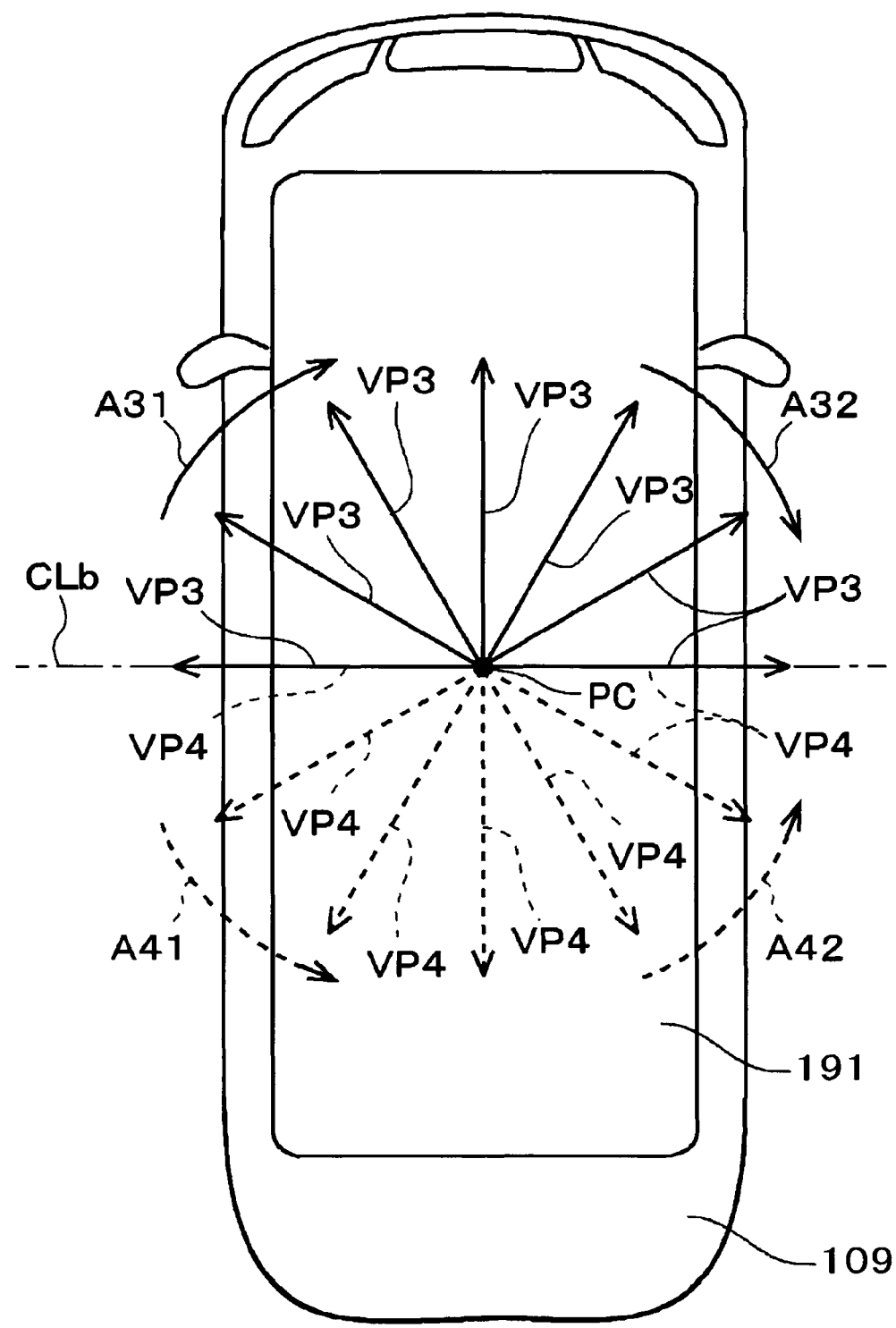
FIG. 48 depicts moving paths of two virtual perspectives in the image display system of FIG. 47.

FIG. 48 depicts moving paths of the two virtual perspectives VP3, VP4 in the surrounding check mode M12 of the eleventh illustrative embodiment. In FIG. 48, the first virtual perspective VP3 is indicated by a solid arrow, and the second virtual perspective VP4 is indicated by a dashed arrow.

As shown, the perspective control unit 120b alters the direction of the line of sight of the first virtual perspective VP3 and the direction of the line of sight of the second virtual perspective VP4 in the opposite directions from the left of the vehicle 109 to the opposite right of the vehicle 109.

Specifically, the perspective control unit 120b first makes the directions of the lines of sight of both the first virtual perspective VP3 and the second virtual perspective VP4 face towards the left in the left-right direction of the vehicle 109, which is the initial direction. Then, the perspective control unit 120b continuously alters the direction of the line of sight of the first virtual perspective VP3 in the clockwise direction (an arrow A31) and the direction of the line of sight of the second virtual perspective VP4 in the counterclockwise direction (an arrow A41) at the constant angular speed, respectively.

Thereby, the perspective control unit 120b continuously alters the direction of the line of sight of the first virtual perspective VP3 from the left of the vehicle 109 to the right in the left-right direction of the vehicle 109, which is the final direction, via the front of the vehicle 109 (arrows A31, A32). Also, at the same time, the perspective control unit 120b continuously alters the direction of the line of sight of the second virtual perspective VP4 from the left of the vehicle 109 to the right in the left-right direction of the vehicle 109, which is the final direction, via the rear of the vehicle 109 (arrows A41, A42).

The perspective control unit 120b alters the directions of the lines of sight of both the first virtual perspective VP3 and the second virtual perspective VP4 in the opposite directions at the same angular speed. For this reason, the direction of the line of sight of the first virtual perspective VP3 and the direction of the line of sight of the second virtual perspective VP4 are always symmetric with respect to a front-rear central line CLb following the left-right direction of the vehicle 109.

In this way, the direction of the line of sight of the first virtual perspective VP3 is altered from the left of the vehicle 109 to the right of the vehicle 109 via the front of the vehicle 109. On the other hand, the direction of the line of sight of the second virtual perspective VP4 is altered from the left of the vehicle 109 to the right of the vehicle 109 via the rear of the vehicle 109. Therefore, as shown in FIG. 47, an animation to circle a front half of the surroundings of the vehicle 109 is performed in the display area RU of the display device 103 indicating the first image CP3 based on the first virtual perspective VP3. Also, at the same time, the animation to circle a rear half of the surroundings of the vehicle 109 is performed in the display area RD of the display device 103 indicating the second image CP4 based on the second virtual perspective VP4.

Figure 49:
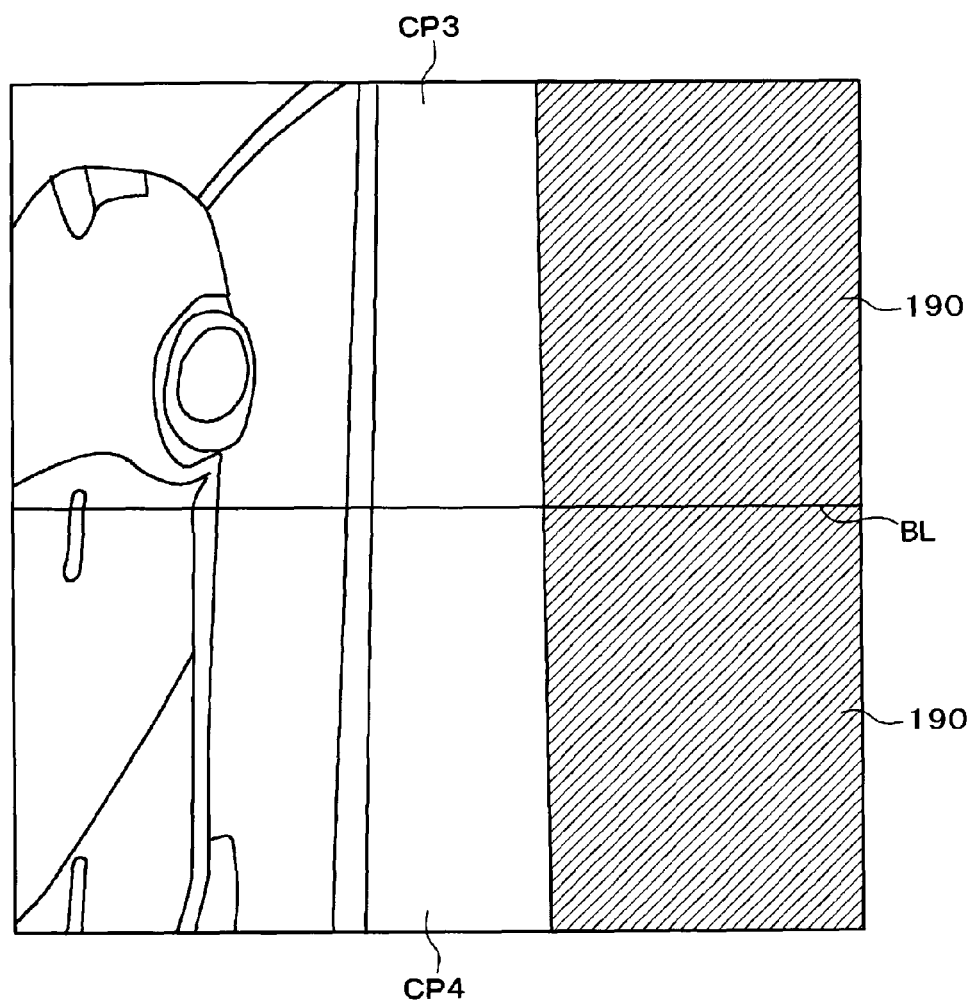
FIG. 49 depicts examples of the first image and the second image in the image display system of FIG. 47.

FIG. 49 depicts examples of the first image CP3 and the second image CP4 when the directions of the lines of sight of both the first virtual perspective VP3 and the second virtual perspective VP4 are made to face towards the left of the vehicle 109, which is the initial direction. The first image CP3 indicates a shape of the left front of the vehicle 109, and the second image CP2 indicates a shape of the left rear of the vehicle 109. In this case, one image in which the boundary line BL is omitted and the first image CP3 and the second image CP4 are integrated may also be made.

Figure 50:
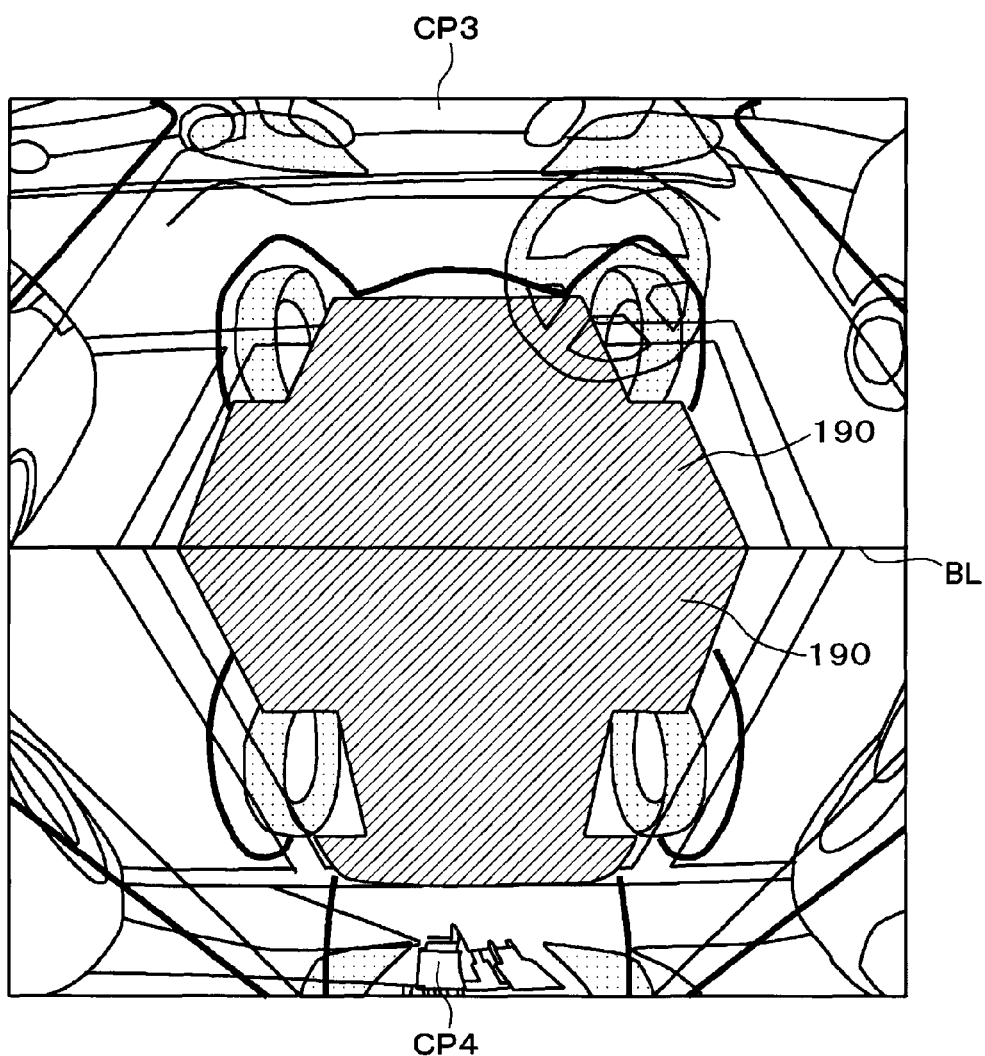
FIG. 50 depicts other examples of the first image and the second image in the image display system of FIG. 47.

FIG. 50 depicts examples of the first image CP3 and the second image CP4 when the direction of the line of sight of the first virtual perspective VP3 is made to face towards the front of the vehicle 109 and the direction of the line of sight of the second virtual perspective VP4 is made to face towards the rear of the vehicle 109, respectively, subsequently to FIG. 49. The first image CP3 indicates a shape of the front of the vehicle 109, and the second image CP4 indicates a shape of the rear of the vehicle 109.

Figure 51:
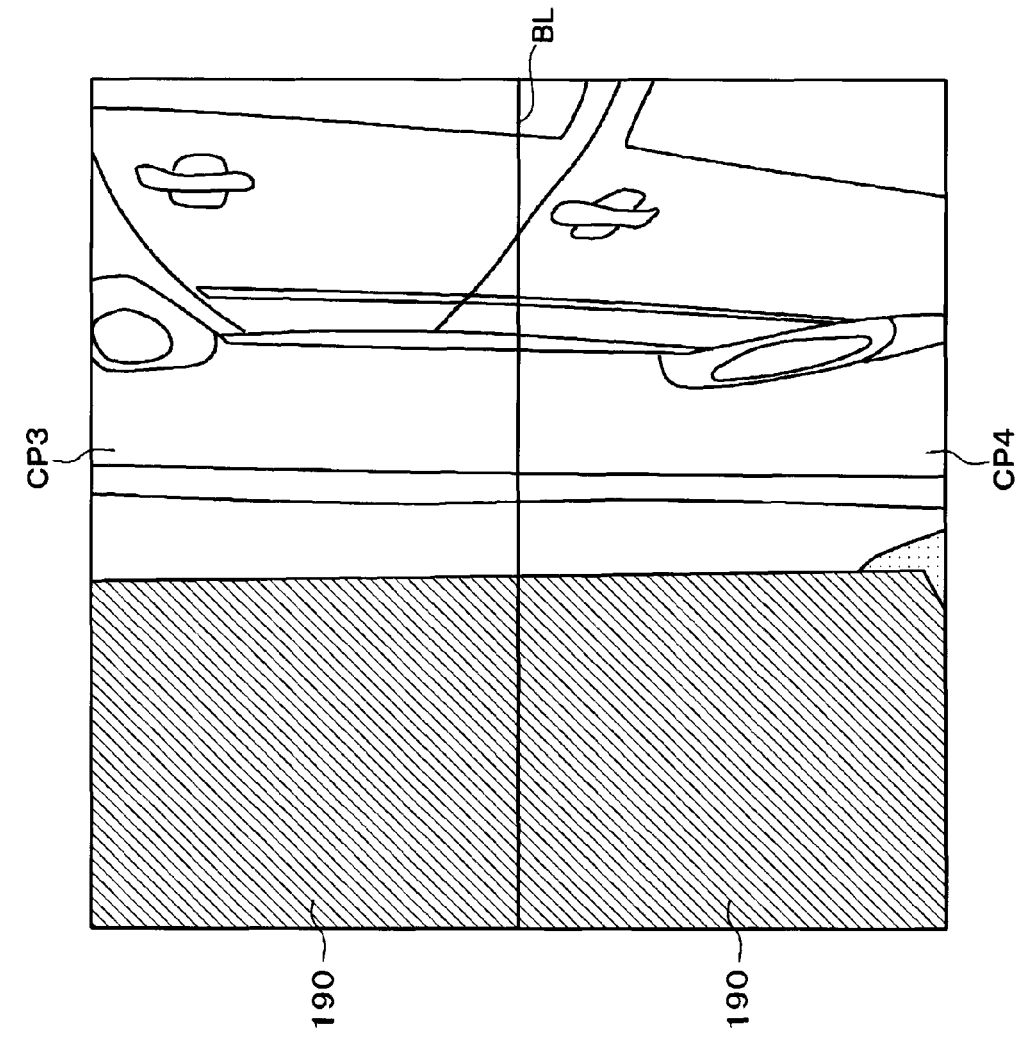
FIG. 51 depicts other examples of the first image and the second image in the image display system of FIG. 47.

FIG. 51 depicts examples of the first image CP3 and the second image CP4 when the directions of the lines of sight of both the first virtual perspective VP3 and the second virtual perspective VP4 are made to face the right of the vehicle 109, which is the final direction, subsequently to FIG. 50. The first image CP3 indicates a shape of the right front of the vehicle 109, and the second image CP4 indicates a shape of the right rear of the vehicle 109. Also in this case, one image in which the boundary line BL is omitted and the first image CP3 and the second image CP4 are integrated may also be made.

In this way, also in the eleventh illustrative embodiment, the image display system 110 is configured to alter the directions of the lines of sight of the two virtual perspectives VP3, VP4 in the opposite directions by 180° (refer to FIG. 48), and to display the first image CP3 and the second image CP4 generated on the basis of the two virtual perspectives VP3, VP4 at the same time. Therefore, the user can check the entire shape of the surroundings of the vehicle 109 in a relatively short time period by using the image display system 110.

Also, the display device 103 displays the first image CP3, which mainly indicates the front of the vehicle 109, in the display area RU positioned at the relatively upper side, and displays the second image CP4, which mainly indicates the rear of the vehicle 109, in the display area RD positioned at the relatively lower side (refer to FIG. 47). For this reason, the user can intuitively recognize at which of the front and the rear of the vehicle 109 the photographic subjects indicated by the first image CP3 and the second image CP4 are respectively positioned.

Also, the direction of the line of sight of the first virtual perspective VP3 and the direction of the line of sight of the second virtual perspective VP4 are symmetric with respect to the front-rear central line CLb of the vehicle 109 (refer to FIG. 48). For this reason, the user can easily recognize the positions of the photographic subjects indicated by each of the first image CP3 and the second image CP4.

13. Twelfth Illustrative Embodiment

Subsequently, a twelfth illustrative embodiment is described. In the below, the differences from the eleventh illustrative embodiment are mainly described, and the descriptions about the same or similar configurations and operations as or to the eleventh illustrative embodiment are omitted.

In the eleventh illustrative embodiment, the perspective control unit 120b is configured to keep the positions of both the first virtual perspective VP3 and the second virtual perspective VP4 at the central position PC in the surrounding check mode M12. In the twelfth illustrative embodiment, the perspective control unit 120b is configured to move the positions of the first virtual perspective VP3 and the second virtual perspective VP4.

Figure 52:
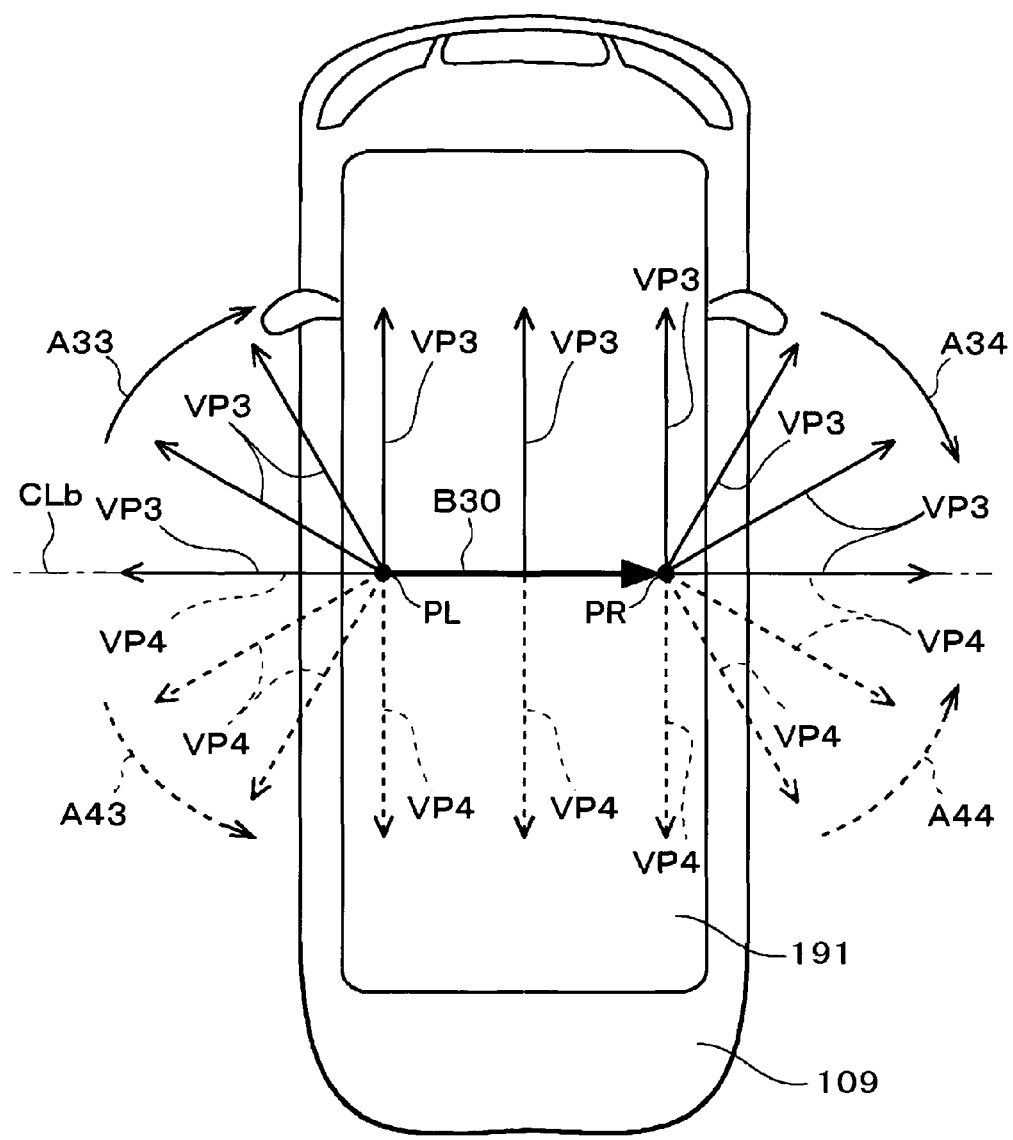
FIG. 52 depicts moving paths of two virtual perspectives in an image display system in accordance with a twelfth illustrative embodiment.

FIG. 52 depicts moving paths of the two virtual perspectives VP3, VP4 in the surrounding check mode M12 of the twelfth illustrative embodiment. The perspective control unit 120b is configured to linearly move the positions of both the first virtual perspective VP3 and the second virtual perspective VP4 in the left-right direction of the vehicle 109.

Also in the twelfth illustrative embodiment, the direction of the line of sight of the first virtual perspective VP3 and the direction of the line of sight of the second virtual perspective VP4 are always symmetric with respect to the front-rear central line CLb following the left-right direction of the vehicle 109. Also, the position of the first virtual perspective VP3 and the position of the second virtual perspective VP4 are always the same.

First, the perspective control unit 120b makes the directions of the lines of sight of both the first virtual perspective VP3 and the second virtual perspective VP4 face towards the left in the left-right direction of the vehicle 109, which is the initial direction. Also, the perspective control unit 120b sets the positions of both the first virtual perspective VP3 and the second virtual perspective VP4 to a position of the left center (hereinafter, referred to as 'left central position') PL of the cabin 191, which is the initial position.

Then, the perspective control unit 120b alters the directions of the lines of sight of both the first virtual perspective VP3 and the second virtual perspective VP4 in the opposite directions by 90° with keeping the positions of both the first virtual perspective VP3 and the second virtual perspective VP4 at the left central position PL. That is, the perspective control unit 120b continuously alters the direction of the line of sight of the first virtual perspective VP3 in the clockwise direction at the constant angular speed so that it faces towards the front in the front-back direction of the vehicle 109 (an arrow A33). Also, at the same time, the perspective control unit 120b continuously alters the direction of the line of sight of the second virtual perspective VP4 in the counterclockwise direction at the constant angular speed so that it faces towards the rear in the front-back direction of the vehicle 109 (an arrow A43).

Then, the perspective control unit 120b moves the positions of both the first virtual perspective VP3 and the second virtual perspective VP4 to the right along the left-right direction of the vehicle 109 with keeping the directions of the lines of sight of the first virtual perspective VP3 and the second virtual perspective VP4. That is, the perspective control unit 120b continuously moves the positions of both the first virtual perspective VP3 and the second virtual perspective VP4 from the left central position PL to a position of the right center (hereinafter, referred to as 'rear central position') PR of the cabin 191, which is the final position, at the constant speed (an arrow B30).

Then, the perspective control unit 120b alters the directions of the lines of sight of both the first virtual perspective VP3 and the second virtual perspective VP4 in the opposite directions by 90° with keeping the positions of both of the first virtual perspective VP3 and the second virtual perspective VP4 at the right central position PR. That is, the perspective control unit 120b continuously alters the direction of the line of sight of the first virtual perspective VP3 in the clockwise direction at the constant angular speed so that it faces towards the right in the left-right direction of the vehicle 109 (an arrow A34). Also, at the same time, the perspective control unit 120b continuously alters the direction of the line of sight of the second virtual perspective VP4 in the counterclockwise direction at the constant angular speed so that it faces towards the right in the left-right direction of the vehicle 109 (an arrow A44). Thereby, the directions of the lines of sight of both the first virtual perspective VP3 and the second virtual perspective VP4 are finally made to face towards the right of the vehicle 109, which is the final direction.

In this way, the perspective control unit 120b is configured to move the position of the first virtual perspective VP3 in correspondence to the direction of the line of sight of the first virtual perspective VP3, and to move the position of the second virtual perspective VP4 in correspondence to the direction of the line of sight of the second virtual perspective VP4.

That is, when making the direction of the line of sight of the first virtual perspective VP3 face towards the left of the vehicle 109, the perspective control unit 120b sets the position of the first virtual perspective VP3 at the left side of the cabin 191. Also, when making the direction of the line of sight of the first virtual perspective VP3 face towards the right of the vehicle 109, the perspective control unit 120b sets the position of the first virtual perspective VP3 at the right side of the cabin 191. Likewise, when making the direction of the line of sight of the second virtual perspective VP2 face towards the left of the vehicle 109, the perspective control unit 120b sets the position of the second virtual perspective VP4 at the left side of the cabin 191. Also, when making the direction of the line of sight the second virtual perspective VP4 face towards the right of the vehicle 109, the perspective control unit 120b sets the position of the second virtual perspective VP4 at the right side of the cabin 191.

In this way, the positions of the virtual perspectives VP3, VP4 are also moved to come close to the directions of the lines of sight of the virtual perspectives VP3, VP4, so that it is possible to reduce the parts of the vehicle body indicated as the vehicle image 190 to be included in the virtual perspective image CP3, CP4 and to enlarge the photographic subject images to be included. As a result, it is possible to improve the visibility of the photographic subject images of the vehicle 109 to be included in the virtual perspective images CP3, CP4.

14. Thirteenth Illustrative Embodiment

Subsequently, a thirteenth illustrative embodiment is described. In the below, the differences from the twelfth illustrative embodiment are mainly described, and the descriptions about the same or similar configurations and operations as or to the twelfth illustrative embodiment are omitted.

In the twelfth illustrative embodiment, the perspective control unit 120b is configured to move the positions of the first virtual perspective VP3 and the second virtual perspective VP4 only in the left-right direction of the vehicle 109. In the thirteenth illustrative embodiment, the perspective control unit 120b is configured to move the positions of the first virtual perspective VP3 and the second virtual perspective VP4 in the left-right direction and in the front-back direction of the vehicle 109.

Figure 53:
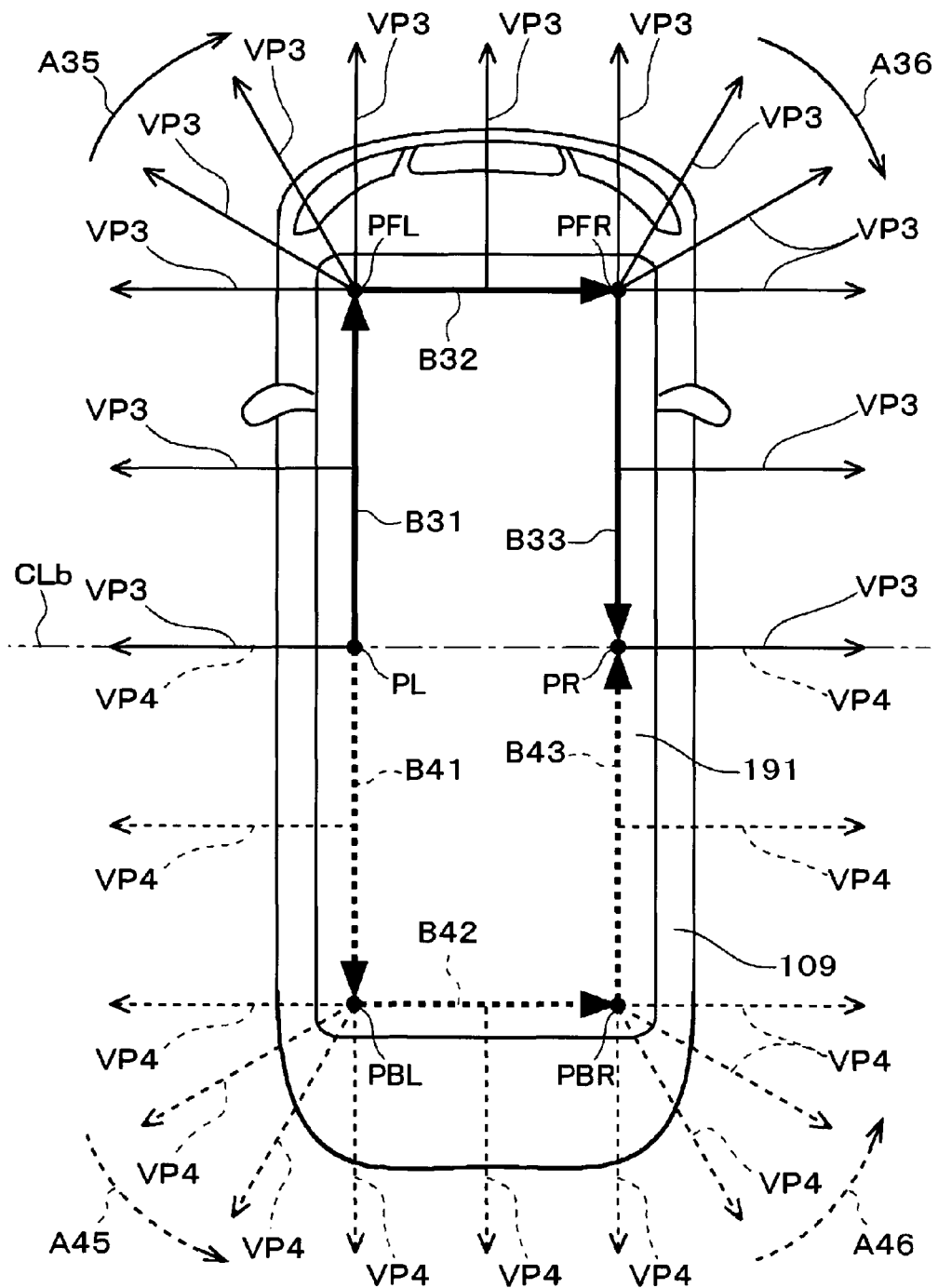
FIG. 53 depicts moving paths of two virtual perspectives in an image display system in accordance with a thirteenth illustrative embodiment.

FIG. 53 depicts moving paths of the two virtual perspectives VP3, VP4 in the surrounding check mode M12 of the thirteenth illustrative embodiment. The perspective control unit 120b linearly moves the positions of the first virtual perspective VP3 and the second virtual perspective VP4 along the peripheral edges of the cabin 191 in the front-back direction and in the left-right direction of the vehicle 109.

Also in the thirteenth illustrative embodiment, the direction of the line of sight of the first virtual perspective VP3 and the direction of the line of sight of the second virtual perspective VP4 are always symmetric with respect to the front-rear central line CLb following the left-right direction of the vehicle 109. Also, the position of the first virtual perspective VP3 and the position of the second virtual perspective VP4 are always symmetric with respect to the front-rear central line CLb.

First, the perspective control unit 120b makes the directions of the lines of sight of both the first virtual perspective VP3 and the second virtual perspective VP4 face towards the left in the left-right direction of the vehicle 109, which is the initial direction. Also, the perspective control unit 120b sets the positions of both the first virtual perspective VP3 and the second virtual perspective VP4 to the left central position PL, which is the initial position.

Then, the perspective control unit 120b moves the positions of the first virtual perspective VP3 and the second virtual perspective VP4 in the opposite directions along the front-back direction of the vehicle 109 with keeping the directions of the lines of sight of both the first virtual perspective VP3 and the second virtual perspective VP4. That is, the perspective control unit 120b continuously moves forwards the position of the first virtual perspective VP2 from the left central position PL to the front left end position PFL of the cabin 191 along the left peripheral edge of the cabin 191 at the constant speed (an arrow B31). Also, at the same time, the perspective control unit 120b continuously moves rearwards the position of the second virtual perspective VP4 from the left central position PL to the rear left end position PBL of the cabin 191 along the left peripheral edge of the cabin 191 at the constant speed (an arrow B41).

Then, the perspective control unit 120b alters the directions of the lines of sight of the first virtual perspective VP3 and the second virtual perspective VP4 in the opposite directions by 90° with keeping the positions of both the first virtual perspective VP3 and the second virtual perspective VP4. That is, the perspective control unit 120b continuously alters the direction of the line of sight of the first virtual perspective VP3 in the clockwise direction at the constant angular speed so that it faces towards the front in the front-back direction of the vehicle 109 (an arrow A35). Also, at the same time, the perspective control unit 120b continuously alters the direction of the line of sight of the second virtual perspective VP4 in the counterclockwise direction at the constant angular speed so that it faces towards the rear in the front-back direction of the vehicle 109 (an arrow A45).

Then, the perspective control unit 120b moves rightwards the positions of both the first virtual perspective VP3 and the second virtual perspective VP4 along the left-right direction of the vehicle 109 with keeping the directions of the lines of sight of the first virtual perspective VP3 and the second virtual perspective VP4. That is, the perspective control unit 120b continuously moves rightwards the position of the first virtual perspective VP3 from the front left end position PFL of the cabin 191 to the front right end position PFR along the front peripheral edge of the cabin 191 at the constant speed (an arrow B32). Also, at the same time, the perspective control unit 120b continuously moves rightwards the position of the second virtual perspective VP4 from the rear left end position PBL of the cabin 191 to the rear right end position PBR along the rear peripheral edge of the cabin 191 at the constant speed (an arrow B42).

Then, the perspective control unit 120b alters the directions of the lines of sight of both the first virtual perspective VP3 and the second virtual perspective VP4 in the opposite directions by 90° with keeping the positions of both the first virtual perspective VP3 and the second virtual perspective VP4. That is, the perspective control unit 120b continuously alters the direction of the line of sight of the first virtual perspective VP3 in the clockwise direction at the constant angular speed so that it faces towards the right in the left-right direction of the vehicle 109, which is the final direction (an arrow A36). Also, at the same time, the perspective control unit 120b continuously alters the direction of the line of sight of the second virtual perspective VP4 in the counterclockwise direction at the constant angular speed so that it faces towards the right in the left-right direction of the vehicle 109, which is the final direction (an arrow A46).

Then, the perspective control unit 120b moves the positions of both the first virtual perspective VP3 and the second virtual perspective VP4 in the opposite directions along the front-back direction of the vehicle 109 with keeping the directions of the lines of sight of the first virtual perspective VP3 and the second virtual perspective VP4. That is, the perspective control unit 120b continuously moves rearwards the position of the first virtual perspective VP3 from the front right end position PFR of the cabin 191 to the right central position PR along the right peripheral edge of the cabin 191 at the constant speed (an arrow B33). Also, at the same time, the perspective control unit 120b continuously moves forwards the position of the second virtual perspective VP4 from the rear right end position PBR of the cabin 191 to the right central position PR along the right peripheral edge of the cabin 191 at the constant speed (an arrow B43). Thereby, the positions of both the first virtual perspective VP3 and the second virtual perspective VP4 are finally moved to the right central position PR, which is the final position.

In this way, in the thirteenth illustrative embodiment, the perspective control unit 120b is configured to move the positions of the virtual perspectives VP3, VP4 in the left-right direction and in the front-back direction of the vehicle 109 so that they come close to the directions of the lines of sight of the virtual perspectives VP3, VP4. That is, when making the direction of the line of sight of the first virtual perspective VP3 face towards the front of the vehicle 109, the perspective control unit 120b moves the position of the first virtual perspective VP3 to the front side of the cabin 191. Also, when making the direction of the line of sight of the second virtual perspective VP4 face towards the rear of the vehicle 109, the perspective control unit 120b moves the position of the second virtual perspective VP4 to the rear side of the cabin 191. For this reason, it is possible to more effectively improve the visibility of the photographic subject images to be included in the virtual perspective images CP3, CP4.

15. Fourteenth Illustrative Embodiment

Subsequently, a fourteenth illustrative embodiment is described. In the below, the differences from the eleventh illustrative embodiment are mainly described, and the descriptions about the same or similar configurations and operations as or to the eleventh illustrative embodiment are omitted.

In the eleventh illustrative embodiment, the perspective control unit 120b is configured to continuously alter the directions of the lines of sight of the first virtual perspective VP3 and the second virtual perspective VP4 at the constant angular speed. In the fourteenth illustrative embodiment, the perspective control unit 120b is configured to discretely or stepwise alter the directions of the lines of sight of the first virtual perspective VP3 and the second virtual perspective VP4.

Figure 54:
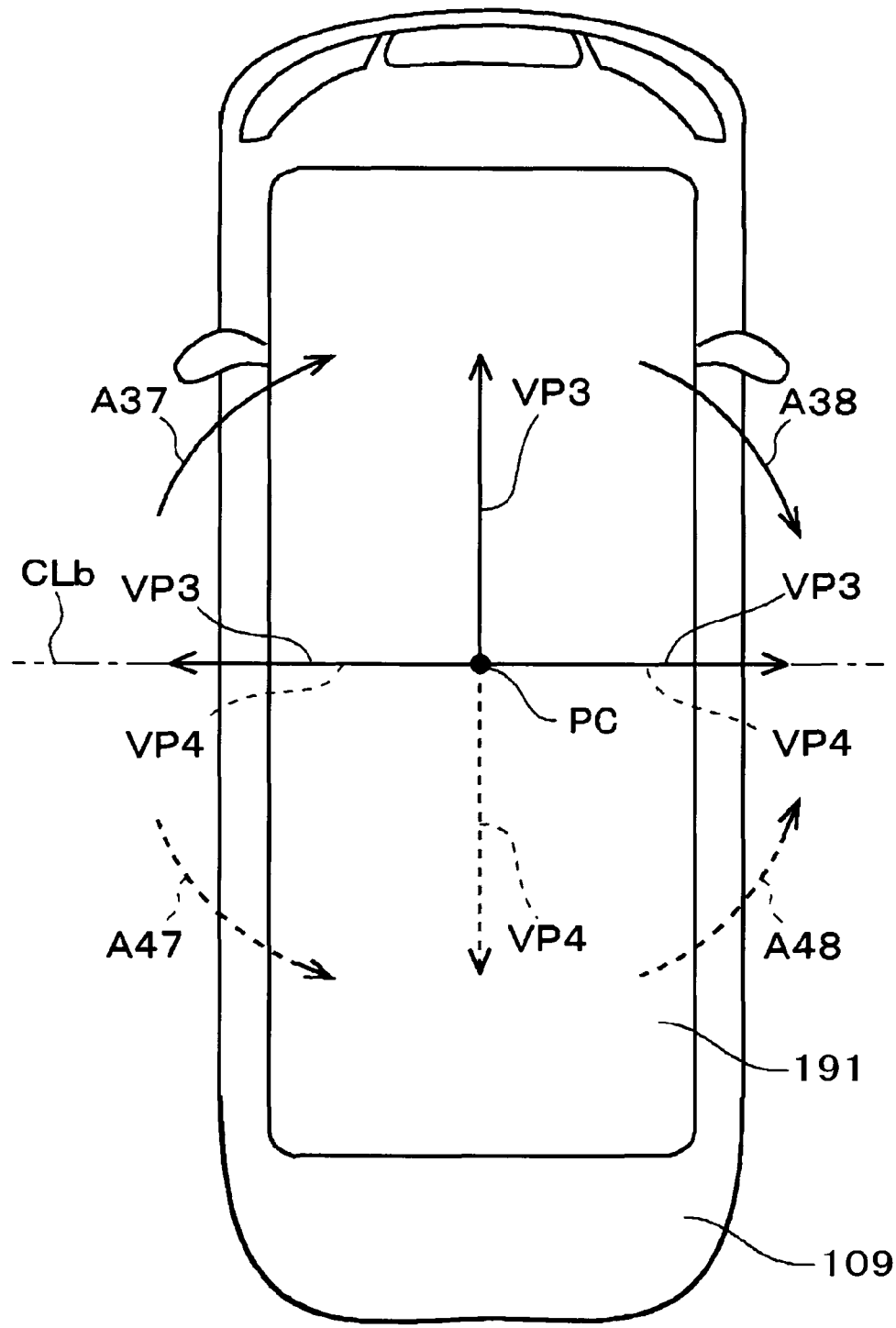
FIG. 54 depicts moving paths of two virtual perspectives in an image display system in accordance with a fourteenth illustrative embodiment.

FIG. 54 depicts moving paths of the two virtual perspectives VP3, VP4 in the surrounding check mode M12 of the fourteenth illustrative embodiment. Also in the fourteenth illustrative embodiment, the perspective control unit 120b sets the positions of both the first virtual perspective VP3 and the second virtual perspective VP4 to the central position PC of the vehicle 109 within the cabin 191. The perspective control unit 120b alters the direction of the line of sight of the first virtual perspective VP3 and the direction of the line of sight of the second virtual perspective VP4 from the left of the vehicle 109 to the opposite right of the vehicle 109 in the opposite directions. However, in the fourteenth illustrative embodiment, as shown, the perspective control unit 120b makes the direction of the line of sight of the first virtual perspective VP3 face towards only the left, the front and the right of the vehicle 109, and makes the direction of the line of sight of the second virtual perspective VP4 face towards only the left, the rear and the right of the vehicle 109.

First, the perspective control unit 120b makes the directions of the lines of sight of both the first virtual perspective VP3 and the second virtual perspective VP4 face towards the left in the left-right direction of the vehicle 109, which is the initial direction. The perspective control unit 120b keeps the directions of the lines of sight of both the first virtual perspective VP3 and the second virtual perspective VP4 for a predetermined time period (for example, 0.5 second).

Then, the perspective control unit 120b switches the directions of the lines of sight of both the first virtual perspective VP3 and the second virtual perspective VP4 in the opposite directions. That is, the perspective control unit 120b switches the direction of the line of sight of the first virtual perspective VP3 to the front in the front-back direction of the vehicle 109 (an arrow A37). At the same time, the perspective control unit 120b switches the direction of the line of sight of the second virtual perspective VP4 to the rear in the front-back direction of the vehicle 109 (an arrow A47). The perspective control unit 120b keeps the directions of the lines of sight of the first virtual perspective VP3 and the second virtual perspective VP4 for a predetermined time period (for example, 0.5 second).

Then, the perspective control unit 120b switches the directions of the lines of sight of both the first virtual perspective VP3 and the second virtual perspective VP4 to the right in the left-right direction of the vehicle 109, which is the final direction (arrows A38, A48). The perspective control unit 120b keeps the directions of the lines of sight of the first virtual perspective VP3 and the second virtual perspective VP4 for a predetermined time period (for example, 0.5 second).

In this way, in the fourteenth illustrative embodiment, the perspective control unit 120b is configured to discretely or stepwise alter the direction of the line of sight of the virtual perspective VP. For this reason, it is possible to reduce the time necessary to alter the direction of the line of sight of the virtual perspective VP. As a result, the user can check the entire shape of the surroundings of the vehicle 109 in a shorter time period.

Meanwhile, in the fourteenth illustrative embodiment, the angles of view of the first image CP3 and the second image CP4 are preferably set to be wider than the eleventh illustrative embodiment. Also, like the twelfth illustrative embodiment or the thirteenth illustrative embodiment, the perspective control unit 120b may move the positions of the virtual perspectives VP3, VP4, in correspondence to the directions of the lines of sight of the virtual perspectives VP3, VP4.

16. Fifteenth Illustrative Embodiment

Subsequently, a fifteenth illustrative embodiment is described. In the below, the differences from the seventh illustrative embodiment are mainly described, and the descriptions about the same or similar configurations and operations as or to the seventh illustrative embodiment are omitted.

In the seventh illustrative embodiment, the perspective control unit 120*b* is configured to alter the virtual perspectives VP1, VP2 at the constant speed (the angular speed). In the fifteenth illustrative embodiment the image display system 110 has a function of detecting an object existing in the periphery of the vehicle 109, and the perspective control unit 120*b* is configured to change the speed at which the virtual perspectives VP1, VP2 are to be altered, in correspondence to a detection result of the object.

Figure 55:
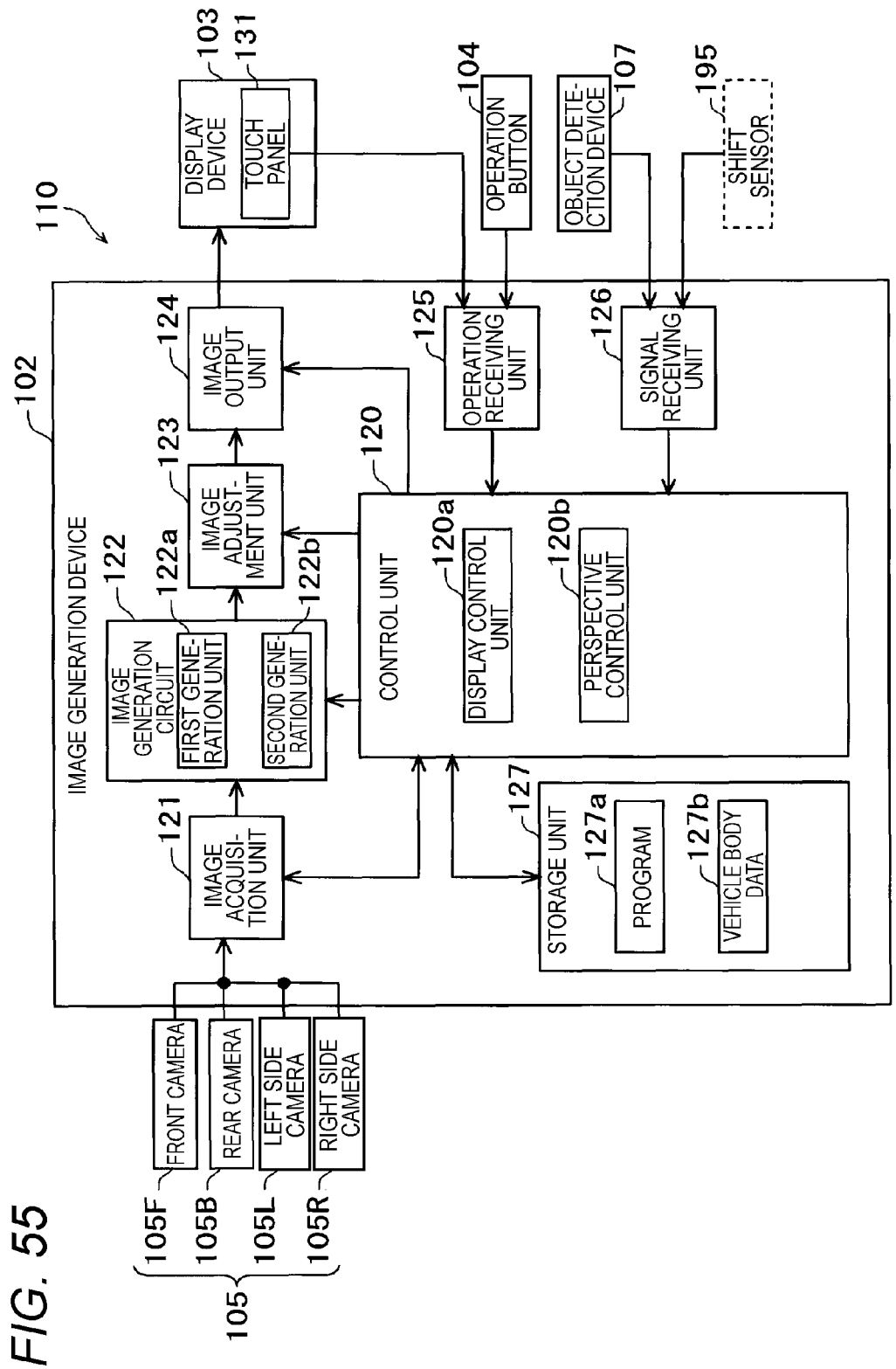
FIG. 55 depicts a configuration of an image display system in accordance with a fifteenth illustrative embodiment.

FIG. 55 depicts a configuration of the image display system 110 of the fifteenth illustrative embodiment. The image display system 110 of fifteenth illustrative embodiment further has an object detection device 107, in addition to the configuration of the seventh illustrative embodiment shown in FIG. 28. The object detection device 107 is configured to detect an object existing in the periphery of the vehicle 109. The object detection device 107 is configured to output a signal indicative of a detection result of the object to the image generation device 102. The signal receiving unit 126 (an example of the receiving unit) of the image generation device 102 is configured to receive and input the signal into the control unit 120.

Figure 56:
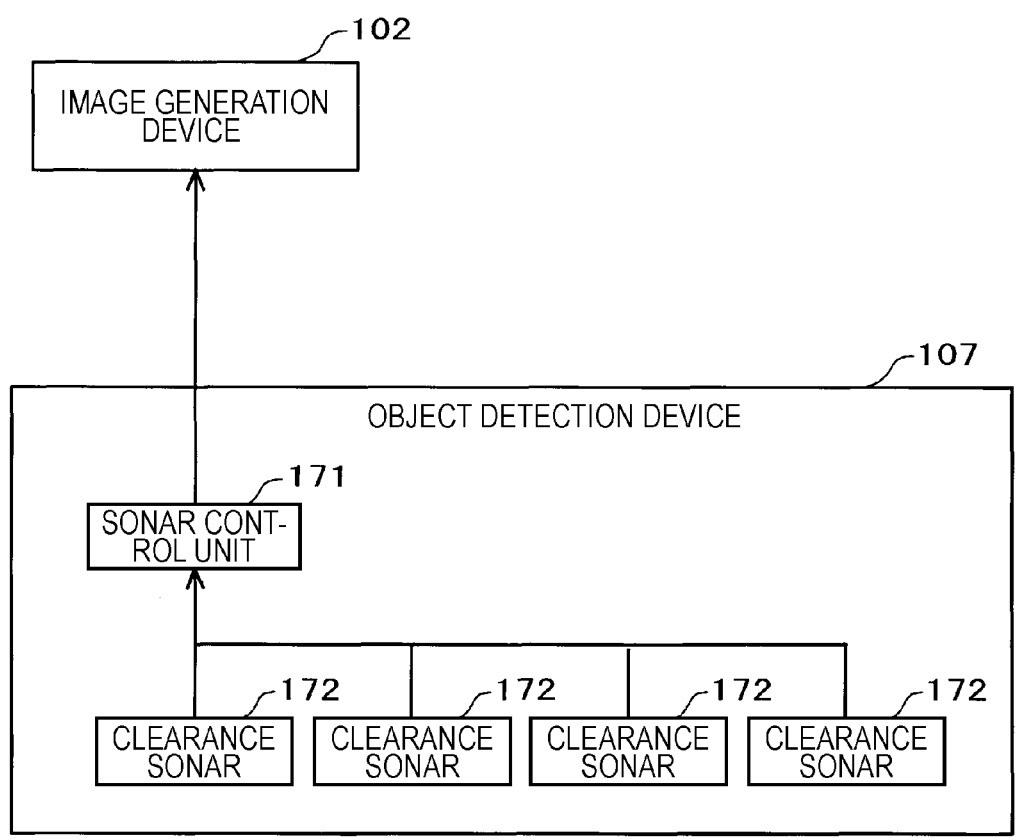
FIG. 56 mainly depicts a configuration of an object detection device of the image display system shown in FIG. 55.

FIG. 56 mainly depicts a configuration of the object detection device 107. As shown, the object detection device 107 has a sonar control unit 171 configured to collectively control the entire device and a plurality of clearance sonars 172. Each clearance sonar 172 is configured to transmit an ultrasonic wave, to receive a reflected wave, which is formed when the ultrasonic wave is reflected on the object, and to detect the object existing in the periphery of the vehicle 109. Each clearance sonar 172 is configured to input a detection result into the sonar control unit 171.

Figure 57:
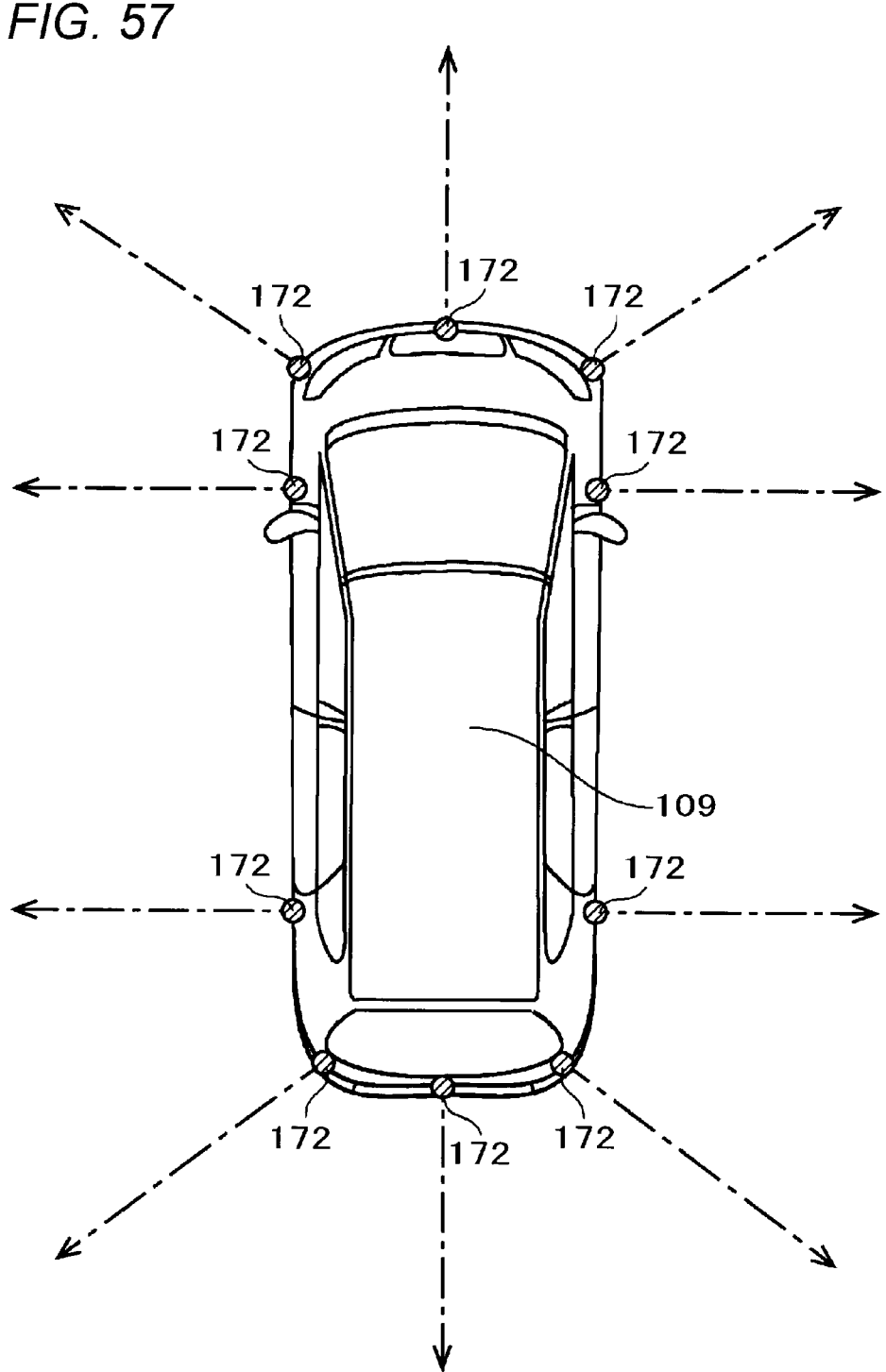
FIG. 57 depicts arrangement of a plurality of clearance sonars of the image display system shown in FIG. 55.

FIG. 57 depicts positions at which the plurality of clearance sonars 172 is arranged at the vehicle 109. As shown in FIG. 57, the vehicle 109 is provided with the ten clearance sonars 172. The front side of the vehicle 109 and the rear side thereof are respectively provided with the three clearance sonars 172. Also, the left side of the vehicle 109 and the right side thereof are respectively provided with the two clearance sonars 172.

Each clearance sonar 172 is configured to detect an object existing in the vicinity thereof. By the plurality of clearance sonars 172, the object detection device 107 can detect an object existing in the periphery of the vehicle 109. Also, the sonar control unit 171 is configured to detect a position of an object existing in the periphery of the vehicle 109 by specifying the clearance sonar 172 having detected the object.

The detection result of the object detection device 107 includes the position of the object. The sonar control unit 171 is configured to output a signal indicative of the detection result to the image generation device 102. The perspective control unit 120*b* of the image generation device 102 is configured to change the speed at which the virtual perspectives VP1, VP2 are to be altered, based on the position of the object included in the detection result of the object detection device 107.

If there is no object in the periphery of the vehicle 109, the perspective control unit 120*b* continuously alters the directions of the lines of sight of the virtual perspectives VP1, VP2 at a constant angular speed (hereinafter, referred to as 'reference angular speed'), like the seventh illustrative embodiment. On the other hand, if there is an objet in the periphery of the vehicle 109, when the direction of the line of sight of any of the first virtual perspective VP1 and the second virtual perspective VP2 faces towards the object, the perspective control unit 120*b* slows down the angular speed at which the directions of the lines of sight of the virtual perspectives VP1, VP2 are to be altered, as compared to the reference angular speed.

Figure 58:
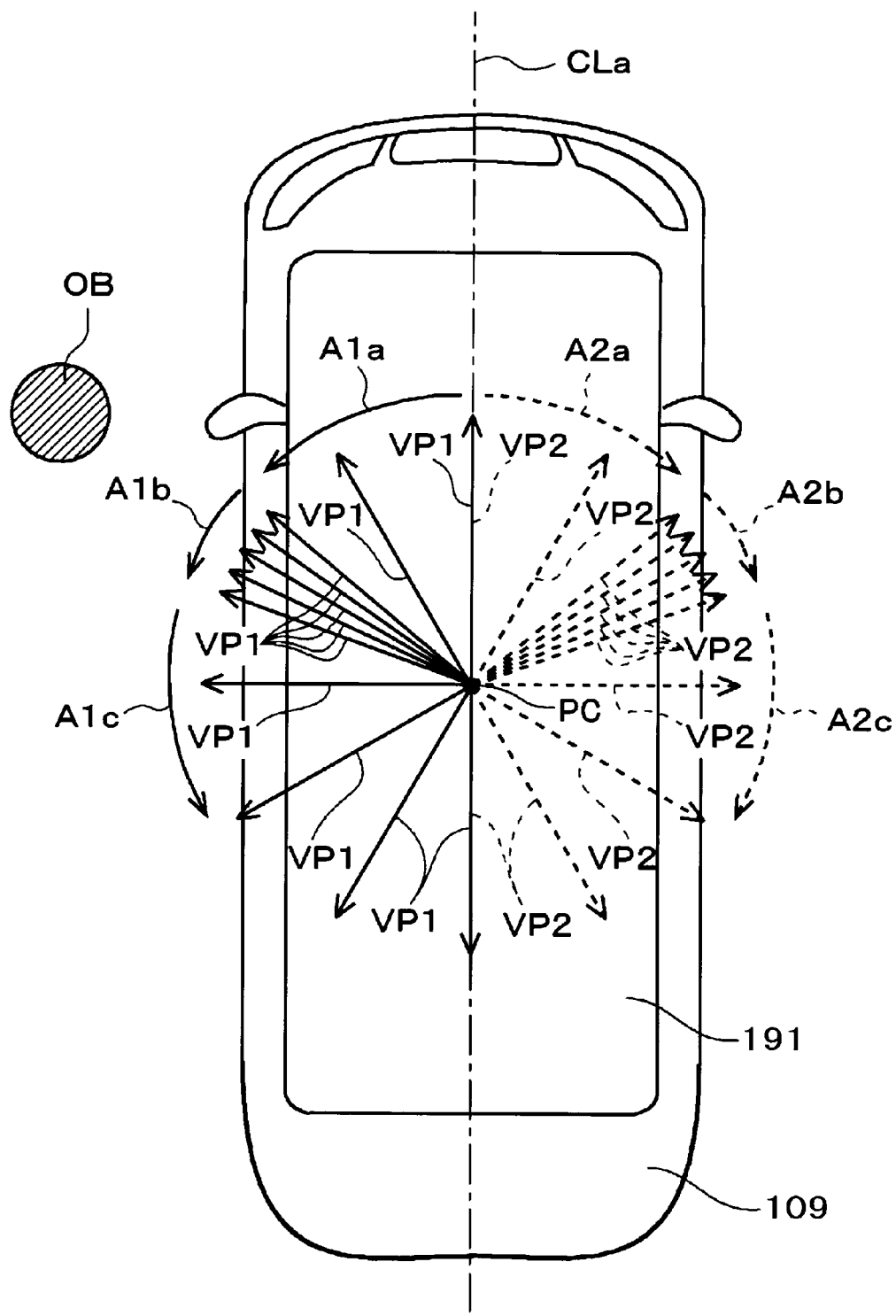
FIG. 58 depicts an example of moving paths of two virtual perspectives in the image display system of FIG. 55.

FIG. 58 depicts an example of the moving paths of the two virtual perspectives VP1, VP2 in the surrounding check mode M12 of the fifteenth illustrative embodiment. In the example of FIG. 58, an object OB exists in the vicinity of a front fender of the vehicle 109.

Also in this case, the perspective control unit 120*b* first makes the directions of the lines of sight of the two virtual perspectives VP1, VP2 face towards the front of the vehicle 109, which is the initial direction, and then alters the direction of the line of sight of the first virtual perspective VP1 in the counterclockwise direction and the direction of the line of sight of the second virtual perspective VP2 in the clockwise direction, respectively.

When any of the directions of the lines of sight of the first virtual perspective VP1 and the second virtual perspective VP2 does not face towards the object OB, the perspective control unit 120*b* sets the angular speed at which the directions of the lines of sight of the two virtual perspectives VP1, VP2 are to be altered to the reference angular speed (arrows A1*a*, A2*a*).

Also, when any of the directions of the lines of sight of the first virtual perspective VP1 and the second virtual perspective VP2 faces towards the object OB, the perspective control unit 120*b* slows down the angular speed at which the directions of the lines of sight of the two virtual perspectives VP1, VP2 are to be altered, as compared to the reference angular speed (arrows A1*b*, A2*b*).

In the example of FIG. 58, the direction of the line of sight of the first virtual perspective VP1 faces towards the object OB. In this case, although the direction of the line of sight of the second virtual perspective VP2 does not face towards the object OB, since the directions of the lines of sight of the two virtual perspectives VP1, VP2 are symmetric, the perspective control unit 120*b* slows down the angular speed at which the directions of the lines of sight of both the two virtual perspectives VP1, VP2 are to be altered, as compared to the reference angular speed.

After that, when both the directions of the lines of sight of the first virtual perspective VP1 and the second virtual perspective VP2 do not face towards the object OB, the perspective control unit 120*b* returns the angular speed at which the directions of the lines of sight of the two virtual perspectives VP1, VP2 are to be altered to the reference angular speed (arrows A1*c*, A2*c*).

In this way, in the fifteenth illustrative embodiment, when the direction of the line of sight of any of the first virtual perspective VP1 and the second virtual perspective VP2 faces towards the object, the angular speed at which the first virtual perspective VP1 and the second virtual perspective VP2 are to be altered is slowed down, as compared to when the directions of the lines of sight do not face towards the object. Thereby, the user can check in detail the object indicated by the first image CP1 or the second image CP2.

Meanwhile, in the above configuration, the direction of the line of sight of the virtual perspective is altered in the same manner as the seventh illustrative embodiment, and the speed at which the virtual perspective is to be altered is changed in correspondence to the detection result of the object. Even when the direction of the line of sight of the virtual perspective is altered in the same manner as any one of the eighth, ninth, eleventh, twelfth and thirteenth illustrative embodiments, the speed at which the virtual perspective is to be altered may be changed in correspondence to the detection result of the object. When the direction of the line of sight of the virtual perspective faces towards the object upon the linear moving of the position of the virtual perspective, the speed at which the position of the virtual perspective is to be moved is preferably slowed down, as compared to when the direction of the line of sight of the virtual perspective does not face towards the object. Also, when the direction of the line of sight of the virtual perspective is altered in the same manner as the comparative example of FIG. 38, the speed at which the virtual perspective is to be altered may be changed in the same manner as the above configuration, in correspondence to the detection result of the object.

Also, in the above configuration, even when the direction of the line of sight of any of the first virtual perspective VP1 and the second virtual perspective VP2 faces towards the object OB, the perspective control unit 120*b* slows down the speed at which both the two virtual perspectives VP1, VP2 are to be altered. However, the perspective control unit 120*b* may slow down the altering speed only for the virtual perspective, which faces towards the object OB, of the first virtual perspective VP1 and the second virtual perspective VP2.

Also, in the above configuration, the object existing in the periphery of the vehicle 109 is detected using the clearance sonars 172. However, the object existing in the periphery of the vehicle 109 may be detected using the other methods such as image recognition and radar.

17. Sixteenth Illustrative Embodiment

Subsequently, a sixteenth illustrative embodiment is described. In the below, the differences from the fifteenth illustrative embodiment are mainly described, and the descriptions about the same or similar configurations and operations as or to the fifteenth illustrative embodiment are omitted.

The image display system 110 of the sixteenth illustrative embodiment has the object detection device 107 and the function of detecting an object existing in the periphery of the vehicle 109, like the fifteenth illustrative embodiment. The image display system 110 of the sixteenth illustrative embodiment is configured to switch activation and inactivation of the display function with which the display device 103 displays the first image CP1 and the second image CP2, in the surrounding check mode M12, in correspondence to the detection result of the object.

Figure 59:
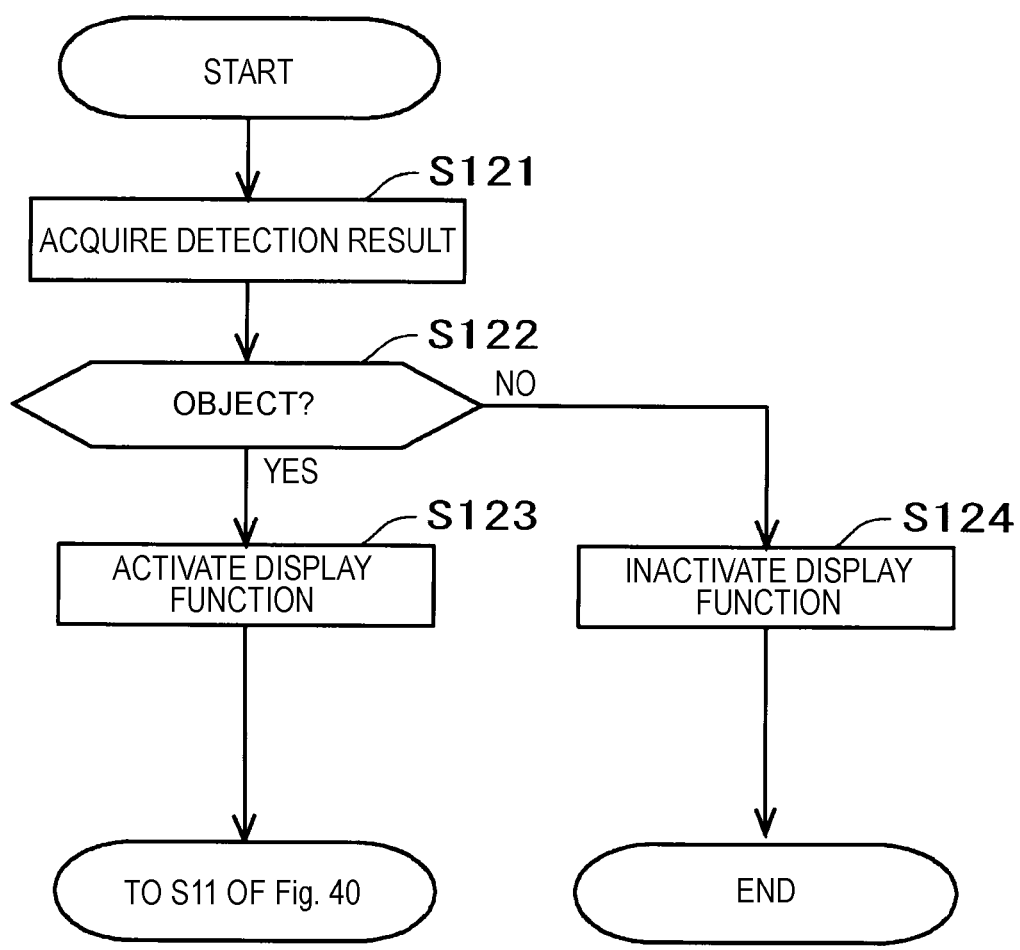
FIG. 59 depicts an operation flow of an image display system in accordance with a sixteenth illustrative embodiment.

FIG. 59 depicts an operation flow of the image display system 110 in the surrounding check mode M12 of the sixteenth illustrative embodiment.

When the operation mode is switched to the surrounding check mode M12, the object detection device 107 first executes processing of detecting an object existing in the periphery of the vehicle 109. Then, the display control unit 120*a* of the image generation device 102 acquires a detection result of the object detection device 107 (step S121).

When it is determined on the basis of the detection result of the object detection device 107 that there is an object (Yes in step S122), the display control unit 120*a* (an example of the control unit) activates the display function with which the display device 103 displays the first image CP1 and the second image CP2 (step S123). Then, the processing proceeds to step S111 of FIG. 40, and the animation indicating the shape of the periphery of the vehicle 109 is performed, as described with reference to FIG. 40. At this time, like the fifteenth illustrative embodiment, when the direction of the line of sight of any of the first virtual perspective VP1 and the second virtual perspective VP2 faces towards the object, the speed at which the first virtual perspective VP1 and the second virtual perspective VP2 are to be altered is preferably slowed down.

On the other hand, when it is determined on the basis of the detection result of the object detection device 107 that there is no object (No in step S122), the display control unit 120*a* inactivates the display function with which the display device 103 displays the first image CP1 and the second image CP2 (step S124). In this case, the animation indicating the shape of the periphery of the vehicle 109 is not performed, and the operation of the image display system 110 in the surrounding check mode M12 is over.

In this way, in the sixteenth illustrative embodiment, only when the object detection device 107 detects an object, the display control unit 120*a* activates the display function with which the display device 103 displays the first image CP1 and the second image CP2. For this reason, the user can check the shape of the periphery of the vehicle 109 while recognizing that there is the object in the periphery of the vehicle 109. Also, when there is no object in the periphery of the vehicle 109, it is possible to shorten the operating time of the image display system 110 in the surrounding check mode M12.

18. Modified Embodiments of Seventh to Sixteenth Illustrative Embodiment

The disclosure is not limited to the above illustrative embodiments, and a variety of changes can be made. In the below, modified embodiments are described. All illustrative embodiments including the above illustrative embodiments and the modified embodiments to be described can be appropriately combined.

In the seventh to tenth illustrative embodiments, the initial direction is the front of the vehicle 109. However, the initial direction may be set to the rear of the vehicle 109. Also, in the eleventh to fourteenth illustrative embodiments, the initial direction is the left of the vehicle 109. However, the initial direction may be set to the right of the vehicle 109. The determination as to whether the initial direction is set to the left or the right of the vehicle 109 is preferably made in correspondence to a position of a driver seat in the vehicle 109. That is, in case of a right-hand drive vehicle, the left of the vehicle 109 is preferably set as the initial direction, and in case of a left-hand drive vehicle, the right of the vehicle 109 is preferably set as the initial direction. In this way, when an opposite direction to the position of the driver seat is set as the initial direction, the user (mainly, the driver) can preferentially check a shape of the periphery of the vehicle 109 at a dead zone position from the driver seat.

In the seventh to tenth illustrative embodiments, the display device 103 is configured to display the first image CP1 and the second image CP2 so that they are adjacent to each other right and left. In the eleventh to fourteenth illustrative embodiments, the display device 103 is configured to display the first image CP3 and the second image CP4 so that they are vertically adjacent to each other. However, the display aspect of the virtual perspective images may be selected by the user.

Figure 60:
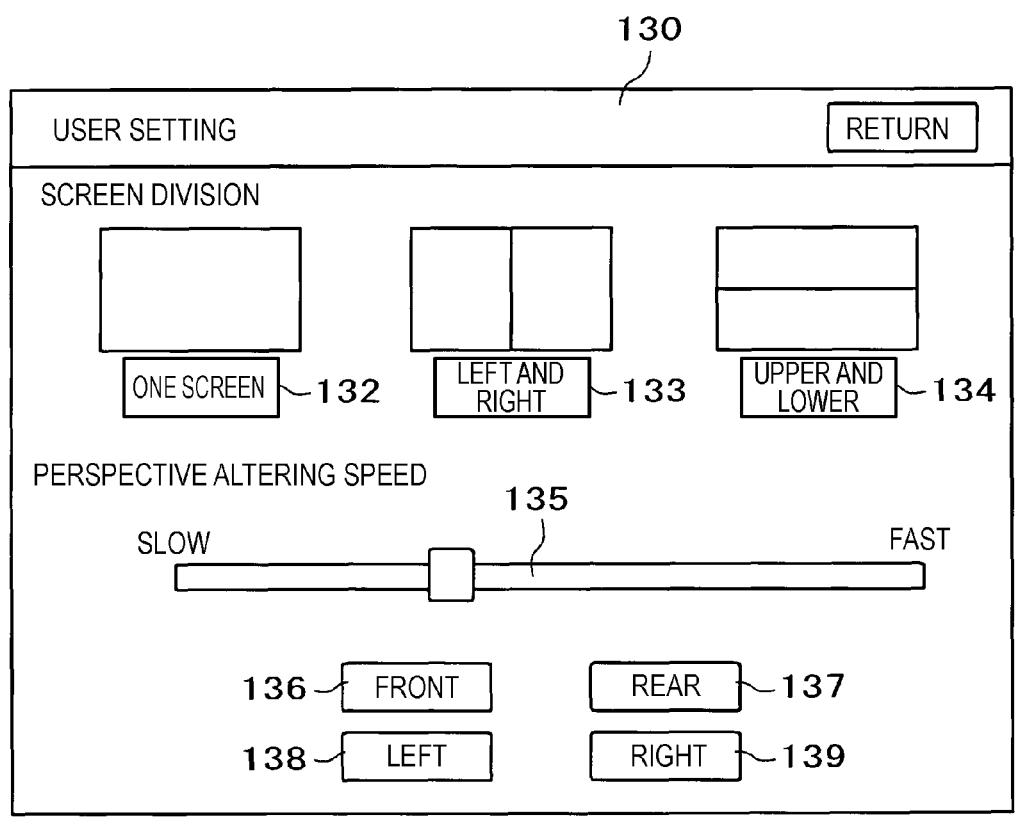
FIG. 60 depicts an example of a setting image that can be applied to the image display system in accordance with each of the illustrative embodiments.

FIG. 60 depicts an example of a setting image 130 that is to be displayed on the display device 103. In the setting image 130, the user can select a display aspect of the virtual perspective images by touching any one of a 'one screen' button 132, a 'left and right' button 133 and an 'upper and lower' button 134. When the user touches the 'left and right' button 133, the display device 103 displays the first image CP1 and the second image CP2 so that they are adjacent to each other right and left, like the seventh to tenth illustrative embodiments. On the other hand, when the user touches the 'upper and lower' button 134, the display device 103 displays the first image CP3 and the second image CP4 so that they are vertically adjacent to each other, like the eleventh to fourteenth illustrative embodiments. Also, when the user touches the 'one screen' button 132, the direction of the line of sight of the one virtual perspective is altered and the display device 103 displays only the one virtual perspective image, like the comparative example of FIG. 38.

In the setting image 130 of FIG. 60, the user can adjust the speed of altering the virtual perspective by operating a slider 135. Further, the user can select the initial direction by touching any one of a 'front' button 136, a 'rear' button 137, a 'left' button 138 and a 'right' button 139. In the meantime, the buttons 136 to 139 for selecting the initial direction are preferably activated/inactivated, in correspondence to the display aspect selected by the user.

The image display system 110 of the above illustrative embodiments sets the entire surroundings of the vehicle 109, as a display target range. However, only a part of the surroundings of the vehicle 109 may be set as the display target range. Also in this case, the directions of the lines of sight of the two virtual perspectives in the display target range are altered in the opposite directions and the first image and the second image generated on the basis of the two virtual perspectives are displayed at the same time, so that the user can check the shape of the display target range in a relatively short time period.

In the eighth illustrative embodiment, the perspective control unit 120*b* is configured to move the positions of the virtual perspectives VP1, VP2 only in the front-back direction of the vehicle 109. However, the perspective control unit 120*b* may also be configured to move the positions of the virtual perspectives VP1, VP2 only in the left-right direction of the vehicle 109, in correspondence to the directions of the lines of sight of the virtual perspectives VP1, VP2. In the twelfth illustrative embodiment, the perspective control unit 120*b* is configured to move the positions of the virtual perspective VP3, VP4 only in the left-right direction of the vehicle 109. However, the perspective control unit 120*b* may also be configured to move the positions of the virtual perspectives VP3, VP4 only in the front-back direction of the vehicle 109, in correspondence to the directions of the lines of sight of the virtual perspectives VP3, VP4.

In the above illustrative embodiments, the first generation unit 122*a* and the second generation unit 122*b* are respectively configured to generate the virtual perspective image by using all the four captured image data acquired from the four cameras 105. However, the virtual perspective image may also be generated using one to three captured image data (at least one captured image data) selected from the four captured image data.

In the above illustrative embodiments, the part except for the vehicle body bottom of the vehicle image 190 is transparent or semi-transparent. However, the corresponding part may be made to be non-transparent.

19. Additional Modified Embodiments

In the above illustrative embodiments, the image display system 10, 110 is mounted on the vehicle 9, 109. However, the image display system may be a portable computer such as a smart phone that can be used in the vehicle.

In the above illustrative embodiments, the function described with reference to one block is not necessarily implemented by a singular physical element and may be implemented by a distributed physical element. Also, in the above illustrative embodiments, the functions described with reference to the plurality of blocks may be implemented by a singular physical element. Also, the processing relating to any one function may be allotted to a device in the vehicle and a device outside the vehicle and the information may be interchanged between the devices by communication, so that the one function may be implemented as a whole.

In the above illustrative embodiments, at least a part of the functions implemented in the software manner by the execution of the program may be implemented by an electrical hardware circuit, and at least a part of the functions implemented by the hardware circuit may be implemented by the software. Also, in the above illustrative embodiments, the function described with reference to one block may be implemented by cooperation of the software and hardware.

Japanese Patent Application Nos. 2013-193909 filed on Sep. 19, 2013 and 2013-226161 filed on Oct. 31, 2013 configure parts of the disclosure and are incorporated into the disclosure for reference.

The invention claimed is:

1. An image generation device to be used for a vehicle, comprising:
   an acquisition unit configured to acquire a plurality of captured image data from a plurality of cameras;
   a generation unit configured to continuously generate a virtual perspective image indicating a periphery of the vehicle and a vehicle body of the vehicle as seen from a virtual perspective positioned within a cabin of the vehicle by using at least one of the plurality of captured image data and vehicle body data of the vehicle; and
   a control unit configured to alter an angle in a plan view of a line of sight of the virtual perspective so that the line of sight circles surroundings of the vehicle and to move a position of the virtual perspective in a front-back direction of the vehicle.

2. The image generation device according to claim 1, wherein the control unit is configured to move the position of the virtual perspective in correspondence to a direction of the line of sight.

3. The image generation device according to claim 1, wherein the control unit is configured to move the position of the virtual perspective along a peripheral edge of the cabin of the vehicle in the front-back direction and in a left-right direction of the vehicle.

4. The image generation device according to claim 1, wherein the control unit is configured to keep the position of the virtual perspective while altering the angle in the plan view of the line of sight and to keep the angle in the plan view of the line of sight while moving the position of the virtual perspective.

5. The image generation device according to claim 1, wherein the control unit is configured to alter the angle in the plan view of the line of sight and the position of the virtual perspective at the same time.

6. The image generation device according to claim 1, wherein the control unit is configured to move the position of the virtual perspective in an elliptical shape of which a long axis follows the front-back direction of the vehicle.

7. The image generation device according to claim 1, wherein the generation unit is configured to project the plurality of captured image data to a virtual projection plane and to generate the virtual perspective image by using an area of a part of the projection plane, wherein at least one of the plurality of cameras has a depression angle of an optical axis different from the other cameras, and the control unit is configured to adjust a depression angle of the line of sight so that a non-projection area, which is positioned outside a projection area of the projection plane to which the plurality of captured image data is to be projected, is not included in the virtual perspective image.

8. The image generation device according to claim 7, wherein the control unit keeps the depression angle of the line of sight at a specific angle at which the virtual perspective image does not comprise the non-projection area, when the line of sight is made to face towards a direction in which the projection area becomes smallest on the projection plane.

9. The image generation device according to claim 7, wherein the control unit is configured to alter the depression angle of the line of sight, in correspondence to a size of the projection area of the projection plane in a direction towards which the line of sight is made to face.

10. The image generation device according to claim 7, wherein if the position of the virtual perspective is a position except for a specific position, the control unit keeps the depression angle of the line of sight of the virtual perspective at a specific angle at which the virtual perspective image does not comprise the non-projection area when the line of sight is made to face towards a direction in which the projection area becomes smallest on the projection plane, and if the position of the virtual perspective is the specific position, the control unit makes the depression angle of the line of sight of the virtual perspective smaller than the specific angle.

11. An image display system to be used for a vehicle, comprising:

the image generation device according to claim 1, and a display device configured to display the virtual perspective image generated at the image generation device.

12. An image generation device to be used for a vehicle, comprising:

an acquisition unit configured to acquire a plurality of captured image data from a plurality of cameras;

a generation unit configured to project the plurality of captured image data to a virtual projection plane and to continuously generate a virtual perspective image indicating a periphery of the vehicle as seen from a virtual perspective positioned within a cabin of the vehicle by using an area of a part of the projection plane, and a control unit configured to alter an angle in a plan view of a line of sight of the virtual perspective so that the line of sight circles surroundings of the vehicle, wherein at least one of the plurality of cameras has a depression angle of an optical axis different from the other cameras, and the control unit is configured to adjust a depression angle of the line of sight so that a non-projection area, which is positioned outside a projection area of the projection plane to which the data of the plurality of captured images is to be projected, is not included in the virtual perspective image.

13. An image display system to be used for a vehicle, comprising:

an acquisition unit configured to acquire a plurality of captured image data from a plurality of cameras;

a first generation unit configured to generate a first image indicating a periphery of the vehicle as seen from a first virtual perspective positioned within a cabin of the vehicle by using at least one of the plurality of captured image data;

a second generation unit configured to generate a second image indicating the periphery of the vehicle as seen from a second virtual perspective positioned within the cabin of the vehicle by using at least one of the plurality of captured image data;

a display unit configured to display the first image and the second image at the same time, and an altering control unit configured to alter a direction of a line of sight of the first virtual perspective and a direction of a line of sight of the second virtual perspective in opposite directions, respectively.

14. The image display system according to claim 13, wherein the altering control unit is configured to alter the direction of the line of sight of the first virtual perspective and the direction of the line of sight of the second virtual perspective from a first direction of the vehicle to a second direction opposite to the first direction, respectively.

15. The image display system according to claim 13, wherein the altering control unit is configured to alter the direction of the line of sight of the first virtual perspective via a left of the vehicle and to alter the direction of the line of sight of the second virtual perspective via a right of the vehicle, and the display unit is configured to display the first image in a first area positioned at a relatively left side and to display the second image in a second area positioned at a relatively right side.

16. The image display system according to claim 15, wherein the direction of the line of sight of the first virtual perspective and the direction of the line of sight of the second virtual perspective are symmetric with respect to a central line of the vehicle.

17. The image display system according to claim 13, wherein the altering control unit is configured to alter the direction of the line of sight of the first virtual perspective via a front of the vehicle and to alter the direction of the line of sight of the second virtual perspective via a rear of the vehicle, and the display unit is configured to display the first image in a first area positioned at a relatively upper side and to display the second image in a second area positioned at a relatively lower side.

18. The image display system according to claim 13, further comprising a moving control unit configured to move a position of the first virtual perspective in correspondence to the direction of the line of sight of the first virtual perspective and to move a position of the second virtual perspective in correspondence to the direction of the line of sight of the second virtual perspective.

19. The image display system according to claim 13, further comprising a receiving unit configured to receive a detection result of an object existing in the periphery of the vehicle, wherein when the direction of the line of sight of one virtual perspective of the first virtual perspective and the second virtual perspective faces towards the object, the altering control unit slows down a speed of altering the one virtual perspective, as compared to when the direction of the line of sight of the one virtual perspective does not face towards the object.

20. The image display system according to claim 13, further comprising a receiving unit configured to receive a detection result of an object existing in the periphery of the vehicle; and a control unit that activates a display function with which the display unit displays the first image and the second image when the detection result indicates that there is an object and that inactivates the display function when the detection result indicates that there is no object.

* * * * *